(12) United States Patent
Hu

(10) Patent No.: US 12,749,303 B2
(45) Date of Patent: Sep. 29, 2026

US012749303B2

(54) AUTOMATIC DETECTION OF SEA FLOATING OBJECTS FROM SATELLITE IMAGERY

(71) Applicant: UNIVERSITY OF SOUTH FLORIDA, Tampa, FL (US)

(72) Inventor: Chuanmin Hu, St. Petersburg, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 384 days.

(21) Appl. No.: 18/335,002

(22) Filed: Jun. 14, 2023

(65) Prior Publication Data

US 2024/0013531 A1 Jan. 11, 2024

Related U.S. Application Data

(60) Provisional application No. 63/352,166, filed on Jun. 14, 2022.

(51) Int. Cl.
*G06V 20/13* (2022.01)
*G01C 11/04* (2006.01)
(Continued)

(52) U.S. Cl.
CPC .............. *G06V 20/13* (2022.01); *G01C 11/04* (2013.01); *G06V 10/273* (2022.01); *G06V 10/58* (2022.01);
(Continued)

(58) Field of Classification Search
CPC ...... G06V 20/13; G06V 10/26; G06V 10/273; G06V 10/58; G06V 10/60; G06V 10/774;
(Continued)

(56) References Cited

U.S. PATENT DOCUMENTS 10,656,018 B2 * 5/2020 Oh ............................ G06T 7/11
12,354,346 B1 * 7/2025 Jiang .................... G06V 20/194
(Continued)

FOREIGN PATENT DOCUMENTS

CN 108875659 A * 11/2018 .......... G06F 18/2411
CN 112257496 A * 1/2021 ............ G06N 3/045
(Continued)

OTHER PUBLICATIONS

Arellano-Verdejo, J., Lazcano-Hernandez, H.E., Cabanillas-Ter'an, N., 2019. ERISNet: deep neural network for Sargassum detection along the coastline of the Mexican Caribbean. PeerJ 7, e6842. pp. 1-19.

(Continued)

*Primary Examiner* — Stephen R Koziol
*Assistant Examiner* — Benedict E Lee
(74) *Attorney, Agent, or Firm* — HUSCH BLACKWELL LLP

(57) ABSTRACT

Methods and systems for macroalgae or marine debris detection are disclosed. A method includes accessing or receiving multispectral aerial images of a target region; preprocessing the aerial images; determining, using one or more characteristics of the aerial images, an image type for each of the aerial images; generating the one or more geospatial data images by: providing preprocessed aerial images of each image type to a machine learning algorithm trained using images having that image type; receiving, as outputs from each DCNN, image data indicating whether macroalgae are present in regions corresponding to each pixel of the aerial images; altering pixel values of the aerial images to visually indicate the presence of macroalgae in regions corresponding to the altered pixel values; and providing the one or more geospatial data images to the user
(Continued)

device via a user interface. Other aspects, embodiments, and features are also claimed and described.

20 Claims, 29 Drawing Sheets
(25 of 29 Drawing Sheet(s) Filed in Color)

(51) Int. Cl.
*G06V 10/26* (2022.01)
*G06V 10/58* (2022.01)
*G06V 10/60* (2022.01)
*G06V 10/774* (2022.01)
*G06V 10/82* (2022.01)
*G06V 20/10* (2022.01)

(52) U.S. Cl.
CPC ............ *G06V 10/60* (2022.01); *G06V 10/774* (2022.01); *G06V 10/82* (2022.01); *G06V 20/194* (2022.01)

(58) Field of Classification Search
CPC ...... G06V 10/82; G06V 20/10; G06V 20/194; G06V 10/764; G01C 11/04
See application file for complete search history.

(56) References Cited

U.S. PATENT DOCUMENTS

| | | | | |
|---|---|---|---|---|
| 2023/0162354 A1* | 5/2023 | Roy | G06V 10/26 382/133 |
| 2023/0316745 A1* | 10/2023 | Malvar Maua | G06V 10/60 382/191 |

FOREIGN PATENT DOCUMENTS

| | | | | | |
|---|---|---|---|---|---|
| CN | 112784670 A | * | 5/2021 | G06V 10/7788 |
| CN | 112800827 A | * | 5/2021 | G06F 18/214 |
| CN | 113139550 A | * | 7/2021 | G06V 20/13 |
| CN | 113454677 A | * | 9/2021 | G06T 5/50 |
| CN | 114417976 A | * | 4/2022 | G06N 3/045 |
| CN | 118823381 A | * | 10/2024 | G06T 5/92 |
| JP | 2022035292 A | * | 3/2022 | |
| KR | 20220077428 A | * | 6/2022 | G01J 3/2823 |
| WO | WO-2020134856 A1 | * | 7/2020 | G06T 5/50 |
| WO | WO-2021119363 A2 | * | 6/2021 | H04N 23/56 |

OTHER PUBLICATIONS

Biermann, L., Clewley, D., Martinez-Vicente, V., Topouzelis, K., 2020. Finding plastic patches in coastal waters using optical satellite data. Sci. Rep. 10, 1-10.
Ciappa, A.C., 2021. Marine plastic litter detection offshore Hawaii by Sentinel-2. Mar. Pollut. Bull. 168, 112457 https://doi.org/10.1016/j.marpolbul.2021.112457. pp. 1-8.
Cuevas, E., Uribe-Martínez, A., Liceaga-Correa, M.D.L. 'A., 2018. A satellite remote-sensing multi-index approach to discriminate pelagic Sargassum in the waters of the Yucatan Peninsula, Mexico. Int. J. Remote Sens. 39, 3608-3627. https://doi.org/10.1080/01431161.2018.1447162.
Gower, J., & King, S. (2011). Distribution of floating Sargassum in the Gulf of Mexico and the Atlantic Ocean mapped using MERIS. International Journal of Remote Sensing, 32, 1917-1929.
Gower, J., Young, E., & King, S. (2013). Satellite images suggest a new Sargassum source region in 2011. Remote Sensing Letters, 4, 764-773.
Hu, C. (2009). A novel ocean color index to detect floating algae in the global oceans. Remote Sensing of Environment, 113, 2118-2129.
Hu, L., K. Zeng, C. Hu, and M-X. He (2019). On the remote estimation of Ulva prolifera areal coverage and biomass. Remote Sens. Environ., 223:194-207. https://doi.org/10.1016/j.rse.2019.01.014.
Hu, C. (2021). Remote detection of marine debris using satellite observations in the visible and near infrared spectral range: Challenges and potentials. Remote Sens. Environ., 259, 112414, https://doi.org/10.1016/j.rse.2021.112414. pp. 1-14.
Hu, C. (2022). Sea Snots in the Marmara Sea as Observed From Medium-Resolution Satellites. IEEE Geosci. & Remote Sens. Lett., 19, 1504905, doi: 10.1109/LGRS.2022.3173997. pp. 1-5.
Hu, C., 2022. Hyperspectral reflectance spectra of floating matters derived from Hyperspectral Imager for the Coastal Ocean (HICO) observations. Earth Syst. Sci. Data 14, 1183-1192. https://doi.org/10.5194/essd-14-1183-1192.
Kikaki, A., Karantzalos, K., Power, C.A., Raitsos, D.E., 2020. Remotely sensing the source and transport of marine plastic debris in Bay Islands of Honduras (Caribbean Sea). Remote Sens. 12, 1727. https://doi.org/10.3390/rs12111727. pp. 1-17.
Ody, A., Thibaut, T., Berline, L., Changeux, T., Andre, J.M., Chevalier, C., Connan, S., 2019. From in situ to satellite observations of pelagic Sargassum distribution and aggregation in the tropical North Atlantic Ocean. PLoS One 14 (9). pp. 1-29.
Qi, L., Y. Yao, D. E. English, R. Ma, J. Luft, and C. Hu (2021). Remote sensing of brine shrimp cysts in salt lakes. Remote Sens. Environ., 266, 112695, https://doi.org/10.1016/j.rse.2021.112695. pp. 1-14.
Song, S., Sakuno, Y., Taniguchi, N., Iwashita, H., 2021. Reproduction of the marine debris distribution in the Seto Inland Sea immediately after the Jul. 2018 heavy rains in Western Japan using multidate Landsat-8 data. Remote Sens. 13, 5048. https://doi.org/10.3390/rs13245048. pp. 1-18.
Topouzelis, K., Papageorgiou, D., Suaria, G., Aliani, S., 2021. Floating marine litter detection algorithms and techniques using optical remote sensing data: a review. Mar. Pollut. Bull. 170, 112675 https://doi.org/10.1016/j.marpolbul.2021.112675. pp. 1-8.
Wang, M., and C. Hu (2016). Mapping and quantifying Sargassum distribution and coverage in the Central West Atlantic using MODIS observations. Remote Sens. Environ., 183:350-367. http://dx.doi.org/10.1016/j.rse.2016.04.019.
Wang, M., Hu, C., Cannizzaro, J., English, D., Han, X., Naar, D., et al. (2018). Remote sensing of Sargassum biomass, nutrients, and pigments. Geophysical Research Letters, 45. https://doi.org/10.1029/2018GL078858. pp. 1-16.
Wang, M., and C. Hu (2020), Automatic extraction of Sargassum features on Sentinel-2 MSI images. IEEE Trans. Geosci. Remote Sens., Doi: 10.1109/TGRS.2020.3002929. pp. 1-19.
Wang, M., and C. Hu (2021). Satellite remote sensing of pelagic Sargassum macroalgae: The power of high resolution and deep learning. Remote Sens. Environ., 264, 112631, https://doi.org/10.1016/j.rse.2021.112631. pp.1-14.
Zhang, S., C. Hu, B. B. Barnes, and T. N. Harrison (2022). Monitoring Sargassum Inundation on Beaches and Nearshore Waters Using PlanetScope/Dove Observations. IEEE Geosci. & Remote Sens. Lett., 19, 1503605, doi:10.1109/LGRS.2022.3148684.

* cited by examiner

AUTOMATIC DETECTION OF SEA FLOATING OBJECTS FROM SATELLITE IMAGERY

CROSS-REFERENCE TO RELATED APPLICATION

This application claims the benefit of U.S. Provisional Application No. 63/352,166 filed Jun. 14, 2022, the entirety of which is herein incorporated by reference.

STATEMENT REGARDING FEDERALLY SPONSORED RESEARCH

This invention was made with government support under NNX16AR74G, NNX17AF57G, 80NSSC20M0264, and 80NSSC21K0422, all awarded by the National Aeronautics and Space Administration of the United States. The Government may have certain rights in the invention.

BACKGROUND

*Sargassum* is a genus of macroalgae (seaweed) prevalent in oceans, including shallow coastal waters. *Sargassum* can present problems for local environments, tourism, and economics when washed ashore. It can also be a desirable raw material useful for the production of fertilizers, papers, cosmetics and other commercial products. The presence of *Sargassum* may also indicate the opportunities for commercial fishing. Likewise, other forms of floating matters (e.g., marine debris) can also have beneficial or adverse impacts on the environments.

Accordingly, systems, methods, and media for automatic detection and quantification of marine macroalgae and other floating matters are desirable.

SUMMARY

In accordance with some embodiments of the disclosed subject matter, systems, methods, and media for systems, methods, and media for transforming geospatial images include: receiving from a user device, a request for geospatial data indicating concentrations of aquatic macroalgae for a geographic target region identified by the request; accessing multispectral aerial images of the target region; preprocessing the aerial images wherein areas obscured by cloud cover in the aerial images are masked and brightness values are adjusted to compensate for atmospheric scattering; determining, using one or more characteristics of the aerial images, an image type for each of the aerial images; generating the one or more geospatial data images by: providing preprocessed aerial images of each image type to a deep convolutional neural network (DCNN) trained using images having that image type; receiving, as outputs from each DCNN, image data indicating whether macroalgae are present in regions corresponding to each pixel of the aerial images; altering pixel values of the aerial images to visually indicate the presence of macroalgae in regions corresponding to the altered pixel values; and providing the one or more geospatial data images to the user device via a user interface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various objects, features, and advantages of the disclosed subject matter can be more fully appreciated with reference to the following detailed description of the disclosed subject matter when considered in connection with the following drawings, in which like reference numerals identify like elements.

FIG. 16A shows the number of revisits for Miami beach from May 1, 2019 to Aug. 31, 2019; FIG. 16B shows Dove RGB image on May 12, 2019; FIG. 16C show *Sargassum* features (dark color) on and near the beach where a small rectangular box (red) in FIG. 16B is zoomed in FIG. 16C; FIG. 16D shows spectra of *Sargassum* (brown) and nearby background water (blue) from the two locations in FIG. 16C, where their difference spectra (green)

show elevated near-infrared (NIR) reflectance; FIGS. 16E-16H are the same as (a)-(d) but for Cancun beach.

DETAILED DESCRIPTION

1. Satellite Remote Sensing of Pelagic *Sargassum* Macroalgae

In recent years, massive blooms of pelagic *Sargassum* have occurred in the Atlantic Ocean, Caribbean Sea, and Gulf of Mexico, and satellite imagery have been used operationally to monitor and track the blooms. However, limited by the coarse resolution and other confounding factors, there is often a data gap in nearshore waters, and the uncertainties in the estimated *Sargassum* abundance in off-shore waters are also unclear. Higher-resolution satellite data may overcome these limitations, yet such a potential is hindered by the lack of reliable methods to accurately detect and quantify *Sargassum* in an automatic fashion.

Systems and methods disclosed herein can address this challenge by combining large quantities of high-resolution satellite data with deep learning. For example, data from resources such as the Multispectral Instrument (MSI, 10-20 m), Operational Land Imager (OLI, 30 m), WorldView-II (WV-2, 2 m), and/or PlanetScope/Dove (3 m) can be used with a deep neural network, such as a deep convolution neural network (DCNN), to extract *Sargassum* features and quantify *Sargassum* biomass density or areal coverage. One type of DCNN, known as U-net could be leveraged and implemented in certain methods and embodiments described herein.

In one experiment, the inventors were able to implement an automated method that could extract *Sargassum* features while discarding other confusing features (waves, currents, phytoplankton blooms, clouds, cloud shadows, or striping noise). For *Sargassum* biomass estimated from OLI and MSI images, results indicated an accuracy of ~92% and 90%, respectively, when evaluated using images from the same sensor. When *Sargassum* areal coverage was estimated from WV-2 and Dove images, accuracies of ~98% and 80% were obtained, respectively. When images from different sensors were cross-compared, methods using OLI images revealed ~35% more *Sargassum* biomass than methods using MODIS, in 14 OLI images collected in the Caribbean Sea (path/row: 001/050). On 3 Jun. 2019 and 5 Jun. 2018, methods using Dove images showed ~150% more *Sargassum* coverage than the same-day MODIS for their common observation area (~230,000 $km^2$) in the Gulf of Mexico. Compared to the quasi-simultaneous Dove images, the MSI and OLI may have underestimated at least ~360% and ~70% of *Sargassum*, respectively. The morphological characteristics of *Sargassum* features from these high-resolution data are also reported to facilitate management actions. The findings here not only fill the knowledge gaps and coverage gaps from previous studies, but more importantly pave the road toward operational monitoring and tracking *Sargassum* features in nearshore waters.

Figure 1:
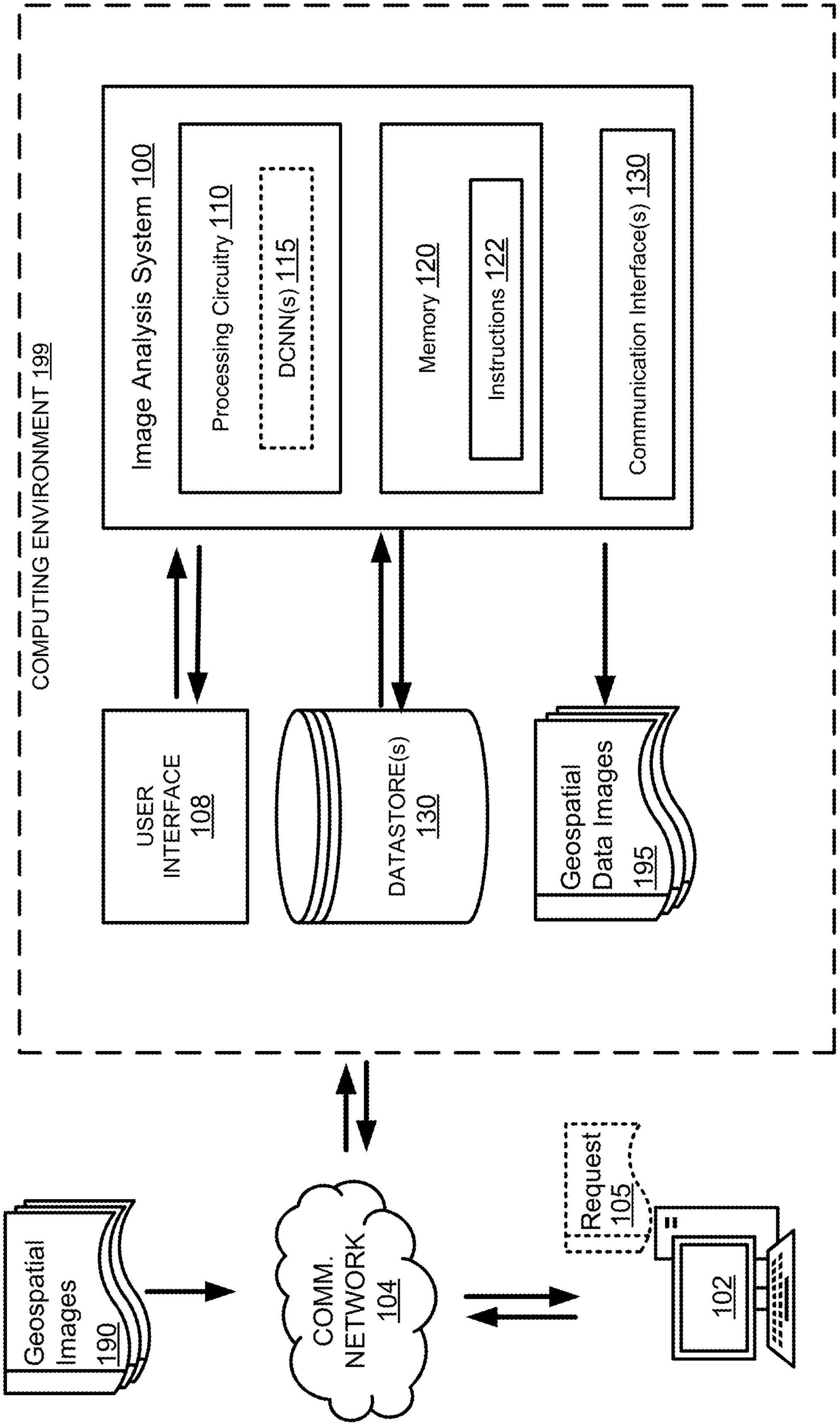
FIG. 1 is a block level schematic of an example environment in which embodiments disclosed herein may be practiced.

FIG. 1 illustrates an example environment in which embodiments may be practiced. An image analysis system 100 includes processing circuitry 110, memory 120 coupled to the processing circuitry, and at least one communication interface 130 coupled to the processing circuitry 110. The memory 120 stores machine-readable instructions 122 which, when executed by the processing circuitry 110, are configured to cause the image analysis system 100 to perform methods disclosed herein. The processing circuitry 110 may include one or more deep convolution neural networks, the DCNN(s) 115 shown. In some examples, the DCNN(s) 115 may be instantiated within the processing circuitry 110 by executing a portion of the instructions 122.

The image analysis system 100 may operate within a computing environment 199 which may be accessible from a communications network 104 such as the Internet. The computing environment may include one or more data stores 130 accessible to the image analysis system 100. The computing environment may also provide a user interface 108 allowing users such as the user 102 to interact with the image analysis system 100, including transmitting analysis requests such (e.g., the request 105) via the network 104. The image analysis system 100 may be configured to retrieve geospatial images such as the geospatial images 190 shown in FIG. 1 via the network 104. The image analysis system 100 may also be configured to retrieve geospatial images from the datastore(s) 130. In some embodiments, the image analysis system 100 may be configured to periodically retrieve new geospatial images.

The image analysis system 100 may be configured to process geospatial images 190 received as inputs and to transform them into geospatial data images (GSDI, e.g., the geospatial data images 195) which visually represent the results of analyses performed by the system in humanperceivable form in response to requests (e.g., the request 150 received from the user 102 via the user interface 108).

It will be appreciated that FIG. 1 shows a non-limiting example of a system suitable for performing methods disclosed herein. Other non-limiting examples may include any suitable combination of hardware, firmware, or software. For instance, some or all functions may be performed by one or more application-specific integrated circuits (ASICs) and/or one or more field-programmable gate arrays (FPGAs). Furthermore, it will be understood that various components and functionality of suitable systems may be distributed between multiple distinct computing systems, including, but not limited to, any suitable combination of client and server systems and physical and virtual machines, which may communicate over one or more communication networks, including, but not limited to, private networks, public networks such as the Internet, virtual private networks, wireless communication networks, optical communication networks, electrical communication networks, and the like.

Figure 2:
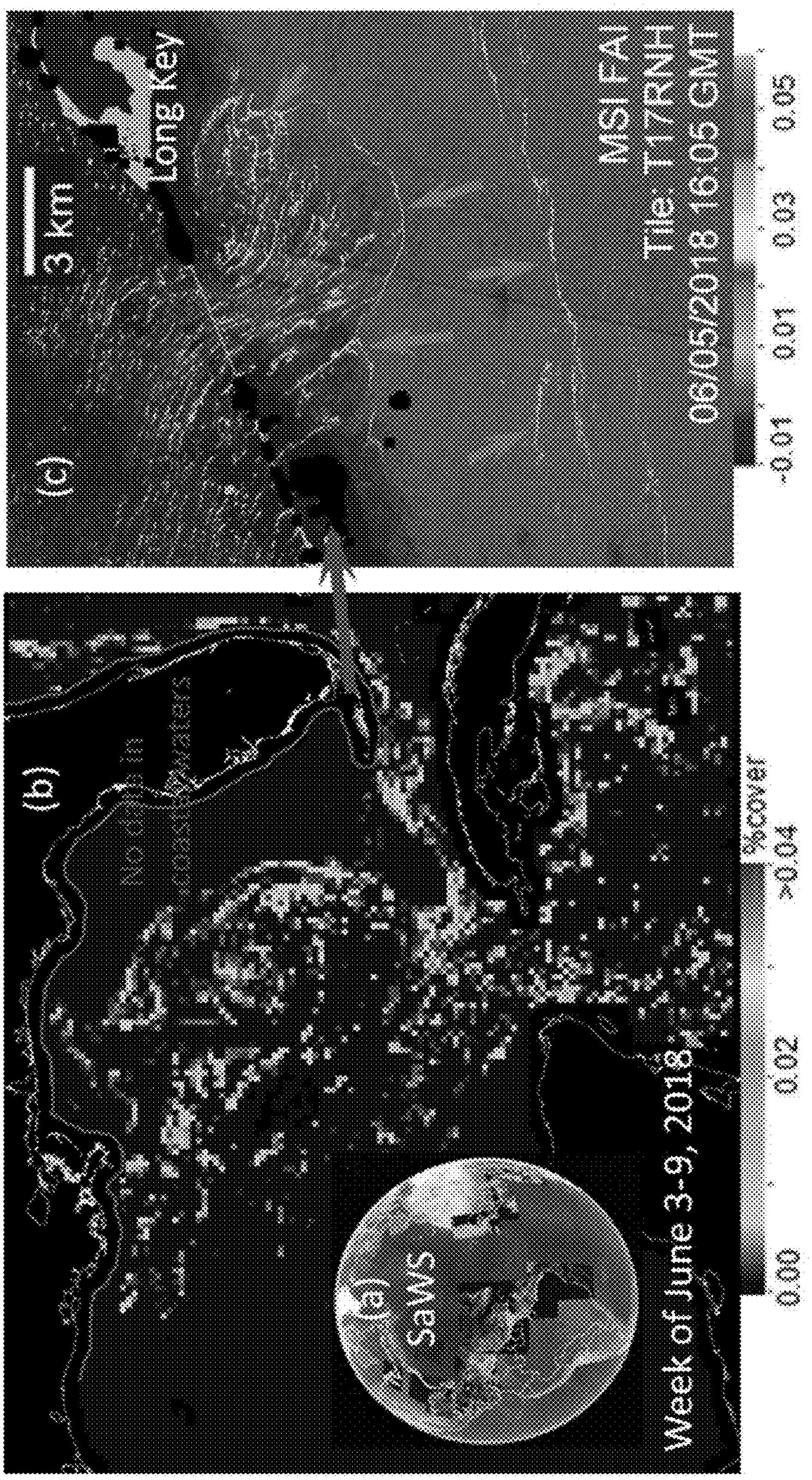
FIG. 2 depicts examples of geospatial images modified to indicate the presence of macroalgae.

Satellite remote sensing provides timely *Sargassum* monitoring information, and thus is a useful tool helping resource managers make decisions and develop mitigation strategies Currently, coarse-resolution sensors including the Moderate Resolution Imaging Spectroradiometer (MODIS), Visible Infrared Imaging Radiometer Suite (VIIRS), MEdium Resolution Imaging Spectrometer (MERIS), and Ocean Land Color Instrument (OLCI) have been successfully utilized to observe the large-scale *Sargassum* distributions across the Atlantic Ocean. Correspondingly, a satellite-based near real-time *Sargassum* Watch System (SaWS) has been established to use both MODIS and VIIRS imagery to monitor *Sargassum* distributions and to predict *Sargassum* transport in the Caribbean Sea, as shown in FIG. 2.

However, measurements derived from these coarse-resolution sensors often suffer from several limitations. First, uncertainties in the *Sargassum* estimates are unclear. *Sargassum* in the ocean can take the form of clumps, mats, or rafts, often smaller than a pixel size. Each sensor has its own lower detection limit. For example, with a signal-to-noise ratio (SNR) of 200:1. According to some estimates, the areal detection limit is about 1% of a pixel size. From MODIS 1-km observations, the lower detection limit was estimated to be 0.2% of a pixel size (i.e., 2000 $m^2$). It is unclear how much *Sargassum* these coarse-resolution sensors may "miss" due to such lower detection limits, for example in the weekly *Sargassum* density images, as can be seen in FIG. 2B. Moreover, there are no valid MODIS or VIIRS observations in nearshore.

The data quality of the coarse-resolution pixels is compromised in coastal waters due to interference of the shallow-water bottom, high amounts of suspended particles, or land adjacency effects. Therefore, in the SaWS, pixels within 30 km of shoreline are often masked to avoid false positives. However, the lack of data in nearshore waters can greatly hinder management actions.

To overcome the limitations of conventional approaches, various high-resolution sensors should be utilized. For example, the 10-30 m resolution Multispectral Instrument (MSI) and Operational Land Imager (OLI) sensors carried by the Sentinel-2 and Landsat-8 satellites are equipped with spectral bands to detect the enhanced Near Infrared (NIR) reflectance caused by floating vegetation including *Sargassum*. FIG. 2C shows an MSI Floating Algae Index (FAI) image around Long Key of the Florida Keys, where *Sargassum* rafts can be clearly visualized as image slicks. Such observations are not available from the coarse-resolution data in FIG. 2B for the same period.

The floating algae index, or FAI, is defined as the difference between reflectance at 859 nm (vegetation "red edge") and a linear baseline between the red band (645 nm) and short-wave infrared band (1240 or 1640 nm). Through data comparison and model simulations, FAI has shown advantages over the traditional NDVI (Normalized Difference Vegetation Index) or EVI (Enhanced Vegetation Index) because FAI is less sensitive to changes in environmental and observing conditions (aerosol type and thickness, solar/viewing geometry, and sun glint) and can "see" through thin clouds. The baseline subtraction method provides a simple yet effective means for atmospheric correction, through which floating algae can be easily recognized and delineated in various ocean waters, including the North Atlantic Ocean, Gulf of Mexico, Yellow Sea, and East China Sea. Because similar spectral bands are available on many existing and planned satellite sensors such as Landsat TM/ETM+ and VIIRS (Visible Infrared Imager/Radiometer Suite), the FAI concept is extendable to establish a long-term record of these ecologically important ocean plants.

Figure 3:
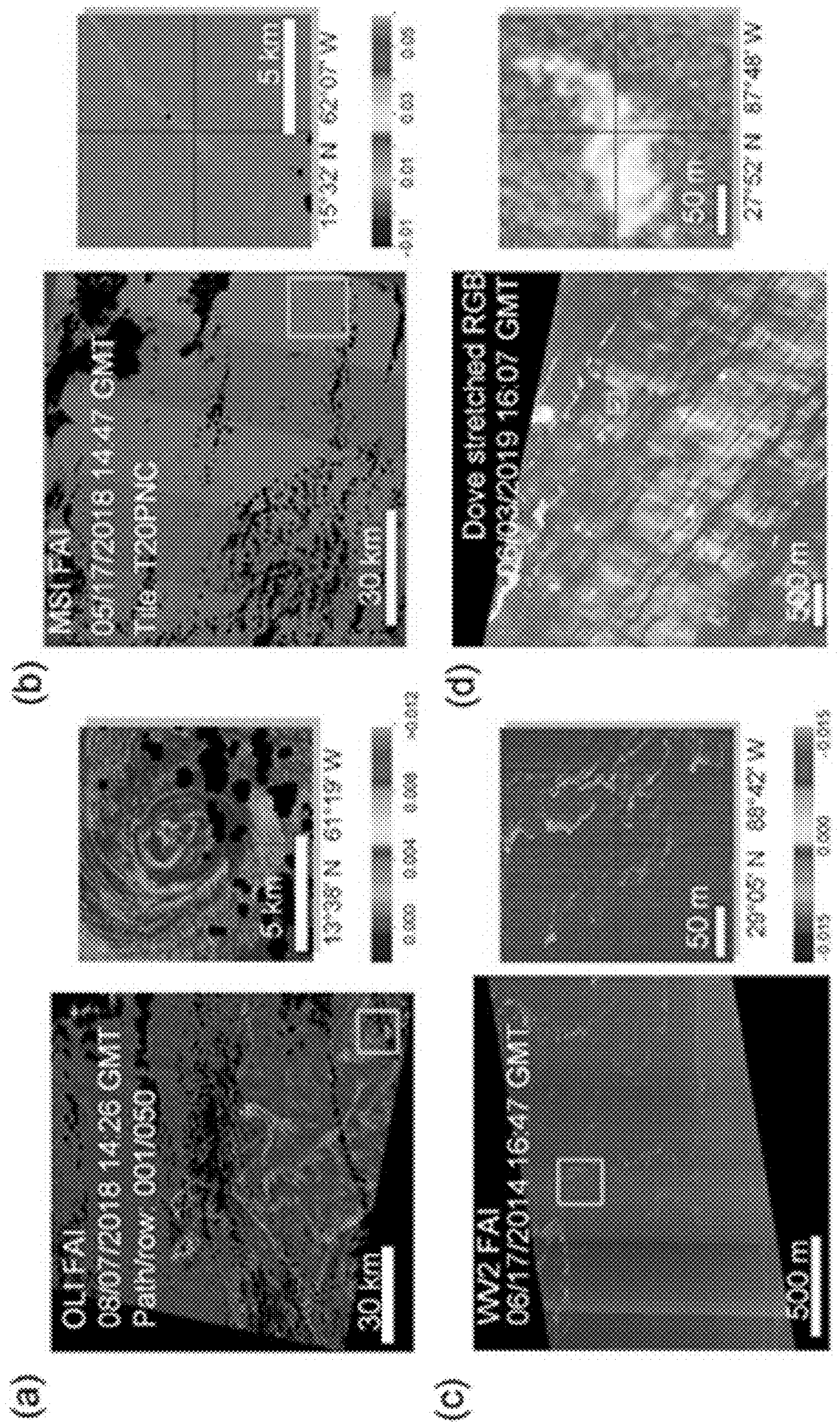
FIG. 3 depicts macroalgae features (*Sargassum*) in unprocessed and processed high-resolution geospatial images.

FIG. 3A and FIG. 3B show more examples of *Sargassum* features in MSI and OLI FAI images, respectively. In addition, commercial satellites such as the Worldview series (FIG. 3C), PlanetScope (FIG. 3D), RapidEye, and SkySat also provide high-resolution data that can be used to detect the small floating macroalgae features. In particular, the PlanetScope constellation (Dove) provides daily observations at 3-m resolution, thus representing an excellent data source for near real-time applications. As an example, the 3-m resolution Dove image in FIG. 3D shows many small brownish *Sargassum* features that can be visualized without the NIR wavelengths.

While these high-resolution sensors are designed primarily for land-based applications, some measurements are also taken over the ocean; however, *Sargassum* detection often suffers from confusing features induced by clouds, surface waves, or variable image background due to sensor artifacts or changes in water's optical properties. To make things worse, different sensors may have different noise characteristics. Thus, a reliable algorithm to extract *Sargassum* features automatically from images of an individual sensor type, not to mention a unified algorithm applicable to all high-resolution sensors, is lacking. Because of these technical difficulties, existing systems for *Sargassum* detection using aerial imagery, such as the *Sargassum* Early Advisory System (SEAS), often use human intervention in the form visual interpretation and manual delineation to locate the *Sargassum* slicks in Landsat imagery to predict potential beaching events.

Certain denoising and feature extraction methods for MSI images will now be described, which may be used in association with the systems described herein. These methods may be used on FAI images that use at least two spectral bands in the NIR or SWIR wavelengths. However, other methods would be more suitable for use with 3-band data (e.g., from the PlanetScope constellation of satellites). In addition, the threshold-based image segmentation methods rely on the accurate estimation of the image background variations, and may need tuning to operate on different image types.

One aspect of the systems and methods described herein that help overcome certain disadvantages of the prior art, is that these systems and methods employ deep-learning techniques that work with the specific datasets (which may be denoised or otherwise pre-processed, as further described herein) to provide automated *Sargassum* detection and benefit from the ability to process high-resolution imagery.

Systems disclosed herein and methods for their use do not use human intervention, but may be configured to be adaptable and refinable to allow for users to guide or supervise how the algorithms process data. Automated methods described herein could use a U-structured DCNN model to enable a unified approach to extracting *Sargassum* features from aerial imagery and quantifying *Sargassum* abundance from multi-sensor high-resolution imagery in order to fill in data gaps for *Sargassum* abundance in nearshore waters.

For purposes of illustration, aspects of systems and methods disclosed herein will first be explained below with reference to particular example embodiments and experiments performed to validate the performance of such example embodiments. Additional and alternative embodiments and features of those embodiments will then be described in light of the examples.

Example #1: Methods and Data Sources

A first example *Sargassum* quantification workflow and the details of a DCNN suitable for use in performing *Sargassum* extraction according to embodiments herein will be described below, followed by performance evaluations using the MSI, OLI, WV-2, and Dove image datasets. *Sargassum* biomasses/coverages quantified from these high-resolution images were compared with result using concurrent MODIS measurements to establish empirical relationships between *Sargassum* estimates generated from these image types. *Sargassum* morphologies generating from the OLI, MSI, and Dove images are described as examples. Operational considerations for near real-time *Sargassum* monitoring using satellite imagery will be discussed in light of the examples presented.

Fifty-three Sentinel-2 MSI and twenty-one Landsat-8 OLI Level-1C (top-of-Atmosphere (TOA) reflectance) images collected near the Lesser Antilles Islands and Gulf of Mexico (GOM) in 2018 and 2019 were downloaded from the USGS earth explorer https://earthexplorer.usgs.gov/, and processed to yield Rayleigh-corrected reflectance values ($R_{rc}$, unitless) at 10-m and 30-m resolution, respectively. Using the multispectral $R_{rc}$ data, the FAI products were generated to quantify the enhanced reflectance of *Sargassum* in the near-infrared (NIR) wavelengths by comparing to the nearby red and shortwave-infrared (SWIR) bands using the following equations:

$$FAI = R_{rc,NIR} - R'_{rc,NIR}$$

$$R'_{rc,NIR} = R_{rc,RED} + (R_{rc,SWIR} - R_{rc,RED}) \times (\lambda_{NIR} - \lambda_{RED}) / (\lambda_{SWIR} - \lambda_{RED}) \quad \text{(Eq. 1)}$$

where $\lambda_{RED}$=665 nm, $\lambda_{NIR}$=865 nm, and $\lambda_{SWIR}$=1610 nm were selected for Sentinel-2 MSI image data, while $\lambda_{RED}$=655 nm, $\lambda_{NIR}$=865 nm, and $\lambda_{SWIR}$=1610 nm were selected for Landsat-8 OLI image data. In MSI FAI images, pixels with large $Rrc_{1610}$(>0.10) were pre-masked to exclude the land and bright cloud pixels and treated as invalid observations (Eq. 2). Similar thresholds were also applied to mask the OLI FAI images before *Sargassum* extraction.

$$Rrc_{1610}>0.1, Rrc_{442}>0.1, \text{ and } Rrc_{560}>0.1 \quad \text{(Eq. 2)}$$

Worldview-2 Data: four Worldview-2 (WV-2) images collected in the northern GOM during 2014 to 2015 containing partial *Sargassum* coverage were acquired from DigitalGlobe. The data were processed into TOA reflectance and the FAI products were generated using the TOA reflectance centered on 659 nm, 833 nm, and 949 nm. FIG. 3C shows an example of the *Sargassum* features observed on the WV-2 FAI images. Three images were used for model training and one image was selected for validation.

Dove Data: a total of 4,567, 1, and 7,457 three-band Dove images collected on 3 Jun. 2019, 1 Jun. 2019, and 5 Jun. 2018, respectively, in the GOM were acquired from Planet Lab to test the applicability of the *Sargassum* extraction method. Considering the difficulties in conducting accurate atmospheric correction, the radiance data were directly used to detect *Sargassum*. Note that the four-band Dove data which contains the NIR wavelengths were mostly unavailable in the open water area within the GOM, therefore only the three-band RGB data were used in this paper. Table 1 below summarizes high-resolution satellite images used for detecting and quantifying *Sargassum* in this example. In this experiment, the Dove data was three-band Dove image data, which provided daily coverage over the GOM. Four-band data (with the fourth band in the NIR wavelength) cover coastal waters only.

TABLE I

| | Spatial resolution | Revisit time | NIR bands | Image location | Number of images used | Model input |
|---|---|---|---|---|---|---|
| MSI | 10-m/20-m | 5 days | Yes | Near the Lesser Antilles Islands; Eastern GOM | 53 | FAI |
| OLI | 30-m | 16 days | Yes | Near the Lesser Antilles Islands (path/row: 001/050; 002/049); Northern GOM (path/row: 021/040; 021/041) | 21 | FAI |
| Dove | 3-m | Daily | No | GOM | 12025 | RGB |
| WV-2 | ~2-m | Irregular | Yes | Northern GOM | 4 | FAI |

MODIS Data: To estimate the amount of *Sargassum* missed by coarse-resolution sensors, MODIS data collected in the GOM on 3 Jun. 2019 and 5 Jun. 2018 and in the Central West Atlantic in 2018 were processed to compare with quasi-simultaneous and co-located MSI, OLI, and Dove observations. MODISA and MODIST Level-0 data were obtained from the U.S. National Aeronautics and Space Administration (NASA) Goddard Space Flight Center (http://oceancolor.gsfc.nasa.gov), and processed to generate $R_{rc}$ data using SeaDAS software (version 7.5). The corresponding MODIS FAI images were generated using $R_{rc}$ data centered at 667 nm, 748 nm, and 869 nm (Eq. 1). The *Sargassum*-containing pixels were extracted, and the fractional areal coverages were quantified. These area coverages were converted to biomass densities using a biomass model.

In one embodiment, training data were prepared by human experts using a semi-automated IDL GUI Specifically, the locations of the *Sargassum* features were first identified through visual inspection, and then these features were extracted using adjusted thresholding and to define bounded regions, subject to morphological constraints optimized by human inspection. These images along with the corresponding extraction results were used as the training data for the AI algorithm. Once the location of the features and the optimal extraction parameters were selected the extraction process was automated.

Figure 15:
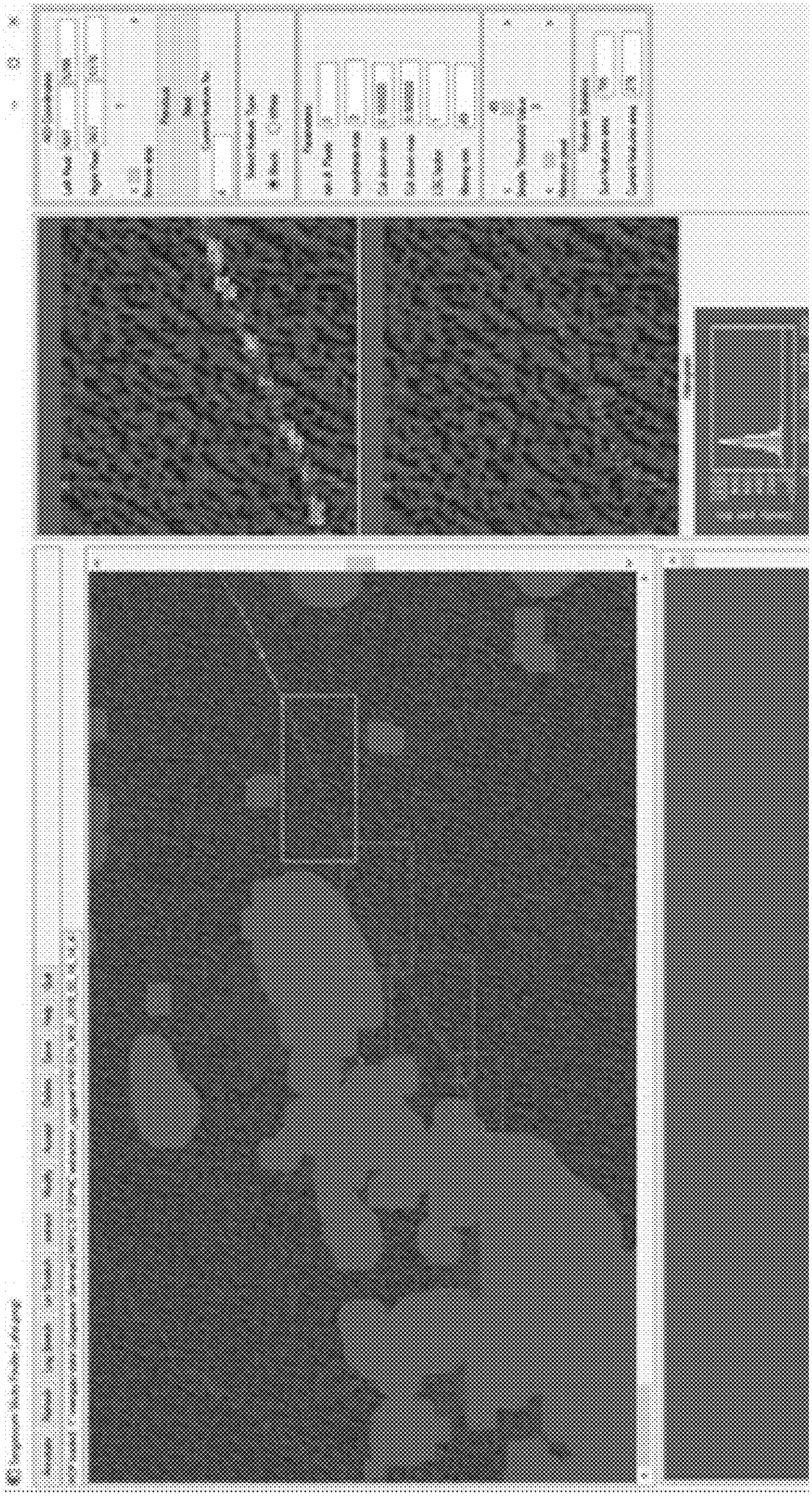
FIG. 15 shows an example satellite image to locate sub-regions with *Sargassum* present and each sub-region using the user interface training according to embodiments herein.

An example training data preparation process, as illustrated in FIG. 15, includes inspecting satellite image to locate sub-regions with *Sargassum* present and selecting each sub-region using the user interface (e.g., by a mouse click over each sub-region). Next the user interacts with the IDL to extract the *Sargassum*-containing pixels for each sub-region based on the locally adjusted thresholds and morphological constraints such as feature roundness and number of pixels in each region; these parameters are optimized by experts to ensure the best extraction performance. Extraction results for a region are then generating by merging the extraction results from all sub-regions. The extracted *Sargassum*-containing pixels are assigned a gray-value of 255 (indicating "*Sargassum* present"), while the other pixels area assigned either a gray-value of 0 (meaning "no *Sargassum* present") or are designated as 'NaN' (not a number, indicating "no observation").

Example #1: Workflow

In various embodiments, *Sargassum* extraction and quantification can employ the following workflow or similar workflows. First, data under cloudy conditions and other unfavorable observing conditions could be discarded or treated as "no observations." Then, the *Sargassum*-containing pixels are extracted using a deep convolutional neural network trained for the specific data types (these data types are described below). Finally, the corresponding biomass densities/areal coverages are quantified from all *Sargassum*-containing pixels.

Figure 4:
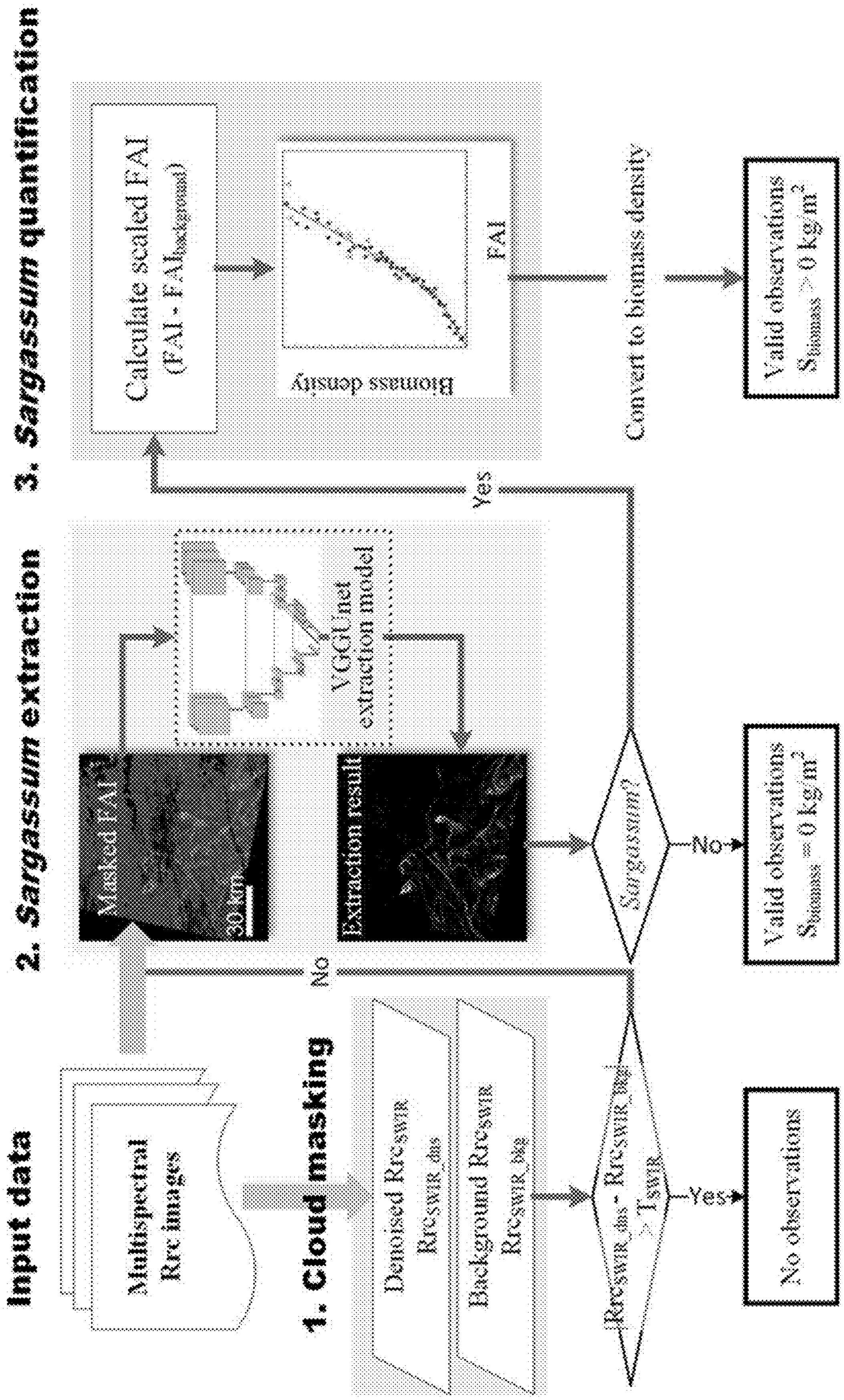
FIG. 4 depicts an example workflow according to embodiments herein.

FIG. 4 illustrates a workflow applied in this example to Landsat-8 OLI and Sentinel-2 MSI images. For WV-2 and Dove images, *Sargassum* extraction was achieved using the same DCNN, but in the final step *Sargassum*-containing pixels were assumed to have 100% subpixel areal coverage. Cloud masking was not considered for WV-2 data, while for Dove data blue-band radiance $>17\ W \cdot sr^{-1} \cdot m^{-2}$ was selected to mask thick clouds. The methods for cloud masking and *Sargassum* extraction are explained are described further below. *Sargassum* extraction was performed using a deep convolutional neural network model trained for the specific dataset. Pixels of valid observations but with no *Sargassum* detected were assigned with 0.0 kg/m$^2$ biomass density, while pixels with *Sargassum* detected were assigned with the biomass density values calculated using the pixels' FAI values and a field-based FAI-biomass density model previously described by inventors of the systems and methods disclosed herein.

Compared to background seawater, cloud pixels also show enhanced signals on FAI images and thus need to be masked before applying the *Sargassum* extraction process. Because clouds normally show higher reflectance in the SWIR wavelengths, a simple threshold can remove most thick clouds (Eq. 2). However, this preliminary mask cannot identify thin clouds, and a unified threshold may over-mask valid water observations under strong sun glint. For MSI and OLI data, a H_SWIR cloud mask was applied to mask the cloud-contaminated pixels. Instead of directly applying the single threshold over the entire image, using the H_SWIR cloud masking method involves performing segmentation after estimating the scaled reflectance by subtracting background reflectance according to Eq. 3:

$$Rrc_{SWIR_{dns}} - Rrc_{SWIR_{bkg}} > T_{SWIR} \quad \text{(Eq. 3)}$$

where $Rrc_{SWIR_{dns}}$ is the denoised $Rrc_{SWIR}$ with Gaussian filtering, and $Rrc_{SWIR_{bkg}}$ is the estimated background value of $Rrc_{SWIR}$. Parameters can be selected for the MSI data. For OLI data, the SWIR band centered at 1609 nm was applied to generate a similar H_SWIR cloud mask. This approach produces satisfactory performance OLI images as verified by visual inspection.

In Dove images, cloud features are highly variable, making it challenging to effectively identify them. However, *Sargassum* detection is still possible, even through moderately thick clouds. Therefore, only those pixels with blue radiance greater than 17 W·sr−1·m−2 were masked as invalid observations. The WV-2 images used in this example were mostly cloud free, and cloud masking was not considered.

In some embodiments, as part of the process of preprocessing images, a system selects the best available satellite images for a given area and time period based on the image acquisition time, location, resolution, cloud cover, sun glint, or noise level. In some embodiments, images collected by drones can also be used. Prior to *Sargassum* extraction the H_SWIR cloud masking algorithm can be applied to mask pixels corresponding to cloud cover, as described briefly above and in greater detail below.

H_SWIR Cloud Masking: Because pixels corresponding to clouds, often result in higher FAI values than adjacent pixels corresponding to water (similarly to *Sargassum*), it is desirable to exclude such "cloud pixels," from the *Sargassum* extraction process to avoid false-positives. Because of the relatively lower variation of water reflectance across different pixels and less confusing bright surface structures, a threshold-based cloud detection approach was developed to identify pixels with high reflectance in MSI bands 11 and 12 (1610 and 2202 nm).

Because there are many "noise" patterns from the wave-induced glint, a total variance (TV) filtering (weight=0.05) can be applied to Rrc images in both MSI bands 11 and 12. Cloud detection can then be performed on the denoised Rrc images. To capture the large-scale image variations, the background ocean reflectance in bands 11 and 12 can be estimated using an iterative mean background filter with a 200×200 window size. Then, the pixels with local high reflectance can be extracted after subtracting the background with the corresponding segmentation threshold. Here, the cloud masking method is named as the H_SWIR method $$Rrc_{1610_{dns}} - Rrc_{1610_{bkg}} > T_{1610} \text{ and } Rrc_{2202_{dns}} - R_{2202_{bkg}} > T_{2202} \quad \text{(Eq., 4)}$$

where $Rrc_{1610_{dns}}$ is the denoised $Rrc_{1610}$, and $Rrc_{2202_{dns}}$ is the denoised $Rrc_{2202}$. $Rrc_{1610_{bkg}}$ is the estimated background $Rrc_{1610}$, and $Rrc_{2202_{bkg}}$ is the estimated background $Rrc_{2202}$. Normalized and cumulative histograms of the representative *Sargassum*, water, and cloud pixels can be used to determine the optimal thresholds ($T_{1610}$ and $T_{2202}$) to minimize the effect of false identification of *Sargassum*-containing pixels and water-containing pixels as cloud-containing pixels, by setting $T_{1610}$=0.010 and $T_{2202}$=0.008. The threshold difference could be partly due to the sensitivity difference of the corresponding spectral bands used for cloud masking. Such masked pixels can then be dilated outward with a 20×20 window to mask adjacent pixels.

In some examples, a DCNN with both noisy images and "clean" images denoised using TNRD-based denoising as training images can be used. In regions with strong noise, it is often very challenging to manually delineate the real *Sargassum* features, making it difficult to prepare training samples for those noisy regions. As a substitute, MSI FAI images with water-containing pixels (i.e., no *Sargassum*, no clouds) having known noise features may be combined with clean training images with *Sargassum*-containing pixels to simulate noisy data (e.g., including wave-induced glint patterns and cloud residuals). The DCNN may then be trained to detect *Sargassum* in noisy images.

To create typical noise patterns, FAI images can be cropped to 400×400 sub-images, as an example. Water images with various wave and cloud residuals patterns may be chosen. Instead of extracting the features in these "noisy" images, pure noise components of the water images were superimposed on the images with delineated true *Sargassum* features to create simulated "noisy" images for training the DCNN. Clean images were generated by adding the median filtered noise image to the background subtracted *Sargassum* images, while the corresponding noisy images were generated by adding the original noisy water images, as given by equation 5 below:

$$FAI_{clean}=FAI_s+FAI_{water\_clean}$$

$$FAI_{noisy}=FAI_s+FAI_{water} \quad \text{(Eq. 5)}$$

where $FAI_{clean}$ and $FAI_{noisy}$ represent the clean and noisy images, respectively. FAIs is the *Sargassum* image after subtracting the image background. The $FAI_{water\_clean}$ and $FAI_{water}$ are the median filtered noisy water image and the original noisy water image, respectively.

In embodiments herein, *Sargassum* extraction on satellite images can be performed without including an independent denoising process. This is because most noise signals can be ruled out by the DCNN and would not affect the extraction performance.

In the example being discussed, a deep learning framework (e.g., a DCNN as discussed above) combining a U-net structure and a VGG-16-based encoder was designed for *Sargassum* extraction from high-resolution satellite images. This unique architecture is able to capture context, as well as to precisely locate targeted features. Using a pre-trained encoder optimized on the Images-Net dataset can further improve the segmentation performance. Therefore, pre-trained weights (see the purple arrows in FIG. 4) from the VGG-16 model were used for the DCNN. However, in alternative embodiments weights could be tailored for different satellite images and different extraction tasks. The detailed structure is illustrated in FIG. 4. The total number of parameters was 35,120,069, of which 20,397,571 were trainable and 14,722,498 were non-trainable.

The input to the DCNN can be either single-band or multi-spectral images. Because *Sargassum* shows enhanced signals and distinctive spatial patterns on the FAI images, FAI images were selected as the model input to determine the *Sargassum* locations on MSI, OLI, and WV-2 images. For Dove, the three-band RGB images were used as the model input due to the lack of NIR bands. The model outputs pixels forming parts of detected features, i.e., pixels corresponding to areas where *Sargassum* is present in this example.

Example #2

Figure 5A:
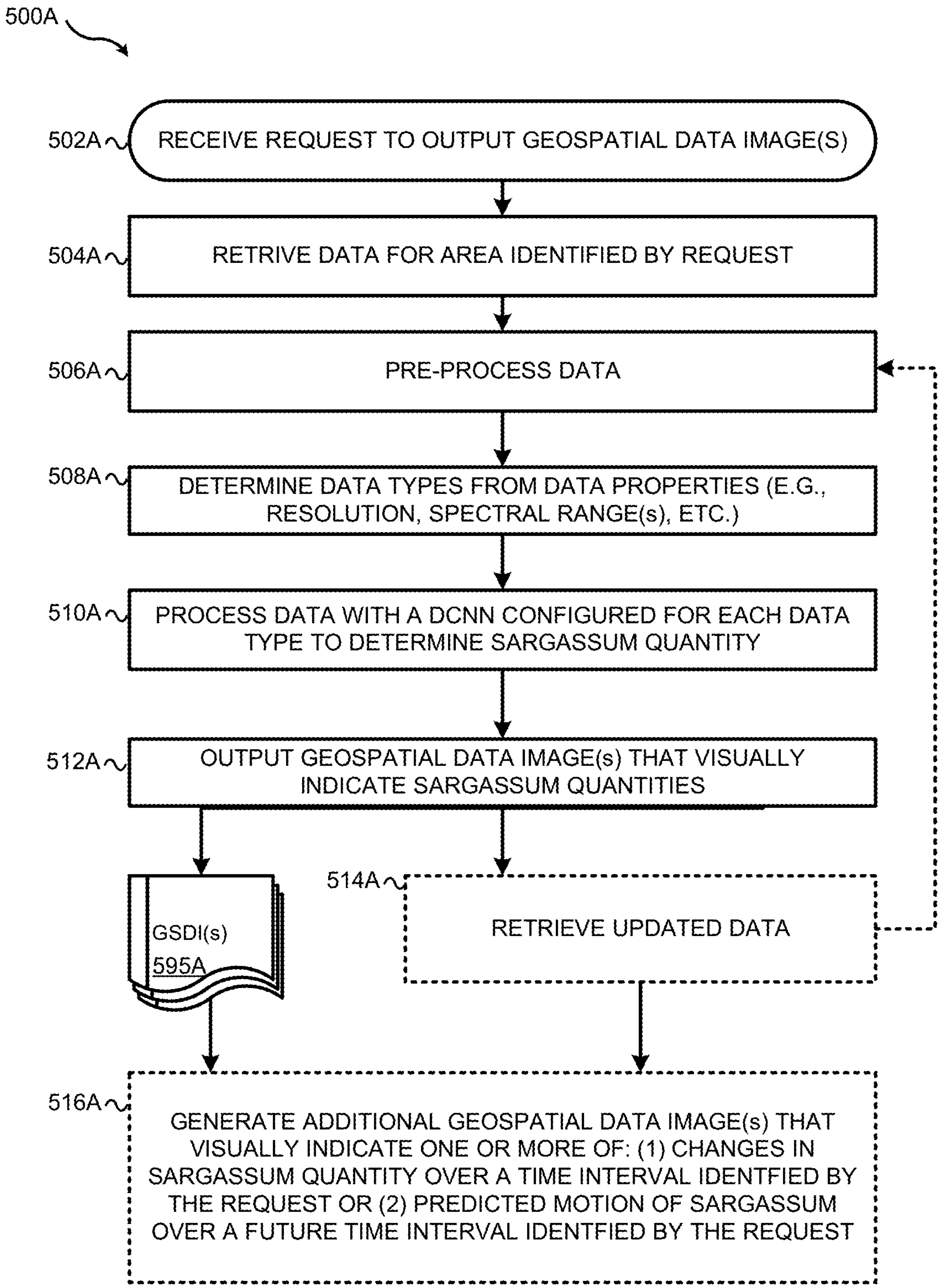
FIG. 5A is a block-level flow diagram illustrating an example method according to embodiments herein.

FIG. 5A illustrates a non-limiting example process 500A according to embodiments herein. The process 500A can be performed by a system such the image analysis system 100 of FIG. 1. At 502A, the process 500A receives a request (e.g., the request 105) to output geospatial data images(s) (e.g., the geospatial data images 195; see the geospatial data images of FIG. 11 as non-limiting examples of geospatial data images showing *Sargassum* concentrations).

At 504A, the process 500A retrieves data for a geographic area identified by the request (e.g., geospatial images 190 for the identified area or other suitable data).

At 506A the process 500A pre-processes the data retrieved at 504A. The pre-processing may include mask pixels in images corresponding to cloud cover and/or correcting pixel values to account for atmospheric scattering and absorption at various wavelengths (e.g., calculating Rayleigh-corrected reflectance values as described above). The pre-process may also include calculating FAI values as described above.

At 508A the process 500A determines one or more data types of the data. As an example, the data received at 504A retrieved for the geographic area may include multiple image types (e.g., from different satellite imaging systems having different imaging characteristics such as spectral ranges, resolution, and so on).

At 510A pre-processed data is provided as input to one or more DCNNs (e.g., DCNNs 115) to determine *Sargassum* quantities indicated by the images. When the input data includes more than one data type, each data type may be provided to a distinct DCNN optimized for that data type.

At 512A the process 500A outputs geospatial data images 590A (e.g., the geospatial data images 195) that visually indicates quantities of *Sargassum* across the geographic region identified by the request. In some embodiments, any other suitable output data may be generated in addition to the geospatial data images or as an alternative.

At 514A, the process 514A optionally retrieves updated data for the geographic region identified by the request and returns to 506A. For example, the data initially retrieved may correspond to a first time period and the updated data may correspond to second time period before or after the first time period.

At 516A, the process generates additional geospatial data images that visually represent results of comparing the geospatial data images 595A generated for the first time period and data for the second time period. As one non-limiting example, the additional geospatial data images may indicate changes in *Sargassum* quantities in the geographic region identified by the request between the first time period and the second time period. As another non-limiting example, the additional geospatial data images may indicate motion of *Sargassum* rafts between the first time period and the second time period and/or predicted motion of the *Sargassum* rafts in the future based on motion between the first time period and the second time period.

Figure 5B:
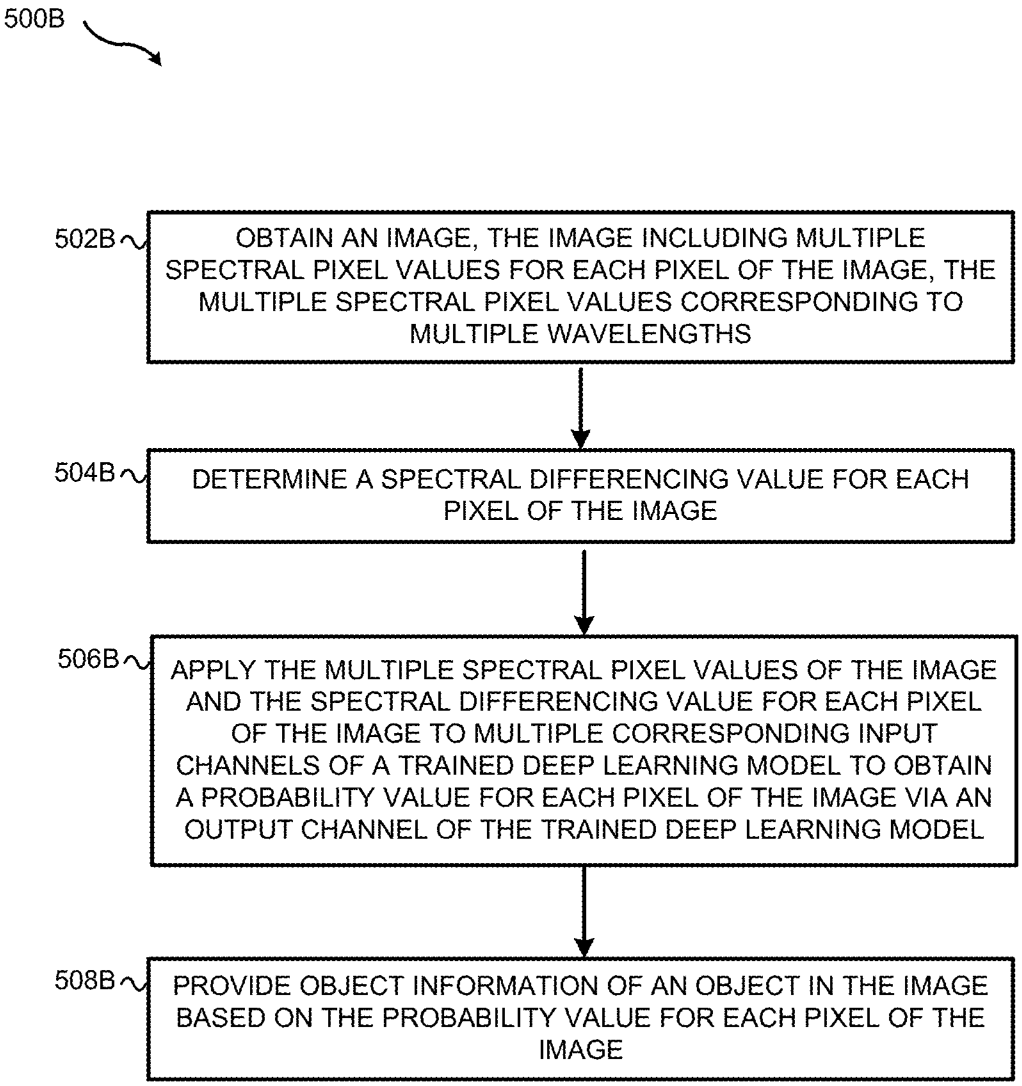
FIG. 5B is a flowchart illustrating an exemplary process for remote object detection in accordance with some aspects of the present disclosure.

FIG. 5B is a flowchart illustrating an exemplary process for remote object detection in accordance with some aspects of the present disclosure. As described below, a particular implementation may omit some or all illustrated features and may not require some illustrated features to implement all embodiments. In some examples, any suitable system, apparatus, or means for carrying out the functions or algorithm described below may perform the process 500B. In further examples, the image analysis system 100 can perform the process 500B.

At step 502B, the system 100 obtains an image. In some examples, the image can include a satellite image including multiple spectral pixel values for each pixel of the image. However, the image can be any other suitable image. In further examples, the multiple spectral pixel values can correspond to multiple wavelengths. In some examples, a wavelength can include a specific wavelength, a band, or a wavelength range between two wavelengths. In further examples, the image can include an object to be detected with the trained deep learning model described blow. The object can be *Sargassum* or other macroalgae, marine debris (i.e., marine litter, both plastic and non-plastic), pollen, sea snot (i.e., marine mucilage), or any other suitable sea floating object.

In some examples, the image can include a preprocessed image. For example, the system 100 can receive an original satellite image collected from a satellite sensor and preprocess the original satellite image to generate the preprocessed image. In some examples, the satellite sensor can include Multispectral Instrument (MSI, 10-60 m), Operational Land Imager (OLI, 30 m), WorldView-II (WV-2, ~2 m), PlanetScope/Dove (Dove, 3 m), Moderate Resolution Imaging Spectroradiometer (MODIS, 250-1000 m) (e.g., mounted on Terra and/or Aqua satellites), Visible Infrared Imaging Radiometer Suite (VIIRS, 375 m-750 m), Ocean and Land Color Instrument (OLCI, 300 m-1000 m), Medium Resolution Imaging Spectrometer (MERIS, 300 m), Hyperspectral Imager for the Coastal Ocean (HICO, 353 m-1080 m), or any other suitable sensor capturing medium or high-resolution satellite images. In even further example, the original satellite image can be obtained from any suitable database (e.g., the USGS EarthExplorer, DigitalGlobe, Planet Labs, etc.).

For some sensors (e.g., MSI, OLI, MODIS, VIIRS, OLCI, MERIS, DOVE, HICO, etc.), the multiple spectral pixel values of the image can include or indicate multiple corrected reflectance values of the processed image corresponding to the multiple wavelengths. For example, the system 100 can preprocess the original satellite image to generate corrected reflectance data (e.g., Rayleigh-corrected reflectance (Rrc($\lambda$), dimensionless)). In some examples, the preprocessing of the original satellite image can be performed (e.g., using ACOLITE, NASA's SeaDAS software, etc.). In further example, each pixel of the image can include multiple corrected reflectance values corresponding to the multiple wavelengths. For example, each pixel of the image can have a first corrected reflectance value (e.g., $R_{rc,\ RED}$) at a first wavelength (e.g., $\lambda_{RED}$=665 nm), a second corrected reflectance value (e.g., $R_{rc,\ NIR1}$) at a second wavelength (e.g., $\lambda_{NIR1}$=865 nm), a third corrected reflectance value (e.g., $R_{rc,\ NIR2\ or\ SWIR}$) at a third wavelength (e.g., $\lambda_{NIR2\ or\ SWIR}$=1610 nm), and/or an any other suitable corrected reflectance value at a suitable wavelength. It should be appreciated that any other suitable corrected reflectance data (e.g., atmospherically corrected surface reflectance) can also be used for the preprocessed image.

For some sensors (e.g., Dove, etc.), the top-of-atmosphere (TOA) radiance data can be directly used to detect a remote object (e.g., *Sargassum* or other macroalgae, marine debris (plastic or non-plastic, pollen, sea snot, etc.). In further examples, the spectral pixel values at RGB wavelengths of the image can be used to detect the remote object.

In further examples, the system 100 can mask first pixels in the image. The first pixels can correspond to a cloud area, a land area in the image, a strong sun glint, or any other invalid observations. In some examples, to mask the first pixels in the image, the system 100 can mask a subset pixel of the first pixels in the image based on when a difference between a first corrected reflectance value at a short-wave infrared (SWIR) or a near-infrared (NIR) wavelength of the multiple wavelengths and a second corrected reflectance value at the SWIR or NIR wavelength is higher than a threshold. In some examples, the NIR wavelength can be a wavelength between 700 nm and 1000 nm while the SWIR wavelength can be a wavelength between 1000 nm and 2200 nm. In other examples, the NIR wavelength can be a wavelength between 700 nm and 2200 nm to include the SWIR wavelength. In further examples, the first corrected reflectance value can include a denoised reflectance value. In further examples, the second corrected reflectance value can include a background reflectance value. For examples, the background reflectance value can include an average of a subset of the image, and the subset of the image can include the subset pixel. For example, cloud pixels can show enhanced signals on in the image and thus is desirable to be masked before applying the remote object extraction process. In some examples, a simple threshold can remove most thick clouds. In other examples, the system can mask clouds by conducting the image segmentation after estimating the scaled reflectance by subtracting background reflectance (e.g., $Rrc_{SWIR_{dns}}-Rrc_{SWIR_{bkg}}>T_{SWIR}$, where $Rrc_{SWIR_{dns}}$ is the denoised $Rrc_{SWIR}$ with Gaussian filtering, and $Rrc_{SWIR_{bkg}}$ is the estimated background value of the $Rrc_{SWIR}$). In some examples, when the image is from OLI data, the SWIR or NIR band centered at 1609 nm can be applied to mask clouds as described above. In further examples, when the image is from Dove data, the system can determine the object presence even under moderately thick clouds. Thus, those pixels with blue radiance greater than a predetermined threshold (e.g., 17 $W \cdot sr^{-1} \cdot m^{-2}$) can be masked. In some examples, the system 100 might not mask nearshore pixels and/or cloud-adjacent pixels in the image. In other examples, the system 100 can mask nearshore pixels and/or cloud-adjacent pixels in the image.

At step 504B, the system 100 determine a spectral differencing value for each pixel of the image. In some examples, the spectral differencing value for each pixel of the image can be used to determine whether the respective pixel contains the object (e.g., *Sargassum* or other macroalgae, marine debris (i.e., marine litter, both plastic and non-plastic), pollen, sea snot (i.e., marine mucilage), or any other suitable sea floating object). The spectral differencing value can be defined as or include:

$$\Delta R=R_T-R_W=[\chi R_{FM}+(1-\chi)R_W]-R_W=\chi(R_{FM}-R_W) \quad \text{(Eq. 6)}$$

where "T" stands for the target pixel, "FM" (floating matter) is for the object, "W" is for water, and $\chi$ (0.0%-100%) is the subpixel proportion of floating matter, $R_T$ is the floating matter surface reflectance at $\chi$=100% (i.e., endmember reflectance), and $R_W$ is the water surface reflectance from pixels nearby the floating matter. In some examples, the wavelength dependence of R can be at least one of red, NIR, or SWIR wavelength. is omitted. In some examples, to be able to stand out in the image, a pixel needs to be significantly different from the surrounding pixels.

In some examples, the spectral differencing value can include a floating algae index (FAI) value. The FAI value can be generated to quantify the enhanced reflectance of the object in the near-infrared (NIR) wavelengths by comparing the nearby RED and another NIR or shortwave-infrared (SWIR) bands. In some examples, to determine the FAI value, the system 100 can determine the FAI value for each pixel of the image based on a difference between a first corrected reflectance value of the multiple corrected reflectance values at a first wavelength of the multiple wavelengths and a second corrected reflectance value at the first wavelength of the multiple wavelengths. In some examples, the first wavelength can include a first near-infrared (NIR)

wavelength. In further examples, the system 100 can determine the second corrected reflectance value at the first wavelength based on a second corrected reflectance value of the plurality of corrected reflectance values at a second NIR wavelength of the multiple wavelengths, and a third corrected reflectance value of the plurality of corrected reflectance values at a red wavelength of the plurality of wavelengths.

For example, the FAI is a measure of the vegetation red-edge reflectance. To minimize the impact of aerosols as well as thin clouds and moderate sun glint, the FAI can be calculated as the reflectance in a NIR band referenced against a baseline formed linearly between two neighboring bands with Equation 1:

$$FAI=R_{rc,NIR1}-R'_{rc,NIR1}$$

$$R'_{rc,NIR1}=R_{rc,RED}+(R_{rc,NIR2}-R_{rc,RED})\times(\lambda_{NIR1}-\lambda_{RED})/(\lambda_{NIR2}-\lambda_{RED}) \quad \text{(Eq. 7)}$$

where $\lambda_{RED}$=665 nm, $\lambda_{NIR1}$=865 nm, and $\lambda_{NIR2}$=1610 nm were selected for MSI data, $\lambda_{RED}$=655 nm, $\lambda_{NIR1}$=865 nm, and $\lambda_{NIR2}$=1610 nm were selected for OLI data, $\lambda_{RED}$=667 nm, $\lambda_{NIR1}$=748 nm, and $\lambda_{NIR2}$=869 nm were selected for MODIS data, $\lambda_{RED}$=671 nm, $\lambda_{NIR1}$=745 nm, and $\lambda_{NIR2}$=862 nm were selected for VIIRS data, and $\lambda_{RED}$=665 nm, $\lambda_{NIR1}$=754 nm, and $\lambda_{NIR2}$=865 nm were selected for OLCI data.

In some examples, for the image from the MSI sensor, the pixels with large $R_{rc1610}$) (>0.10) can be pre-masked to exclude the land and bright cloud pixels and treated as invalid observations (Eq. 8). Similar thresholds were also applied to mask the image from the OLI sensor before the remote object extraction.

$$R_{rc1610}>0.1, R_{rc442}>0.1, \text{ and } R_{rc560}>0.1 \quad \text{(Eq. 8)}$$

In some examples, for the image from the WV-2 sensor, the original satellite image can be processed to generate a top-of-atmosphere (TOA) reflectance value (e.g., centered on 659 nm, 833 nm, and 949 nm) for each pixel of the original image. Then, the system can determine the FAI value based on the TOA reflectance value.

In some examples, the spectral differencing value for each pixel of the image can be used to determine whether the pixel contains a certain type of the object. The system 100 achieves this by comparing the spectral differencing value with a referencing spectral value of each possible object using a spectral angle mapper index (SAM). The SAM can be obtained by:

$$SAM \text{ (degrees)} = \cos^{-1}\left[\left(\sum x_i y_i\right)/\left(\sqrt{\sum x_i^2}\sqrt{\sum y_i^2}\right)\right], \quad \text{(Eq. 9)}$$

where x and y represent two spectra (two different spectral values) and the summation is for band number i from 1 to N. SAM=0° means two parallel spectra in log space (i.e., identical spectral shapes), while SAM=90° means perpendicular spectra (i.e., different types of objects to have different spectral values or shapes). SAM<5° indicates that the two spectra are very similar. In some examples, the SAM can be separately determined separately from the deep learning model At step 506B, the system 100 applies the multiple spectral pixel values of the image and the spectral differencing value for each pixel of the image to multiple corresponding input channels of a trained deep learning model to obtain a probability value for each pixel of the image via an output channel of the trained deep learning model. In some examples, the trained deep learning model can include a U-Net deep learning model. In further examples, the trained deep learning model can include an encoder associated with a VGG16 model and a decoder associated with a U-NET model. In such examples, a sigmoid activation function is used for a final output layer in the U-Net model to produce the probability value for each pixel of the image. In further examples, an original U-Net model is modified to a deep residual U-Net model to take advantage of both the architecture of convolutional neural network and the deep residual learning. For example, for the image from the MODIS sensor, the spectral pixel values in 7 wavelengths (412, 443, 488, 547, 678, 748 and 869 nm) and the spectral differencing value for each pixel of the image can be used as the input of the trained deep learning model to extract the probability value (e.g., *Sargassum* features (pixels)). For VIIRS, the corresponding wavelengths can be 410, 443, 486, 551, 671, 745 and 862 nm. For OLCI, the corresponding wavelengths can be 412, 442, 490, 560, 674, 754, and 865 nm. Because the spectral differencing value is derived from 3 of the 7 bands, one may question whether the use of spectral differencing values in addition to the 7 bands is redundant. A sensitivity test was carried out to verify whether the omission of the spectral differencing values from the model input could lead to similar model performance, and the answer was negative. Therefore, both the spectral differencing value and the multiple spectral pixel values in 7 wavelengths can be as the model input. However, it is not limited to the 7 spectral pixel values in 7 wavelengths and the spectral differencing value as the model input. The input can be less or more than 7 spectral pixel values corresponding to wavelengths with or without the spectral differencing value.

In some examples, the system 100 can further divide the image into multiple sub-images. In some examples, an edge of each sub-image of the multiple sub-images can overlap an adjacent sub-image of the multiple sub-images. In some examples, to apply the multiple spectral pixel values of the image and the spectral differencing value for each pixel of the image, the system 100 can apply the spectral pixel values for each sub-image of the multiple sub-images and the floating algae index value for each sub-image of the multiple sub-images to obtain the probability value for a subset of each sub-image of the plurality of sub-images. In some examples, the subset can exclude an overlap between the respective sub-image and the adjacent sub-image. For example, to use the VGGUnet model or a similar Res-Unet model for the remote object detection, input large satellite images (FAI or RGB) were cut into 416×416 (or other size, depending on memory availability) sub-images. As the prediction accuracy could decrease along image edges, these sub-images were prepared with redundant edges (8 pixels outward on four directions) and only the prediction results from the image center (with 400×400 pixels) were merged back to generate the final extraction results.

In even further examples, the system can obtain extracted feature pixels (e.g., for an image from a Dove sensor) for *Sargassum* on beaches and in nearshore waters. In the examples, to distinguish *Sargassum* on beaches and in nearshore waters, the system can generate base maps to contain three types: water, beach, and non-beach land. In a non-limiting scenario, this can be through a simple K-means unsupervised classification with/without human interpretation on the image. In some instances, the base maps can be used for training a deep learning model to produce outputs including *Sargassum* on beach and *Sargassum* on water.

At step 508B, the system can provide object information of an object based on the probability value for each pixel of the image. In some examples, when the continuous probability value for each pixel of the image is more than 0.5, the respective pixel can be considered a *Sargassum*-containing pixel. In further examples, the probability value for each pixel of the image can be classified into three classes (detected object (e.g., *Sargassum*) pixels, object-free pixels, and invalid pixels. However, it can be classified into less or more than three classes based on the probability value and any suitable thresholds.

In further examples, the trained deep learning model applied to independent sub-images can be used to assess the extraction accuracy using indices such as F1-score, false positive rate (FPR), false negative rate (FNR), Matthews Correlation Coefficient (MCC), and Intersection over Union (IoU), defined in Equation 3-7 below.

$$F1 = 2TP/(2TP + FN + FP), \tag{Eq. 10}$$

$$FPR = FP/(FP + TN), \tag{Eq. 11}$$

$$FNR = FN/(FN + TP), \tag{Eq. 12}$$

$$MCC = \frac{TP * TN - FP * FN}{\sqrt{(TP + FP) * (TP + FN) * (TN + FP) * (TN + FN)}} \tag{Eq. 13}$$

$$IoU = TP/(TP + FP + FN), \tag{Eq. 14}$$

where TP is the number of true positive pixels, FP is the number false positive pixels, TN is the number of true negative pixels, and FN is the number of false negative pixels. The independent images were selected to cover different seasons and regions to make them representative of the entire dataset, and they were not used in the U-net model training.

In some examples, to provide object information, the system can quantify the object in the probability values or the extracted feature pixels. For example, the system can quantify *Sargassum* biomass density in the extracted feature pixels. To quantify *Sargassum* biomass density, the system can estimate the background values (e.g., background FAI values) to account for the reflectance variations of the background water. The background values can be then subtracted to calculate the scaled value (e.g., scaled FAI) to estimate the corresponding biomass density. For the OLI data, the background estimation parameters and the FAI biomass models can be similarly applied, through an iterative median filtering (with a 200×200 window) and the following FAI-biomass model (i.e., $y=22.89x$ for $(0<x\leq 0.05)$ and $y=57.42\ (1.18x-0.06)^2+36.00(1.18x-0.06)+1.17$ for $(x>0.05)$, where x is the OLI FAI values and y is the modeled *Sargassum* biomass density (kg/m$^2$)). In other examples, when the image is collected from Dove or WV-2 sensor, the system can assign 100% subpixel *Sargassum* areal coverage for extracted feature pixels (i.e., *Sargassum*-containing pixels). For example, on the 3-m resolution Dove images, each extracted *Sargassum*-containing pixel was assumed to have 9 m$^2$ of *Sargassum.*

In some examples for monitoring *Sargassum* on beaches and in nearshore waters, some of the beach and nearshore water pixels may be covered by clouds. To minimize such potential biases, the images with >50% cloud coverage over beaches and nearshore waters can be discarded. For the remaining images, the *Sargassum* area can be scaled up using the following equation: $S_{Sargs\_norm}=S_{Sargs}*C$, where $S_{Sargs\_norm}$ is the normalized *Sargassum* area after scaling up to account for cloud coverage, $S_{Sargs}$ is the original *Sargassum* area estimated from extraction results, and C (≥1.0) is the scaling factor calculated from the UDM file, which is equal to the ratio between the total number of beach and water pixels (from the base maps) and those not covered by clouds.

Figure 5C:
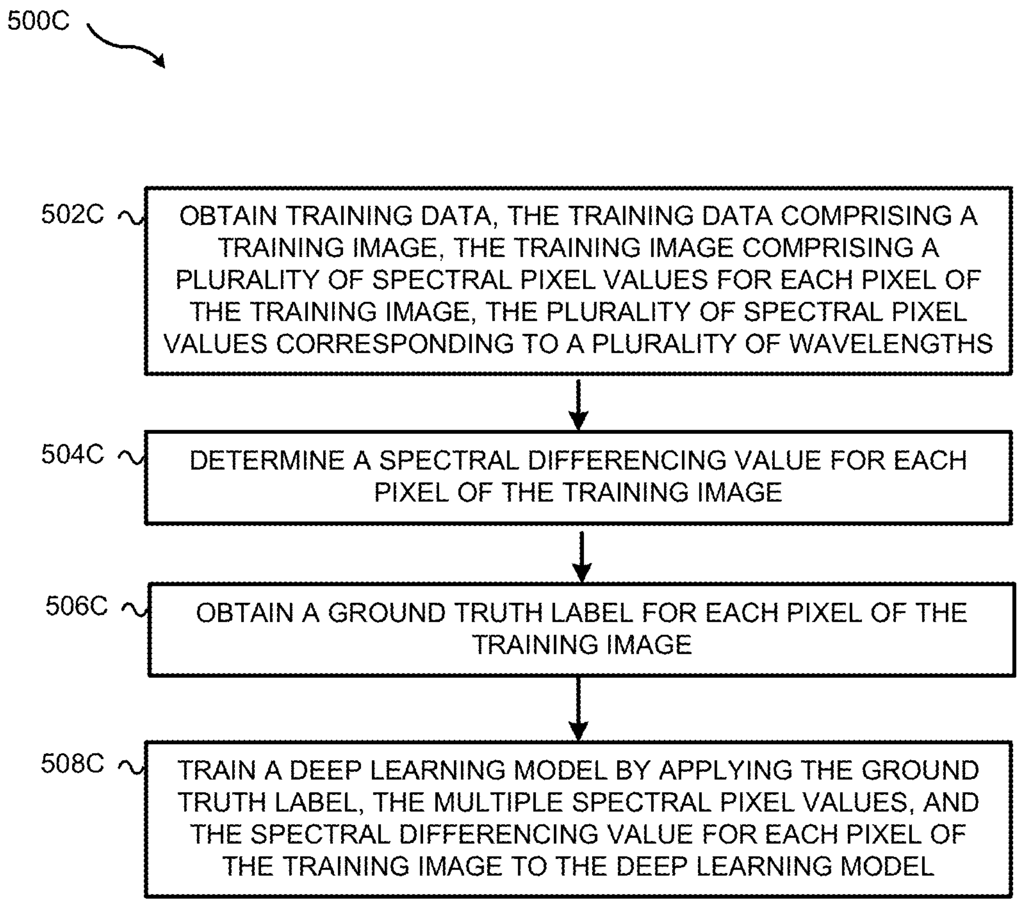
FIG. 5C is a flowchart illustrating an exemplary process for remote object detection training in accordance with some aspects of the present disclosure.

FIG. 5C is a flowchart illustrating an exemplary process for remote object detection training in accordance with some aspects of the present disclosure. As described below, a particular implementation may omit some or all illustrated features and may not require some illustrated features to implement all embodiments. In some examples, any suitable system, apparatus, or means for carrying out the functions or algorithm described below may perform the process 500C. In further examples, the image analysis system 100 can perform the process 500C.

In some examples, steps 502C and 504C can be substantially similar to steps 502B and 504B in FIG. 5B, respectively. In further examples, the system 100 can mask the training image as described in FIG. 5B.

At step 506C, the system 100 can obtain a ground truth label for each pixel of the training image. For example, the system 100 can obtain ground truth labels to corresponding pixels including target objects (e.g., *Sargassum, Ulva, Trichodesmium*, any other suitable macroalgae, sea pollen, sea snot, or marine debris) in the training image. In some examples, the ground truth label can be generated using a semi-automatic IDL feature extraction Graphic User Interface. In further examples, the system can generate a ground truth label by delineating the target pixels using their normalized difference vegetation index (NDVI) values and/or by visually inspecting the spectral shapes and training image.

In some examples, the ground truth labels can include marine debris, pollen, sea snot, floating algae (e.g., *Sargassum, Ulva, Trichodesmium*, etc.), or any other suitable indication. For example, the endmember spectra between the marine debris and the floating algae are different in that various forms of marine debris are all spectrally flat without narrow-band features in the visible NIR wavelengths (400-900 nm) while the floating algae shows the typical reflectance trough around 670 nm due to chlorophyll a absorption. Thus, the prominent difference between marine debris and floating algae can occur between 670 nm and 750 nm: the former is spectrally flat while the latter has a sharp increase in the NIR. Based on the difference between marine debris and floating algae, the ground truth indications can be generated to be used for classification of extracted feature pixels in the training image. In the examples, the training image can be from the MSI sensor and include a Red-Green-Blue and False-color RGB composite image based on Rayleigh corrected reflectance. In the FRGB image, a NIR band can be used to replace the green band in the RGB image, making it suitable to detect *Sargassum* and other floating matters with enhanced NIR reflectance. In some examples, marine debris can be detected using the deep learning model if the number of classification is at least one (e.g., macro algae, marine debris).

At step 508C, the system can train a deep learning model by applying the ground truth label, the multiple spectral pixel values, and the spectral differencing value for each pixel of the training image to the deep learning model. In some examples, the deep learning model is the model used at step 506B in FIG. 5B. Various types of deep learning models may be utilized. For example, the deep learning model can include a VGGUnet model combining a U-net structure with the VGG-16 encoder. However, it should be appreciated that the deep learning model is not limited to the VGGUnet model. The deep learning model can be any suitable recurrent models (e.g., recurrent neural networks ("RNNs"), long short-term memory ("LSTM") models, gated recurrent unit ("GRU") models, Markov processes, reinforcement learning, etc.) or non-recurrent models (e.g., deep neural networks ("DNNs"), deep convolutional neural networks ("DCNNs"), support vector machines ("SVMs"), anomaly detection (e.g., using principal component analysis ("PCA"), logistic regression, decision trees/forests, ensemble methods (e.g., combining models), polynomial/Bayesian/other regressions, stochastic gradient descent ("SGD"), linear discriminant analysis ("LDA"), quadratic discriminant analysis ("QDA"), nearest neighbors classifications/regression, naïve Bayes, etc.). In some examples, the system can obtain extracted feature pixels (e.g., a probability value for each pixel) for the training image from the deep learning model. For example, the deep learning model output can be the extracted feature pixels, which refer to the object-containing pixels (e.g., macroalgae, debris, sea snot, sea pollen, etc.).

The system 100 can reduce a degree of prediction inconsistency between the extracted feature pixels for the training image and the ground truth label of the extracted feature pixels labeled in the training image. For example, the system can determine the similarity between the deep learning model output and the training image. Then, the degree of prediction inconsistency can be calculated. The system 100 can reduce the degree of prediction inconsistency by adjusting parameters of the deep learning model using a loss function. In some examples, the loss function can be calculated based on the degree of prediction inconsistency with a binary cross-entropy term. However, it should be appreciated that any other suitable loss function (e.g., mean square error (MSE), mean absolute error (MAE), likelihood loss, etc.) to reduce the degree of prediction inconsistency can be used. Then, the system can iterate steps 504B-58B with the same training image or different training images.

Figure 6:
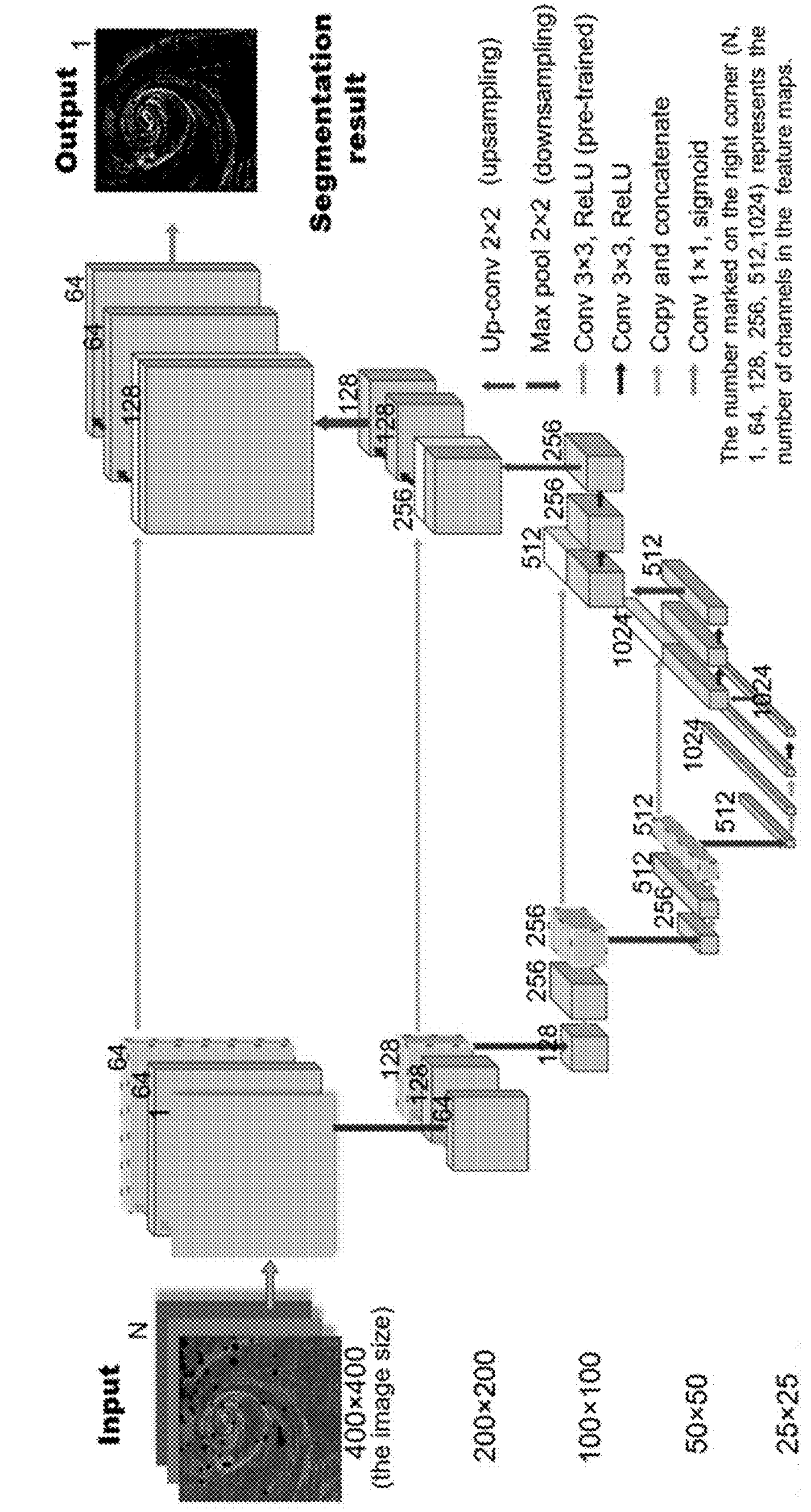
FIG. 6 is a diagram illustrating aspects of image processing using a deep convolutional neural network suitable for use with embodiments herein.

FIG. 6 illustrates an example deep learning model suitable for use in embodiments herein. The DCNN show has a U-shaped architecture with of a contracting path (left side) and an expansive path (right side).

Each blue cube represents a multichannel feature map. The white cubes represent the copied feature maps (indicated by the yellow dashed lines and the gray arrows). The image size in each of the 5 rows is marked in the first column (e.g., 100×100). The number of channels of each feature map is annotated on the upper right corner. For example, the N marked on top of the input image means that there are N spectral bands in the input image and the 1 marked on top of the output image means that there is only one channel in the output layer. Batch normalization was applied to normalize each convolutional block. The Rectified Linear Unit (ReLU) was used as the primary activation function. The sigmoid activation function was selected in the final output layer to determine the segmentation results. Note that the model input is flexible, where multispectral data can be used.

To optimize the DCNN model for the specific feature extraction tasks, the corresponding training datasets (consisting of the input images and the segmentation results), were prepared. Here, the ground truth of the *Sargassum* extraction results were generated using a semi-automatic IDL feature extraction Graphic User Interface. A total of 3,289 sub-images were prepared for MSI FAI images (from 14 MSI image tiles), 1,444 sub-images were selected for OLI FAI images (from 4 OLI image scenes), 682 sub-images were selected for WV-2 FAI images (from 3 WV-2 images), and 1791 sub-images were prepared on Dove RGB images (from 12 Dove images). These extraction results were cut into 400×400 sub-images to train the extraction model. Because there are already sufficient training images prepared for each sensor under various conditions, data augmentation techniques were not used.

During model optimization, the Jaccard Index (JI, Eq. 15) was monitored to determine the similarity between the model outputs and the training data:

$$JI(y_{pred}, y_{true}) = \frac{1}{n}\sum_{i=1}^{n} \frac{y_{pred} \cdot y_{true} + \text{smooth}}{y_{pred} + y_{true} - y_{pred} \cdot y_{true} + \text{smooth}} \qquad \text{(Eq. 15)}$$

where $y_{pred}$ is the continuous prediction probability values ($y_{pred} \in [0, 1]$) and $y_{true}$ is the binary values from the ground-truth results ($y_{true} \in \{0, 1\}$). The smooth term is 1. Then, the degree of prediction inconsistency can be defined as the Jaccard Distance shown in Eq. 16:

$$JD(y_{pred}, y_{true}) = -\log JI(y_{pred}, y_{true}) \qquad \text{(Eq. 16)}$$

Because image segmentation can be a one class classification problem, the loss function L was defined as the JI after adding the binary cross-entropy term H, as in Eqs. 17 and 18:

$$H(y_{pred}, y_{true}) = \frac{1}{n}\sum_{i=1}^{n} (y_{pred}\log(y_{true}) + (1 - y_{pred})\log(1 - y_{true})) \qquad \text{(Eq. 17)}$$

$$L(y_{oreed}, y_{true}) = H(y_{pred}, y_{true}) + JD(y_{red}, y_{true}) \qquad \text{(Eq. 18)}$$

The Adaptive Moment estimation (adam) optimizer was applied for model optimization The initial learning rate was 0.001. When the loss function failed to improve after two consecutive epochs, the learning rate would then be reduced by 20% for finer tuning. In experiments, all models were trained for 200-300 epochs as stable performance was often achieved by that time, with high JI values in the training and validation dataset. Table II summarizes the estimated training time used on each dataset. In all four cases, the models can be effectively optimized within 24 hours.

Table II shows the approximate training time of a DCNN model (e.g., as described in connection with FIG. 6) used on the high-resolution training images. Here all the sub-images are 400×400 pixels. The number in the bracket indicates the number of original images that these sub-images were selected from. In this paper, the experiments were conducted on the same PC with Intel® Core(™) i9-9900 CPU @ 3.30 GHz and a NVidia GeForce RTX 2080 Ti GPU. Here, the batch size of 6 was used in model training due to limited memory availability.

TABLE II

| Data | MSI | OLI | WV-2 | Dove |
|---|---|---|---|---|
| Number of sub-images selected for training | 3289 (14) | 1444 (4) | 682 (3) | 1791 (12) |
| Batch size | 6 | 6 | 6 | 6 |

TABLE II-continued

| Data | MSI | OLI | WV-2 | Dove |
|---|---|---|---|---|
| Number of epochs trained | 200 | 200 | 300 | 300 |
| Average running time per epoch | 257 s | 104 s | 48 s | 102 s |
| Model training time | 14.3 hours | 5.8 hours | 4.0 hours | 8.5 hours |

To use DCNN models described herein for *Sargassum* detection in an example large satellite input images (FAI or RGB) are partitioned into 416×416 sub-images. Since prediction accuracy may decrease along image edges, these sub-images were prepared with redundant edges (8 pixels outward on four directions) and only prediction results from the image centers (400×400 pixels) were merged back to generate the final extraction results To quantify *Sargassum* biomass density, background FAI values were first estimated to account for the reflectance variations of the background water. The background FAI values were then subtracted to calculate the scaled FAI to estimate the corresponding biomass density. For the OLI data, the background estimation parameters and the FAI-biomass models were similarly applied, through an iterative median filtering (with a 200×200 window) and the following FAI-biomass model according to the following equations:

$$y=22.89x \text{ for } (0<x\leq 0.05)$$

and $$y=57.42(1.18x-0.06)^2+36.00(1.18x-0.06)+1.17 \text{ for } (x>0.05) \quad \text{(Eq. 19)}$$

where x is the OLI FAI values and y is the modeled *Sargassum* biomass density (kg/m$^2$).

Figure 7:
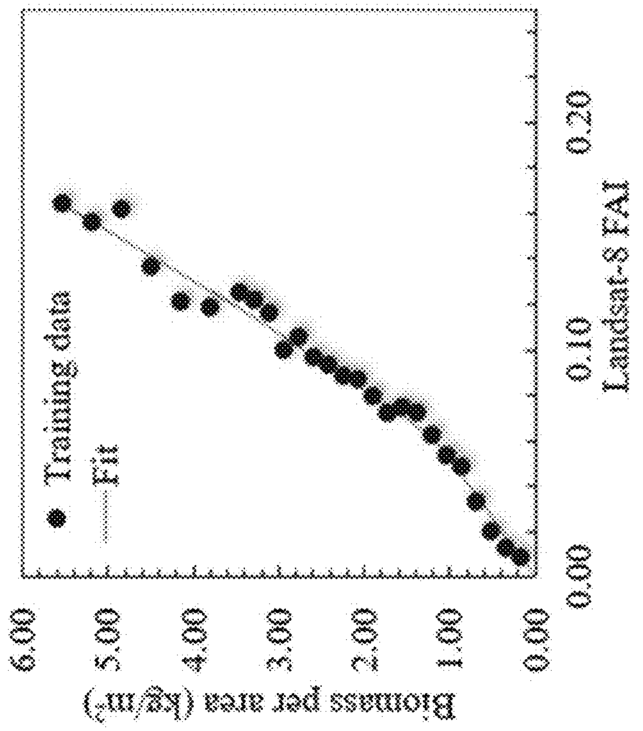
FIG. 7 depicts comparisons between simulated FAI and in situ OLI FAI, and between biomass areal density and in situ OLI FAI.
Figure 7:
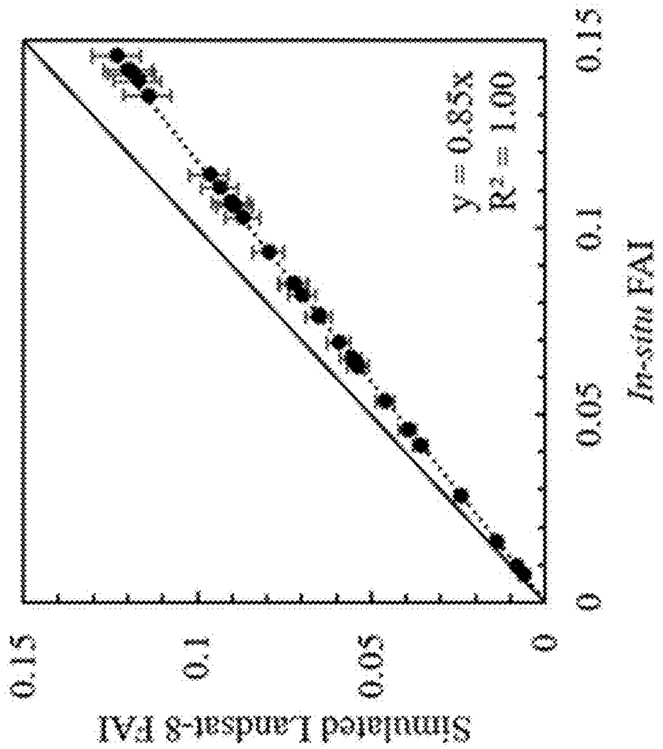

FIG. 7A shows a comparison between in situ FAI and OLI FAI, which was simulated by propagating in situ FAI to OLI FAI with aerosol optical thickness at 869 nm, $\tau_a(869)=0.10$, averaged under different aerosol types and viewing geometry. The solid line is the 1:1 line and the dashed line is the fitted line. The standard deviations of the simulated FAI are indicated by the vertical error bars. (b) *Sargassum* biomass density (kg/m$^2$) versus in situ OLI FAI. FIG. 7B shows estimated biomass as a function of in-situ FAI calculated as described above.

Considering the high spatial resolution of Dove and WV-2 and the difficulties of conducting accurate biomass quantification, all the *Sargassum*-containing pixels extracted on these two sensors were assigned 100% *Sargassum* areal coverage. For example, on the 3-meter resolution Dove images, each extracted *Sargassum*-containing pixel was assumed to have 9 m$^2$ of *Sargassum.*

To compare with the Dove-derived *Sargassum* measurements, the *Sargassum* areal coverages derived from OLI and MSI were quantified through linear unmixing using a full coverage threshold. Those pixels with biomass densities lower than the threshold were linear unmixed to calculate the fractional coverage, while pixels with higher biomass densities were treated to have 100% *Sargassum* coverage (i.e., 900 m$^2$ for a 30-m OLI *Sargassum*-containing pixel and 100 m$^2$ for a 10-m MSI *Sargassum*-containing pixels). The full coverage thresholds were selected to be the biomass densities when FAI equals to 0.05 (the turning point of changing from linear to nonlinear relationships in the FAI-biomass model), and the values for the Sentinel-2A MSI, Sentinel-2B MSI, and Landsat-8 OLI data are 0.96, 1.24, and 1.17 kg/m$^2$, respectively. For MODIS data, the areal coverages were estimated, where a linear unmixing was performed by referencing the FAI value to a local upper bound (representing 100% *Sargassum* coverage within a pixel) and lower bound (representing 0% *Sargassum* coverage within a pixel).

Example Results

Figure 8:
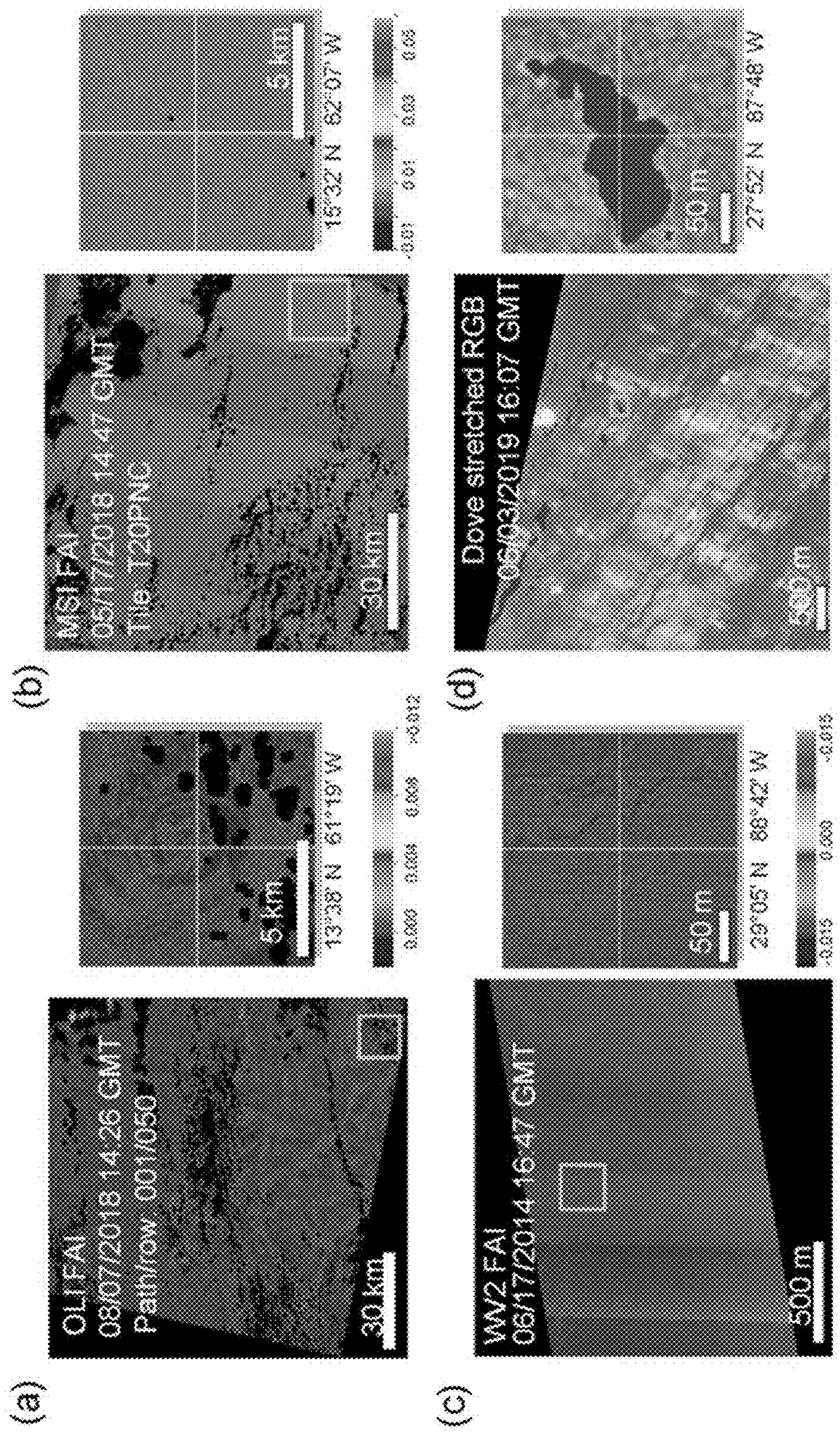
FIG. 8 depicts the geospatial images of FIG. 2 transformed according to embodiments herein into geospatial data images indicating *Sargassum* features.

Extraction accuracy of a one embodiment was validated using a separate group of representative MSI, OLI, Dove, and WV-2 images. The extraction results were then compared with the manually extracted "ground truth" features to generate the corresponding F1 score. FIG. 8 illustrates the *Sargassum* extraction results from the high-resolution satellite images shown in FIG. 3. From visual inspection, satisfactory performance was achieved: no apparent noise signals were misidentified as *Sargassum* features (i.e., low false positives), and the *Sargassum*-containing pixels were mostly detected (i.e., low false negatives). The extraction accuracy from individual sensors is listed in Table III, including their false positive rates, false negative rates, precision, recall, and F1 score.

On MSI FAI images, the overall *Sargassum* extraction accuracy, after weighting by the biomass density, is ~90%, which is an improvement over an alternative *Sargassum* extraction method based on a Trainable Non-linear Diffusion Reaction (TNRD) approach (86%). Most of detection errors (either false positives or false negatives) are from pixels of relatively low biomass densities. The precision and recall rates are both >85%, suggesting that most of the *Sargassum*-containing pixels can be accurately detected, and most detected candidate pixels contain *Sargassum.*

On most OLI FAI images with large *Sargassum* coverages, the extraction accuracy is >95% in terms of *Sargassum* biomass densities. The precision and recall rates are both higher than those from the MSI FAI images. The higher accuracy is likely due to the larger pixel size and less noise interference (such as wave glitters) than found in MSI FAI images.

Due to the higher spatial resolution and larger image size, for WV-2 FAI images and Dove RGB images, only a limited number of images were selected to evaluate the extraction accuracy. The areal coverage (as opposed to biomass density) was used to evaluate the accuracy. Table III shows that the accuracy for WV-2 is almost perfect (F1 score=0.98). Even with three spectral bands in the visible wavelengths, Dove images still show satisfactory performance, with F1 score greater than 0.8.

Overall, when evaluated using similar image types (i.e., using the same satellite image sensor), the example embodiment being discussed achieved an F1-score of ≥0.90 except for the 3-band Dove images. Even for these images, which exclude the NIR bands, the F1-score is still 0.82, demonstrating that embodiments disclosed herein are suitable for performing automatic identification and quantification of *Sargassum* in aerial imagery such as satellite images. Table III below shows *Sargassum* extraction accuracy on MSI, OLI, WV-2, and Dove images using the methods described herein. Note that for Dove and WV-2 data, the pixel coverage was used to evaluate the accuracy, while for MSI and OLI, the biomass density was compared. Here the number of images means number of original images, not the 400×400 sub-images.

TABLE III

| | # Images | Mean pctg. of valid observations | False pos. | False neg. | Precis. | Recall | F1 score |
|---|---|---|---|---|---|---|---|
| MSI | 10 | 77% | 0.05 | 0.15 | 0.95 | 0.85 | 0.90 |
| OLI | 8 | 50% | 0.06 | 0.11 | 0.94 | 0.90 | 0.92 |
| Dove | 2 | 57% | 0.38 | 0.04 | 0.72 | 0.96 | 0.82 |
| WV-2 | 1 | 100% | 0.01 | 0.04 | 0.99 | 0.96 | 0.98 |

Figure 9:
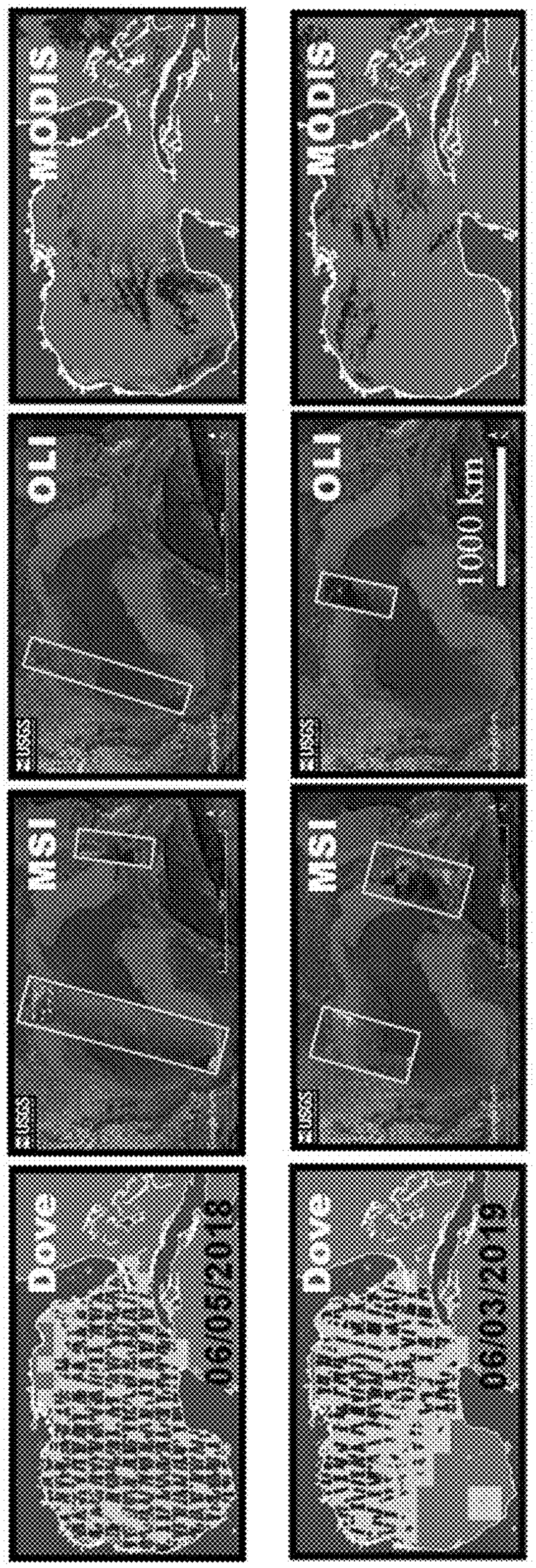
FIG. 9 depicts a comparison of daily coverages of satellite images collected by Dove, MSI, OLI, and MODIS sensors on two different dates.

Using systems and method disclosed herein on high-resolution imagery allows quantification of how much *Sargassum* is likely to go undetected when coarse-resolution satellite sensors such as MODIS are used as the source of image data. FIG. 9 is a comparison of daily coverages of the data collected by Dove, MSI, OLI, and MODIS sensors on 5 Jun. 2018 (top row) and on 3 Jun. 2019 (bottom row). The purple to blue color and the yellow boxes highlight the areas where Dove, MSI, OLI, or MODIS has valid measurements. As shown in FIG. 9, the 3-m Dove images have much higher daily coverage over the GOM than other high-resolution sensors. Indeed, the PlanetScope constellation provides the only data source to cover the entire GOM nearly every day at 3-meter resolution.

Figure 10:
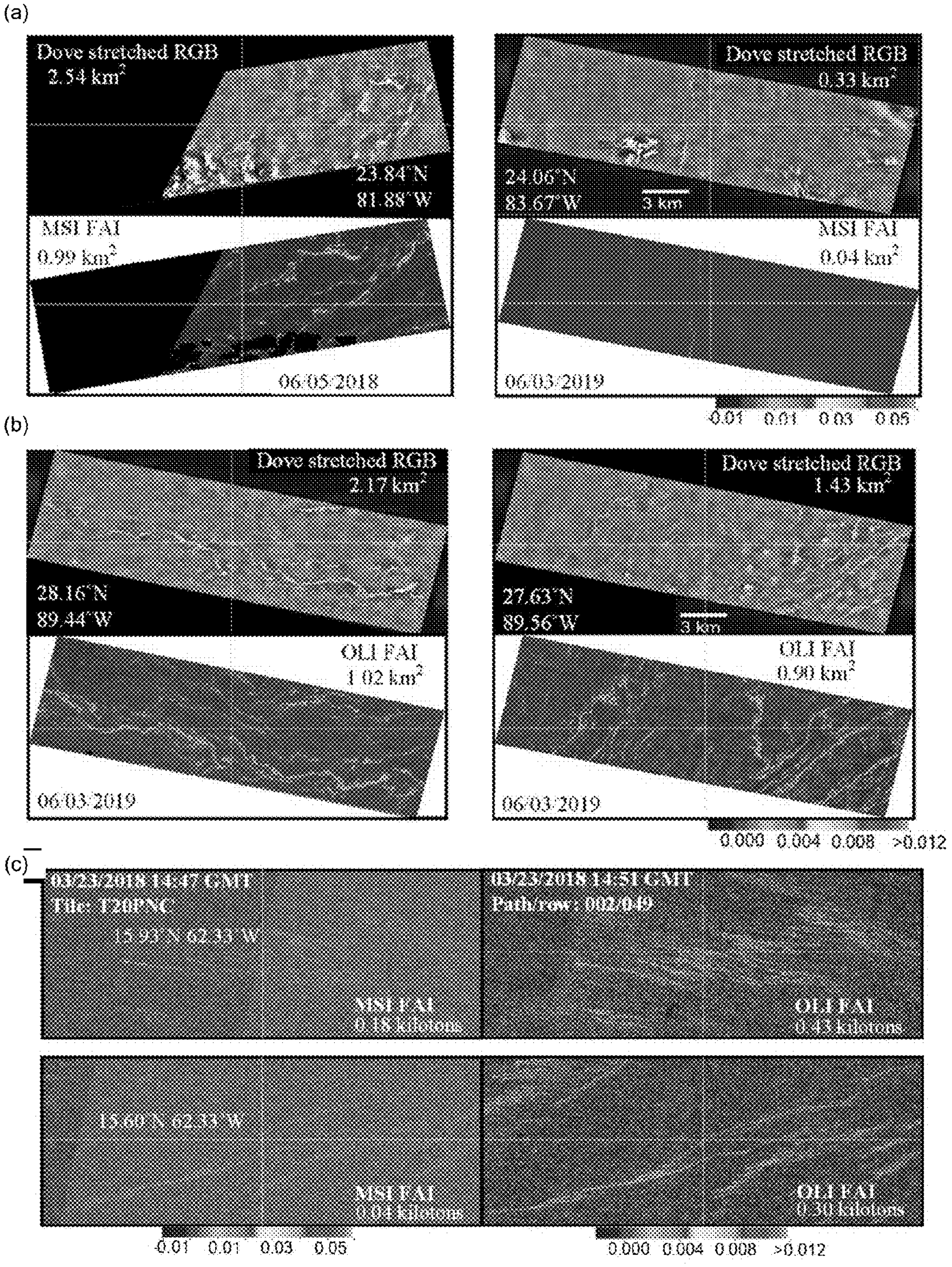
FIG. 10 depicts comparisons of image characteristics of quasi-simultaneous MSI, OLI and Dove image pairs.

FIG. 10 shows comparisons of image characteristics of quasi-simultaneous MSI, OLI and Dove image pairs, where the MSI and OLI images are cropped to match the same-day Dove images. The Dove images are color stretched using a contrast limited adaptive histogram equalization to enhance the contrast between *Sargassum* features and background water. The center coordinates and the extracted *Sargassum* biomass or areal coverages are labeled on the corresponding images.

As shown in FIG. 10, nearly all *Sargassum* features extracted from MSI and OLI images are clearly revealed in the corresponding Dove images, therefore, *Sargassum* extraction results from the 12,024 Dove images collected over the GOM on 3 Jun. 2019 and 5 Jun. 2018 were used as the truth to evaluate the extraction uncertainties from MODIS, MSI, and OLI images collected from the same locations and same day as the Dove images.

Figure 11:
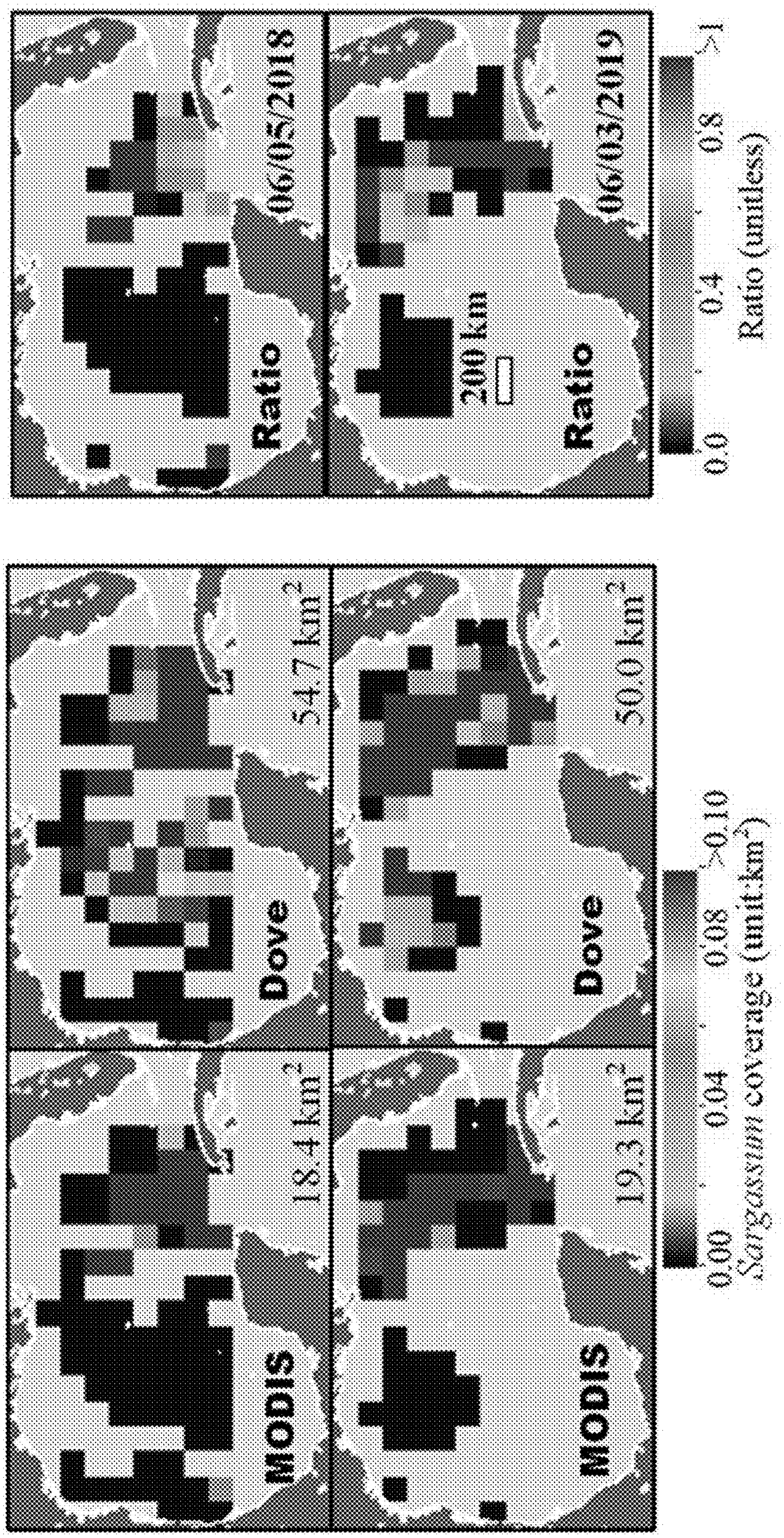
FIG. 11 depicts geospatial data images generated according to embodiments herein representing the spatial distributions of *Sargassum* abundance in the same geographic region in 1° grids on two different days. To have an apples-to-apples comparison, the results shown in each grid are from the common areas where both sensors have valid measurements

FIG. 11 shows the spatial distributions of *Sargassum* abundance in each 1° grid over the two days. To have an apples-to-apples comparison, the results shown in each grid are from the common areas where both sensors have valid measurements. The ratio between the two sensors (MODIS/Dove) on their estimated *Sargassum* abundance in each grid from their common areas is also shown in FIG. 11. From the ratio images, it is clear that, in most cases, MODIS estimates are lower than Dove estimates (i.e., ratio<1.0), especially in the western GOM when the *Sargassum* amount is relatively low. In the eastern GOM where both sensors show higher *Sargassum* amounts than in the western GOM, MODIS estimates can occasionally exceed Dove estimates, likely due to mismatch between the two measurements over the fast-moving *Sargassum* features under the influence of the Loop Current. Overall, from their common valid areas, on 5 Jun. 2018 Dove detected ~54.7 $km^2$ of *Sargassum,* ~200% greater than the MODIS detection (~18.4 $km^2$). On 3 Jun. 2019, Dove detected 50.0 $km^2$ of *Sargassum,* ~160% more than the MODIS detection (19.3 $km^2$).

Figure 12:
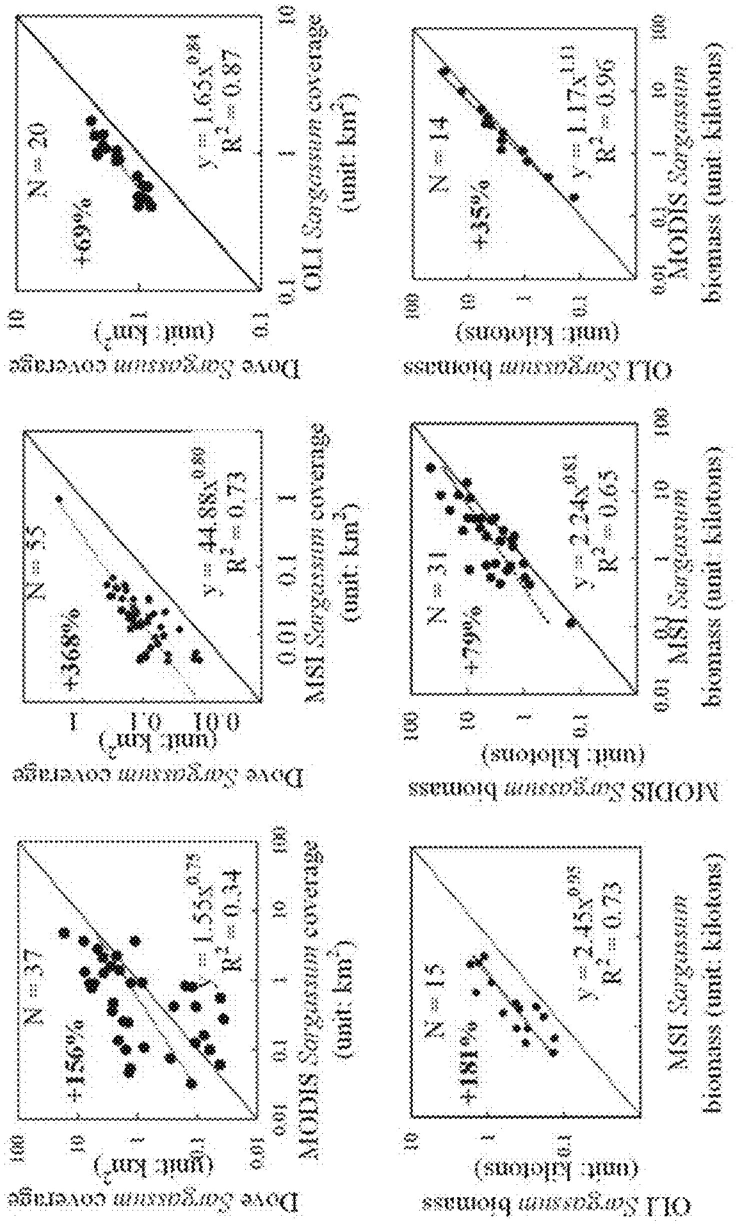
FIG. 12 depicts comparisons of *Sargassum* biomass or coverages estimated from quasi-simultaneous MODIS, MSI, OLI, and Dove image pairs according to embodiments herein.

FIG. 12 shows comparisons of *Sargassum* biomass or coverages estimated from quasi-simultaneous MODIS, MSI, OLI, and Dove image pairs. Each dot represents the result from one pair of images. The black lines are the 1:1 lines, while the dotted blue lines are the linear fits in log space. The number of image pairs and the fitted equations are marked on the corresponding scatter plots. The relative differences (i.e., (y−x)/x) of the total *Sargassum* amount estimated from the two sensors in all the matching points are labeled in blue The underestimation resulting from the use MODIS image data can also be quantified statistically, as shown in FIG. 12A. Based on an average of 37 1° grids, using Dove image data produced *Sargassum* estimates 156% higher than estimates using MODIS image data. Although the precise amounts may vary across different grids, these comparisons clearly show that, on average, *Sargassum* estimates using MODIS image data represent a lower bound and that actual *Sargassum* quantities may be >150% of those estimated using MODIS image data.

Similar comparisons can also be obtained between Dove and MSI image data, and between Dove and OLI image data for common valid areas (FIG. 12B, and FIG. 12C). Even without NIR bands, estimates based on Dove image data consistently resulted in estimates of *Sargassum* 368% greater than those based on MSI image data and 69% larger than those based on OLI image data. The difference between Dove and OLI is lower than between Dove and MSI, suggesting that OLI can detect more *Sargassum* than MSI. Indeed, FIG. 12C and FIG. 12D both show that the matching *Sargassum* features are more "detectable" on the OLI FAI than on the MSI FAI. This is mostly attributed to the higher SNRs of the OLI NIR bands. If summed up over all the matching image pairs, the total *Sargassum* coverage derived from Dove is 10.0 $km^2$, ~368% higher than the MSI estimates (2.1 $km^2$). Similarly, the total *Sargassum* coverage derived from the matching Dove images is 29.1 $km^2$, ~70% larger than the OLI estimates (17.2 $km^2$).

The MSI and OLI images were also compared with MODIS observations to evaluate the cross-sensor uncertainties in *Sargassum* estimates. Forty-five MSI images (tile: T20PNC) and fourteen OLI images collected in 2018 near the Lesser Antilles Islands were compared with the same-day MODIS measurements over their common valid areas. The total *Sargassum* biomass in the match-up areas from MODIS and MSI or OLI were summarized in FIGS. 12E-12F.

Overall, the relationship between MSI and MODIS is less clear ($R^2$=0.65, FIG. 12E) than between OLI and MODIS ($R^2$=0.96, FIG. 12F) or between MSI and OLI ($R^2$=0.73, FIG. 12D). The data spread in the MSI-MODIS relationship can be the observations for a different region and a different extraction methods using MSI images. The potential reasons behind the data spread could be related to the finer MSI spatial resolution and the false-negative detection of small *Sargassum* features on MSI images. In contrast, the *Sargassum* estimates from OLI and MODIS are very consistent ($R^2$=0.96, FIG. 12F), although the biomass estimated from OLI is mostly higher than from MODIS. If summed up from the listed matching image pairs, OLI detected 74.7 kilotons of *Sargassum,* ~35% higher than the MODIS estimates (55.2 kilotons).

Figure 13:
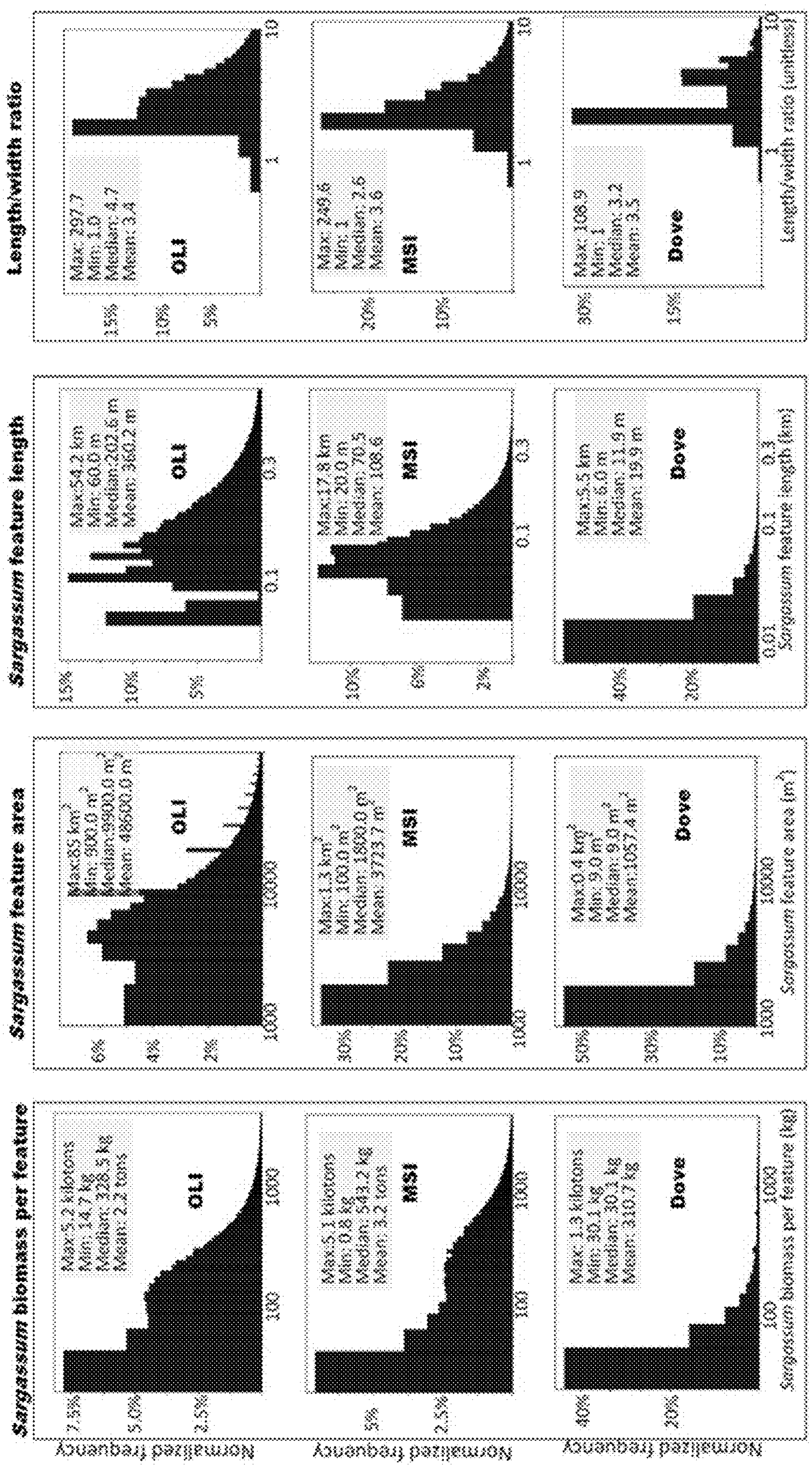
FIG. 13 depicts characteristics of individual *Sargassum* features derived from OLI (N=16), MSI (N=22), and Dove (N=4,375) images represented by geospatial data images generated according to embodiments herein.

Size, Biomass, and Morphology of *Sargassum* Features Observed from MSI, OLI, and Dove Images In addition to *Sargassum* abundance and distribution, characteristics of individual *Sargassum* features are also important for a number of reasons, for example to help implement plans for physical removal. This example uses the following parameters to characterize individual features: biomass (kg), size ($m^2$), length (m), and length/width ratio. FIG. 13 shows that these parameters differ among the three sensors. Here, 22 MSI and 16 OLI images collected near the Lesser Antilles Islands (tile T20PNC and path/row: 001/050) and 4,375 Dove images collected in the GOM on 3 Jun. 2019 were used to characterize *Sargassum* features. The feature morphology (size, length, length/width ratio) was calculated after applying a morphological close operation using a 3×3 pixel window. Then, for MSI and OLI, biomass of each feature was estimated using the corresponding FAI-biomass model. For Dove image data, biomass of each feature was estimated from the areal coverage after applying an empirical conversion factor of 3.34 kg/$m^2$.

FIG. 13 shows characteristics of individual *Sargassum* features derived from OLI (N=16), MSI (N=22), and Dove (N=4,375) images. For each dataset, the normalized distributions of *Sargassum* biomass per feature, feature size, feature length, and length/width ratio are plotted. The maximum, minimum, median, and mean values are annotated on the corresponding plots.

As shown in FIG. 13, the number of *Sargassum* features decreases sharply with increasing size and biomass. Although the size and length of average features from OLI are both much higher than from MSI, the average biomass per feature is rather similar between the two sensors, suggesting that that biomass density in the "extra" *Sargassum* area in OLI images (compared to MSI images) is rather low. This is because of the higher SNRs of OLI than MSI. Overall, with finer resolution, Dove-detected *Sargassum* features are much smaller, and their corresponding biomass per feature is also much lower. Because of the finer resolution, these characteristics are closer to the truth than those estimated from OLI or MSI. In contrast, regardless of the resolution, *Sargassum* are consistently observed as elongated features with mean length/width ratios of 3-5.

Figure 14:
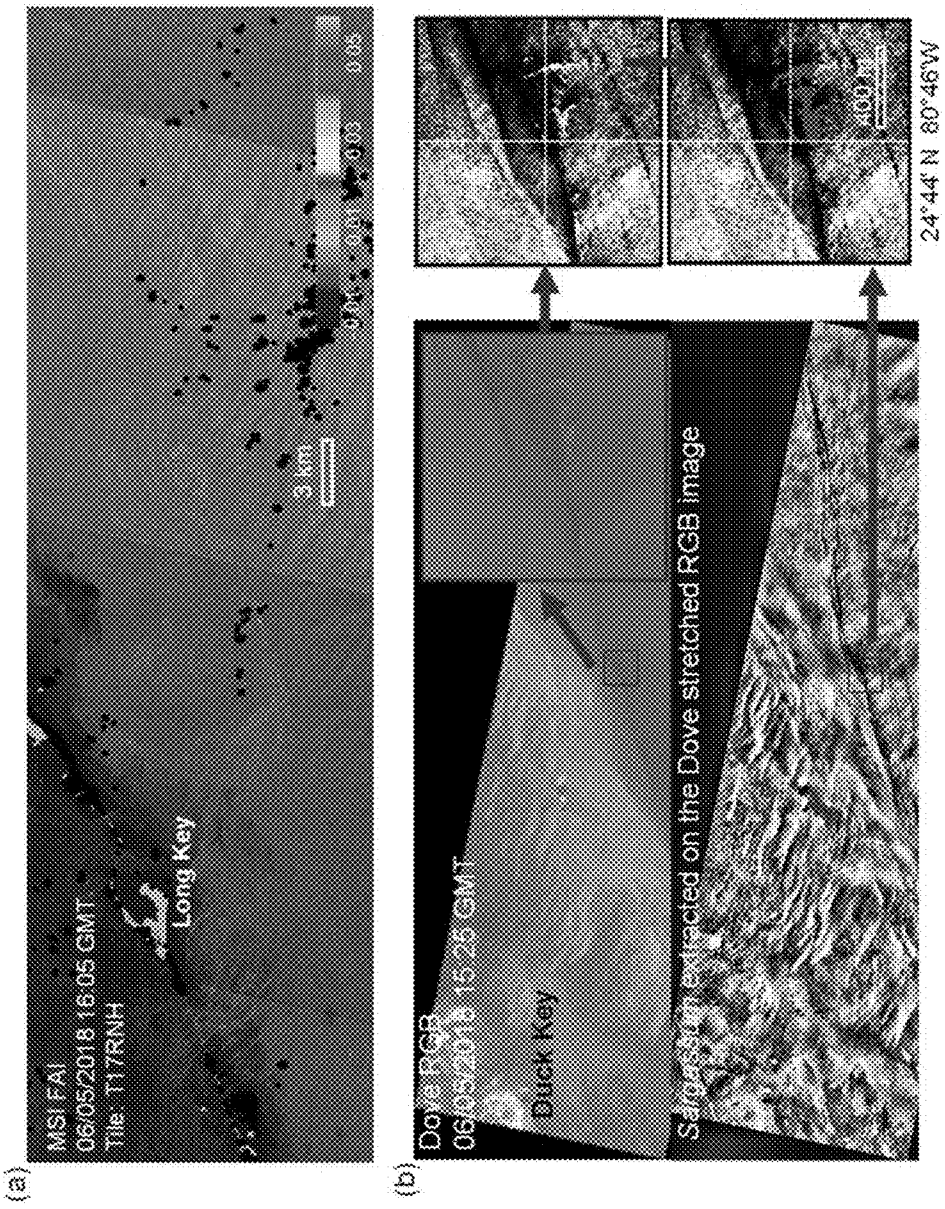
FIG. 14 shows *Sargassum* features extracted from high-resolution MSI and Dove images near the coast of Florida Keys according to embodiments herein.

FIG. 14 shows *Sargassum* features extracted from high-resolution MSI and Dove images near the coast of Florida Keys. FIG. 14(*a*) MSI FAI image near Long Key in the Florida Keys, with *Sargassum* extraction results overlaid in red. A portion of this image is shown in FIG. 2. FIG. 14(*b*) shows Dove RGB and stretched RGB images on the same day of the MSI image near Duck Key in the Florida Keys. The sub-images to the right are the Dove stretched RGB images enlarged from the red box, where *Sargassum* extraction results are overlaid in red. The central coordinates of the sub-image are labeled below the image

Discussion

Because of the large spatial and temporal coverages, satellite remote sensing is perhaps the most reliable technique to observe large-scale *Sargassum* distributions and long-term changes. However, because many *Sargassum* clumps or rafts are small and moving in the ocean, it is nearly impossible to measure *Sargassum* size and biomass in the field to match satellite pixels, and therefore it is extremely difficult to validate satellite estimates in a quantitative way through field measurements.

Assuming that high-resolution sensors may provide estimates closer to the "truth", one way to quantify uncertainties in coarse-resolution estimates is through comparison of the two. The PlanetScope constellation is the only data source at 3-m resolution with daily coverage of the entire GOM, thus providing an excellent opportunity to evaluate uncertainties in the *Sargassum* estimates from coarse-resolution sensors. Using 12,024 Dove images as the reference, it was determined that all MODIS, MSI, and OLI sensors underestimated *Sargassum* coverage and biomass. Overall, Dove showed at least ~150%, ~360%, and ~70% more *Sargassum* than MODIS, MSI, and OLI, respectively.

The same argument also applies to Dove images, as some small *Sargassum* features may still be undetected in the 3-m Dove images. For this reason, the Dove estimates are not the "truth" itself, but can only be regarded as being closer to the "truth". In fact, Dove estimates should only represent a lower bound of the true (actual) *Sargassum* abundance in the natural environment. In future studies, sensors with higher resolution or higher SNRs than Dove may be explored further to push the limit of satellite remote sensing of *Sargassum* and other macroalgae.

The ability of systems and methods herein to process 3-band Dove images and other high-resolution images enables many of the detection improvements described. Otherwise, due to the lack of spectral bands in the NIR wavelengths it is nearly impossible to extract accurate *Sargassum* features from the 12,025 images where confusion features such as clouds and cloud shadows are often found. Compared to the traditional methods, the deep learning techniques suitable for use in embodiments herein have the advantages of being a fast and reliable way to interpret vast amounts of satellite data. Using a unique network structure, systems, and methods disclosed herein show robust performance even with limited spectral bands, large background variations, and various confusing targets. This is especially important for high-resolution images where "noise" is highly variable, for example on the Dove images. It is also noted that even when there are small errors in the training data, methods disclosed herein can still be optimized to achieve satisfactory performance without bias. This is attributed to the training that utilizes not only the spectral information, but also spatial context.

Another advantage of systems and methods disclosed herein is flexibility. As illustrated by the examples above, systems and methods disclosed herein are easy to adapt to different type of satellite data or features. For instance, the input image data can be either single-band (e.g., FAI) or multispectral (e.g., RGB) images, depending on the specific feature characteristics. Furthermore, when appropriately trained, deep learning models disclosed herein can be trained to detect other image features that are not *Sargassum* such as clouds and oil slicks). Moreover, the extraction models described have no lower threshold for detecting *Sargassum* features. The decision is purely made with the optimized model weights learned from the training processes. This reduces the potential for bias that results from the selection of extraction thresholds when traditional threshold-based segmentation methods are used.

Near Real-Time *Sargassum* Monitoring and Tracking in Nearshore Waters

The availability of the various types of high-resolution data, combined with the success of methods using the DCNNs (e.g., the DCNN(s) 115 of FIG. 1) described herein in extracting *Sargassum* features automatically, makes it possible to fill the data gaps in nearshore waters from the coarse-resolution *Sargassum* imagery products (FIG. 2B). For example, corresponding to the MSI FAI image in the nearshore waters around the Florida Keys (FIG. 2C), the extraction results in FIG. 13A clearly reveal *Sargassum* slicks with fine details. Besides that, FIG. 13B shows an example of the *Sargassum* slicks extracted from the 3-m Dove images collected in the same area with even finer details. While the latency between satellite overpass and data access is often less than a day, whether or not a near real-time system can be established to fully use the high-resolution data depends on the processing speed, as high-resolution data have much higher data volume (e.g., for the same area, a 3-m Dove image has >110,000 times more pixels than the corresponding 1-km MODIS image).

Table IV below summarizes the approximate processing speed for *Sargassum* extraction from individual MSI, OLI, and Dove images. For an MSI FAI image with 10,000×10,000 pixels, the *Sargassum* extraction time using methods disclosed herein is about 2 minutes (123.0 seconds), much lower than the time needed by the previous method where the TNRD denoising process alone takes about 11 minutes. For OLI and Dove images, because the image sizes in terms of number of pixels are slightly smaller than MSI images, they use less time to extract the *Sargassum* features using the methods disclosed herein (see Table IV). For a coastal region of 1°×1° in the tropical or subtropical ocean, it takes about 42 Dove images and 71 minutes to process all images, thus meeting the condition of near real-time monitoring. For the same 1°×1° region, it takes only 2 minutes and 22 seconds to process one MSI and one OLI image, respectively.

A near real-time monitoring system also uses frequent data coverage. While MSI and OLI show better *Sargassum* extraction accuracy than Dove, only the latter can provide daily coverage. The 3-m resolution also makes it possible to see cloud-free pixels among small clouds, thus improve the spatial coverage. Therefore, a combination of all available Dove, MSI, and OLI images should be able to meet the critical condition of a near real-time *Sargassum* monitoring and tracking system for targeted nearshore waters.

TABLE IV

| Sensor | MSI | OLI | Dove |
|---|---|---|---|
| Mean processing time per image | 123.0 seconds | 85.5 seconds | 101.6 seconds |

Using deep convolutional neural networks (DCNN), systems and methods herein (as illustrated by the examples to follow) enable a fully automatic neural-network-based approach to detect and quantify *Sargassum* macroalgae from various high-resolution images. Even with the complex ocean background and variable "noise,", experiments using MSI, OLI, WV-2, and Dove images all achieved high detection accuracy with fast processing speeds. Systems and methods herein may also be used to provide a generic (i.e., applicable to other features such as oil slicks), concise, and effective tools for extracting *Sargassum* and other features from high-resolution satellite images, and also satisfies the needs for near real-time *Sargassum* bloom monitoring. Depending on location, previous approaches using MSI, OLI, and MODIS sensor data may result in considerable underestimate of *Sargassum* quantities when compared with the concurrent and co-located Dove (3-m resolution) estimation methods disclosed herein. Systems and methods herein, using high-resolution MSI, OLI, and Dove images, may be incorporated into the existing *Sargassum* Watch System (SaWS), to significantly improve *Sargassum* estimation in nearshore waters.

2. Monitoring *Sargassum* Inundation on Beaches and Nearshore Waters Using PlanetScope/Dove Observations In some examples, the image analysis system 100 can monitor *Sargassum* or other macroalgae on beaches and nearshore waters (e.g., using PlanetScope/Dove imagery). *Sargassum* beaching events have been reported in recent years around the Caribbean Sea and Florida, USA, causing numerous environmental and economic problems. Satellite remote sensing has been widely used to monitor *Sargassum* blooms in open waters, yet due to either coarse spatial resolution or low-revisit frequency, it is difficult to provide timely information on *Sargassum* inundation from traditional satellite instruments. In the present disclosure, the capacity of 3-m resolution daily PlanetScope/Dove imagery is demonstrated in monitoring *Sargassum* beaching events (e.g., in Miami beach (Florida, USA) and Cancun beach (Mexico)). In some examples, a U-net deep learning computer model can be developed to extract *Sargassum* features from Dove imagery over beaches and nearshore waters. Application of the model to Dove image sequences between May and August 2019 shows two major inundation events on both Miami Beach and Cancun beach, consistent with local reports. Thus, with the availability of 3-m resolution PlanetScope/Dove and PlanetScope/SuperDove data around the globe, the image analysis system 100 can monitor dynamic inundation events of not only *Sargassum* but also other macroalgae in many other regions.

In some examples, recent developments of small, affordable satellites known as CubeSats take advantage of both high spatial resolution and frequent revisits to meet some conditions of monitoring small, dynamic features. For example, the complete PlanetScope constellation can include ~180 satellites (CubeSat 3U dimensions are 10×10×30 $cm^3$) equipped with Dove sensors (and recently augmented by SuperDove sensors), making it possible to image the entire land surface and nearshore waters every day at 3-m resolution. However, their utility on monitoring of *Sargassum* beaching events has not been addressed. In the present disclosure, the use of Dove imagery is demonstrated in monitoring *Sargassum* beaching events, including the timing, location, and amount of *Sargassum* on the beaches and adjacent waters. For example, two study regions (Miami beach, U.S. and Cancun beach, Mexico) were selected to evaluate the performance.

Data

Figures 16A, 16B, 16C, 16D, 16E, 16F, 16G, 16H:
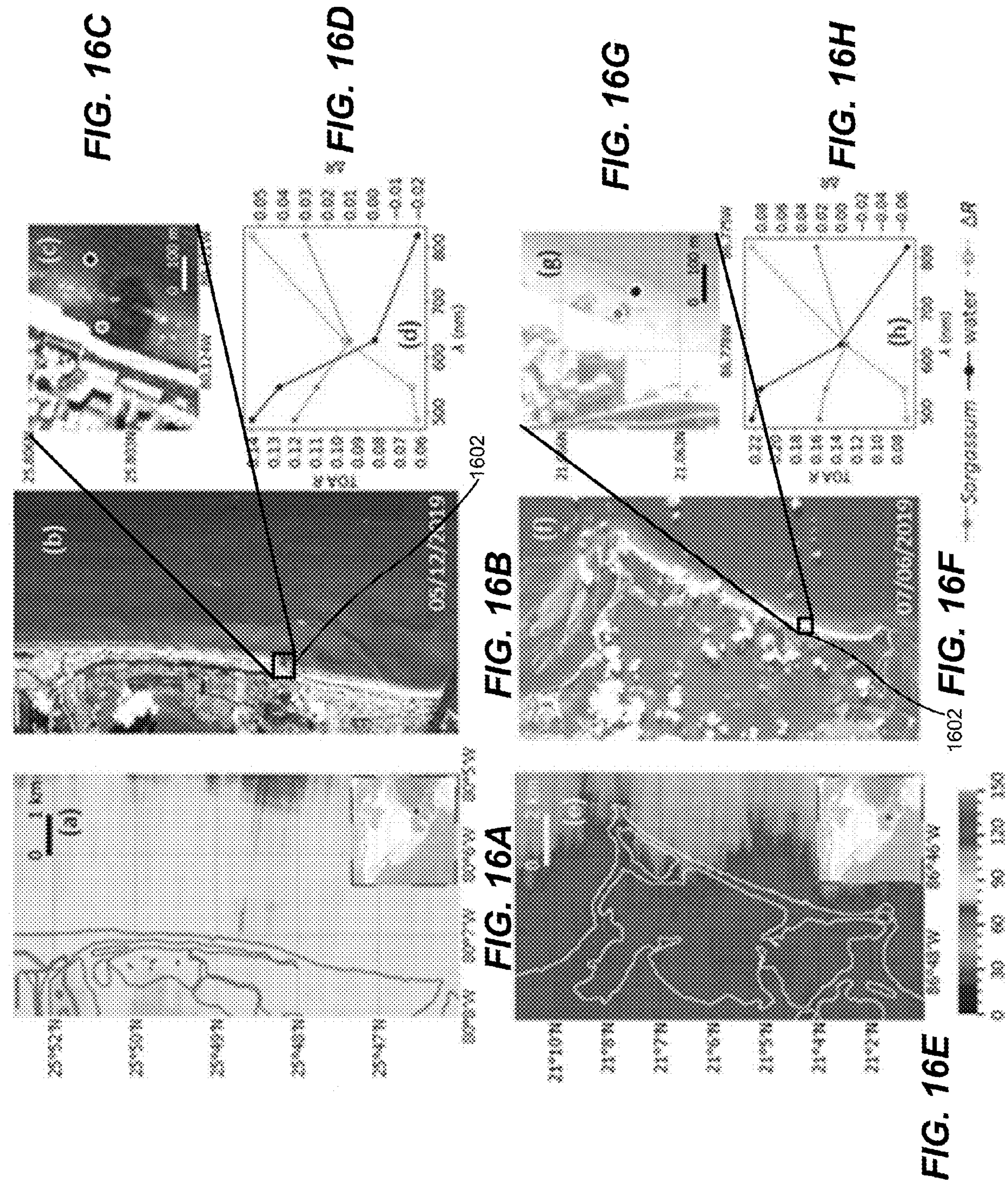
FIGS. 16A-H show examples of Dove images according to embodiments herein.

In total, 227 and 501 four-band Dove images from May 1, 2019 to Aug. 31, 2019 were downloaded for Miami beach (25.76~25.87° N, 80.14~80.08° W) and Cancun beach (21.02~21.175° N, 86.822~86.728° W), respectively, from the Planet Labs data portal (https://developers.planet.com/docs/apis/data/). The ancillary files, including the XML metadata files and the usable data bit masks (UDM), were also obtained. The detailed spatial distributions of satellite re-visit times for each region are shown in FIGS. 16A and 16E.

Method

1) Image pre-processing: The top-of-atmosphere (TOA) radiance data can be converted to TOA reflectance by multiplying the coefficient provided in the metadata files. For each region of interest, all available Dove tiles from different satellites on the same day can be clipped and mosaiced to have a complete coverage. The red, green, and blue bands can be used to compose RGB quick-look images. For examples, two such images are shown in FIGS. 16B and 16F for Miami Beach and Cancun Beach, respectively, where small regions (rectangular boxes 1602) are enlarged in FIGS. 16C and 16G to show different features. In such images, the dark-colored features can be *Sargassum* mats either on the beach or in coastal waters, which could be visually distinguished from the background waters. Inspection of the spectral shapes of these dark features in FIGS. 16D and 16H can support this speculation, as the dark features show typical red-edge reflectance (i.e., sharply increased reflectance from the red to the NIR band) of vegetation. Such spectral shapes can form the basis to develop classification schemes to separate *Sargassum* pixels from other pixels, as described below. It should be appreciated that the Miami Beach and Cancun Beach are mere examples. The method disclosed herein can be used in any other suitable regions. For example, the high revisit rate for beaches nearshore waters can show the potential applicability of this method at daily, global scales. This potential is reinforced by the fact that Dove data are collected more frequently in recent years (i.e., after 2018) than several years ago as more satellites were added to the constellation, and that a third generation of PlanetScope sensors (known as SuperDove or PSB. SD) has been in orbit since 2020 which provide data in eight spectral bands. In addition, DOVE data are usually available within 1 day of the satellite overpass, making it possible for near real-time monitoring to inform management. Given the increased reports of macroalgae blooms globally, such a capacity is important not just for *Sargassum* inundation in the Caribbean and Florida, but also for *Sargassum* inundation in the East China Sea and Ulva inundation in the Yellow Sea, or any other suitable regions.

Although the UDM file corresponding to each Dove image provides information on pixels of usable data within an image (e.g., clear, snow, shadow, light haze, heavy haze, and cloud), after inspection it was found that such pre-defined pixel-wise classifications are not accurate as some *Sargassum* pixels are falsely masked as clouds. Therefore, the UDM files were only used for calculating the scaling factor (step (3)) rather than masking cloudy pixels when extracting the *Sargassum* pixels (step (2)).

2) *Sargassum* extraction: In the present disclosure, an example U-net deep learning (DL) framework can be adapted for *Sargassum* extraction from Dove images. In some examples, U-net can utilize both spectral and spatial context information. In further examples, features for remote sensing images can be detected using the example U-net deep learning framework.

Specifically, a dataset can be prepared to train the U-net model to extract *Sargassum* pixels. This training dataset can include the 4-band TOA reflectance images and the *Sargassum* label images. For creating the *Sargassum* label images, the *Sargassum* pixels can be roughly delineated based on their normalized difference vegetation index (NDVI) values. Then, by visually inspecting the spectral shapes and RGB images, the *Sargassum* labels can be fine-tuned. In some experiments, a total of 177 sub-images (400×400) were prepared. The maximum number of training epochs was set to be 400. The U-net model can be optimized until the number of iterations reaches the maximum training epoch number.

To distinguish *Sargassum* on beaches and in nearshore waters, base maps can be created to contain three types: water, beach, and non-beach land. This can be through a simple K-means unsupervised classification with human interpretation on cloud free Dove images (e.g., on Aug. 13, 2019 and Jul. 5, 2019 for Miami beach and Cancun beach, respectively). Then, the base maps can be applied to all images to determine beach locations.

3) *Sargassum* area estimation: All *Sargassum* pixels can be summed up to determine the total *Sargassum* area in km². However, because some of the beach and nearshore water pixels may be covered by clouds, such an area may be underestimated. To minimize such potential biases, the images with >50% cloud coverage over beaches and nearshore waters can be discarded. For the remaining images, the *Sargassum* area can be scaled up using the following equation:

$$S_{Sargs\_norm}=S_{Sargs}*C \quad (1)$$

where $S_{Sargs\_norm}$ is the normalized *Sargassum* area after scaling up to account for cloud coverage, $S_{Sargs}$ is the original *Sargassum* area estimated from extraction results, and C (≥1.0) is the scaling factor calculated from the UDM file, which is equal to the ratio between the total number of beach and water pixels (from the base maps) and those not covered by clouds.

Results

Figure 17A:
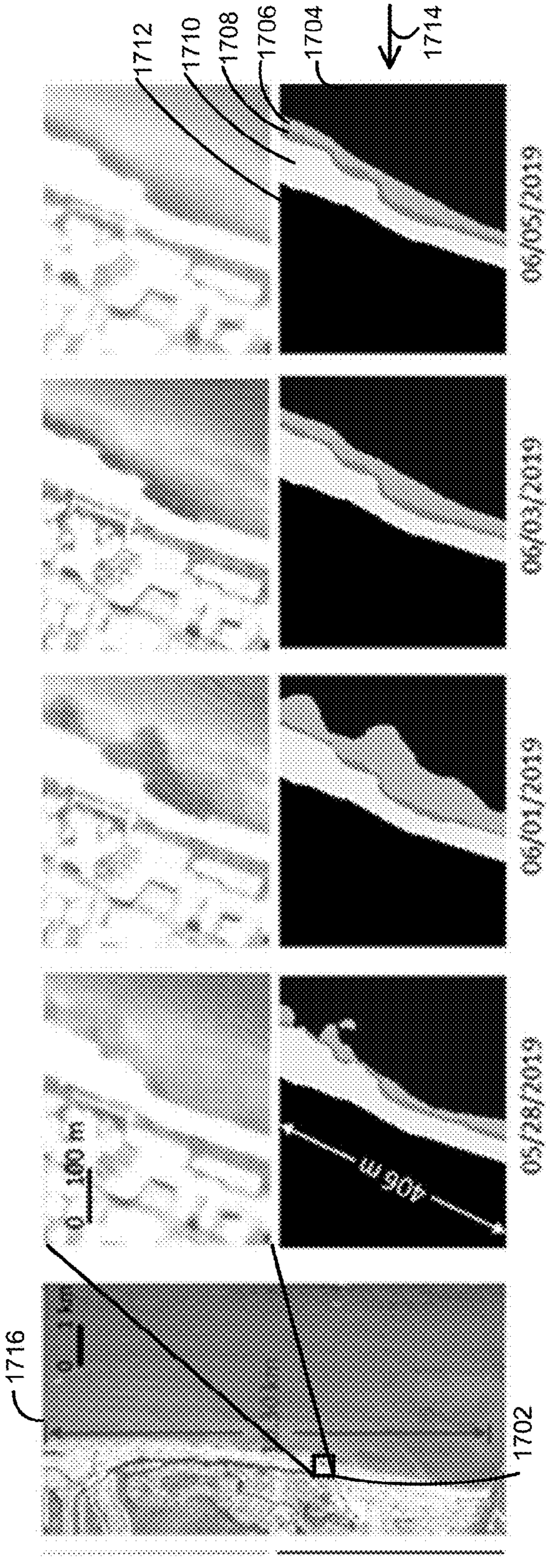
FIGS. 17A and 17B show example *Sargassum* extraction from Dove imagery over Miami beach and Cancun beach, respectively according to embodiments herein.
Figure 17B:
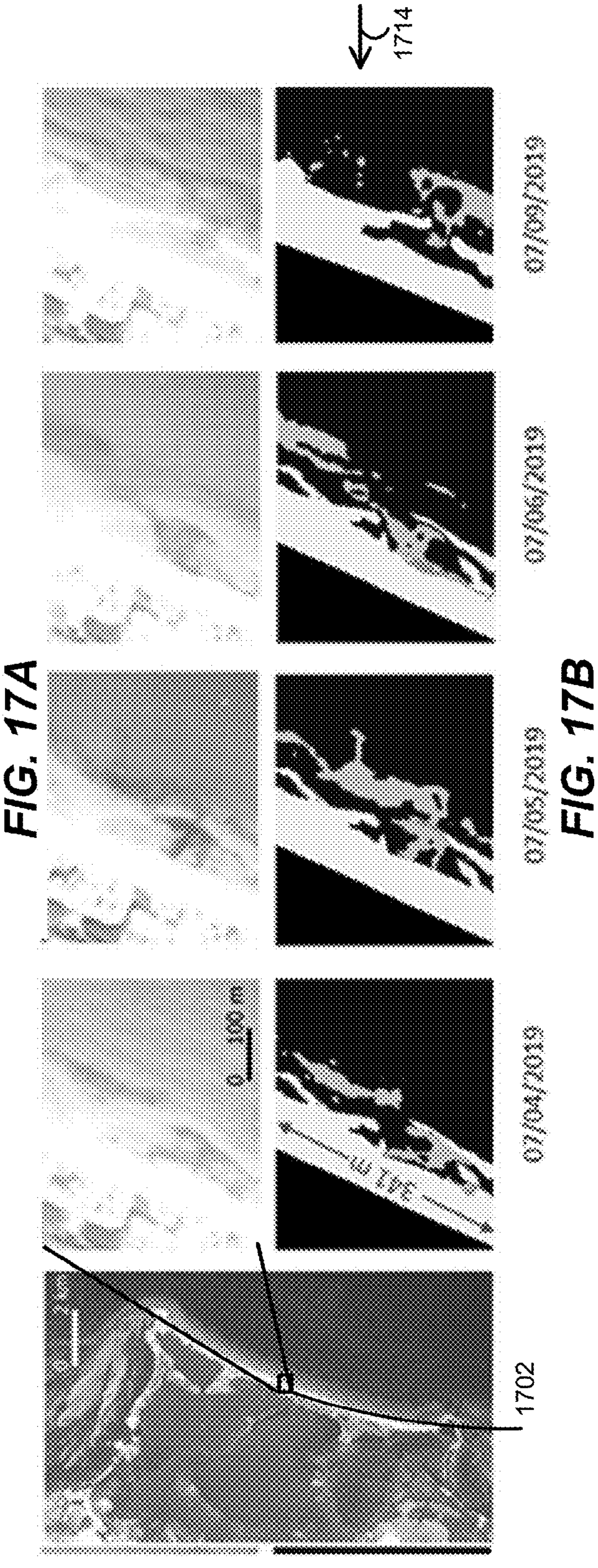

While the image sequence from the DL-based *Sargassum* extraction is presented in the supplemental materials, FIGS. 17A and 17B show the example *Sargassum* extraction from Dove imagery over for Miami Beach (the zoom-in square 1702 is centered at 25.804° N, 80.123° W) and Cancun beach (the zoom-in square 1704 is centered at 21.091° N, 86.767° W), respectively. From visual inspection, these extraction results appear reasonable, as no apparent noise pixels were misidentified as *Sargassum* features and the dark, *Sargassum* pixels were mostly detected. The extracted features 1714 include water 1704, *Sargassum* on water 1706, *Sargassum* on beach 1708, beach 1710, and land 1712.

To quantitatively evaluate the extraction results, the numbers of true positive pixels (TP), false positive pixels (FP), true negative pixels (TN) and false negative pixels (FN) are listed in Table V. Statistical measures such as false positive rate (FPR), false negative rate (FNR), and F1 score are reported in Table V as well. In this analysis, the "ground truth" images were prepared in the same way as used in preparing the training dataset for the U-net model. The "ground truth" images are independent from the training dataset.

TABLE V

Accuracy of the DL-based *Sargassum* extraction from Dove imagery. TP: True Positive; FP: False Positive; TN: True Negative; FN: False Negative. F1-score is defined as F1 = 2TP/(2TP + FN + FP). FPR = FP/(FP + TN), and FNR = FN/(FN + TP).

| | Miami beach | Cancun beach |
|---|---|---|
| FP | 624 | 1237 |
| TP | 8375 | 9798 |
| FN | 2644 | 4402 |
| TN | 8286 | 10014 |
| FPR | 7% | 11% |
| FNR | 24% | 31% |
| F1 | 84% | 78% |

With the extraction results validated, FIGS. 17A and 17B clearly reveal how the *Sargassum* beaching changed over a short time. For the small region 1702 on Miami beach, small amount of *Sargassum* first appeared on the beach and in nearshore waters on May 28, 2019. Three days later on Jun. 1, 2019, the *Sargassum* area expanded significantly from 0.008 km² to 0.023 km². For the entire Miami beach region 1716 of interest, however, *Sargassum* area remained relatively stable from 0.34 km² on May 28, 2019 to 0.27 km² on Jun. 1, 2019. On Cancun beach and its nearshore waters (FIG. 17B), *Sargassum* area 1702 also varied significantly from Jul. 4, 2019 to Jul. 9, 2019, which increased first but then decreased. Such dynamic changes can be captured with low revisit frequency sensors such as Landsat.

Figures 18A, 18B, 18C, 18D:
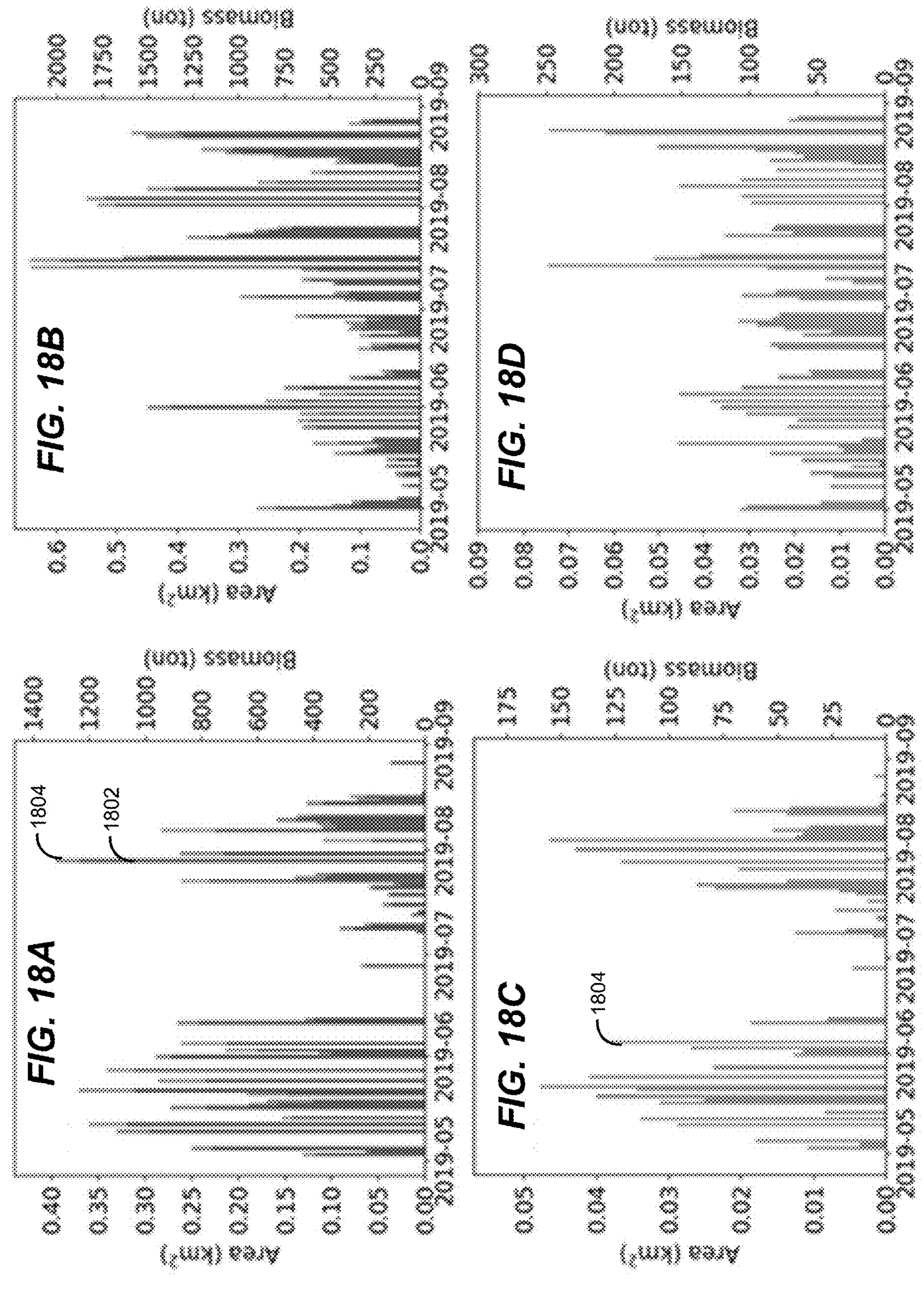
FIGS. 18A-18D show example time series of *Sargassum* area on and near the entire Miami beach (FIG. 18A), and Cancun beach (FIG. 18B). *Sargassum* areas on beaches in FIGS. 18A and 18B are also plotted in FIGS. 18C and 18D, respectively.

The dynamic changes in *Sargassum* area on beaches and nearshore waters are also shown in the time-series data from May 1, 2019 to Aug. 31, 2019 (FIGS. 18A-18D). In FIGS. 18A-18D, *Sargassum* areas 1802 on water and *Sargassum* areas 1804 on beaches are shown in FIGS. 18A and 18B, and

*Sargassum* areas 1804 on beaches are also plotted in FIGS. 18C and 18D, respectively. Overall, the mean daily *Sargassum* areas on the entire Miami beach and Cancun beach are 0.014 $km^2$ and 0.021 $km^2$, respectively, and they are 0.139 $km^2$ and 0.174 $km^2$ in their nearshore waters, respectively. Assuming an average *Sargassum* wet biomass density of 3.34 kg $m^{-2}$, these correspond to 47 metric tons and 70 tons of *Sargassum* on Miami Beach and Cancun Beach every day, respectively, and 464 tons and 581 tons of *Sargassum* in their nearshore waters every day, respectively. Considering that the average density of 3.34 kg $m^{-2}$ was obtained from open waters but on beaches and in nearshore waters *Sargassum* mats can be much thicker than in open waters, these biomass estimates represent lower bounds. What is interesting is that the *Sargassum* areal changes in the two regions appear to be synchronized, with May-June representing the first event and July-September representing the second event. *Sargassum* near Miami Beach is a result of transport from the Caribbean following the Loop Current and Florida Current. However, the magnitudes in the two events are not synchronized between the two regions, where more *Sargassum* was found in the May-June event for Miami Beach but more *Sargassum* was found in the July-September event for Cancun Beach. In both regions, on the other hand, *Sargassum* on water 1706 overwhelms *Sargassum* on beach 1708.

Figure 19B:
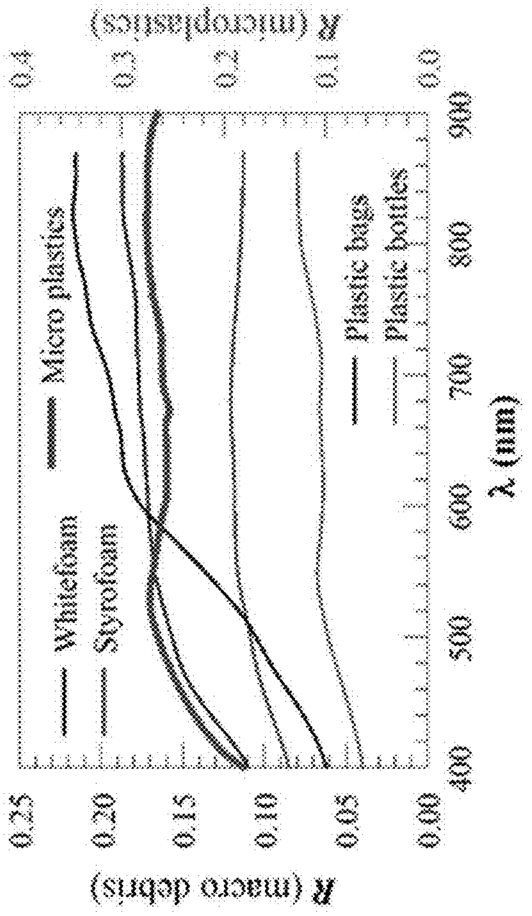
FIG. 19B shows their corresponding reflectance.
Figure 19A:
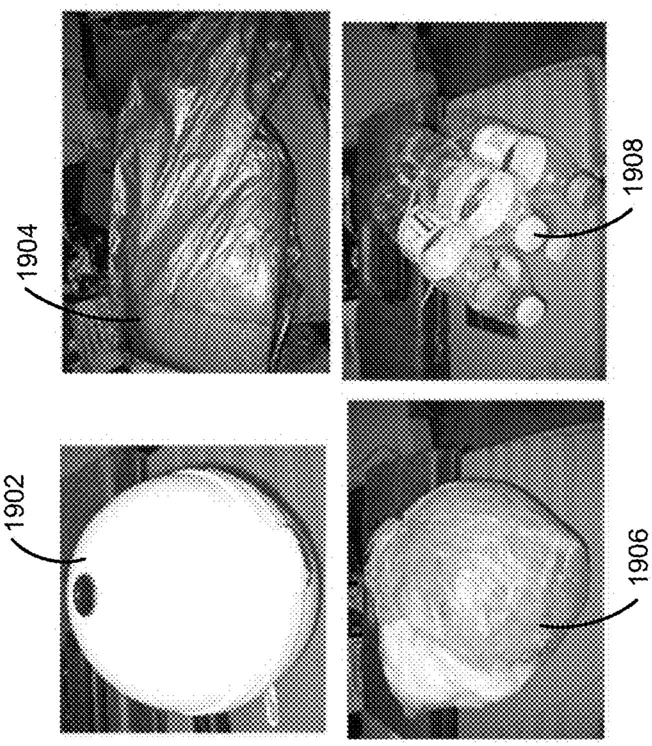
FIG. 19A shows example artificial (man-made) garbage patches.

3. Remote Detection of Marine Debris Using Satellite Observations in the Visible and Near Infrared Spectral Range In further examples, the image analysis system 100 can remotely detect marine debris using satellite observations in the visible and near infrared spectral range. By definition, marine debris refers to any persistent solid material that is disposed of (or abandoned) in the marine environment by natural processes (including natural disasters such as Tsunami) and human activities, for example microplastic particles, plastic bags or bottles, cigarette butts, foam take-out containers, balloons, fishing gear, tree branches/leaves, wood, among others. FIG. 19A shows the measurements of spectral reflectance of various large artificial (man-made) marine debris patches (e.g., whitefoam 1902, Styrofoam 1904, plastic bags 1906, plastic bottles 1908, etc.). FIG. 19B shows that reflectance is rather "flat" (i.e., without narrow-band features) for up to 900 nm. FIG. 19B also shows laboratory measurements of marine microplastics and also laboratory measurements of various macroplastics in the vis-NIR-SWIR wavelengths. Reflectance is also "flat" for up to 900 nm, with some C—H absorption features in the SWIR wavelengths above 900 nm.

Despite the importance of remote detection of marine debris, nearly all published studies are focused on either controlled experiments, or Sentinel-2 data with mixed band resolutions that are subject to large uncertainties. To date, key questions such as the following have not been addressed adequately: To what extent can the various forms of marine debris be remotely detected and differentiated through satellite observations in the visible and near infrared (NIR) spectral range, and how? Here, using published reflectance spectra of various types of floating matters, these questions can be addressed through sensitivity analyses, simulations, and spectral analyses of satellite images. While the descriptions herein are not limited to the examples disclosed in the present disclosure, several observations can still be made. First, detecting macroplastics and other debris is possible when they form large patches along ocean fronts or windrows. Second, assuming a SNR of 200, discriminating large patches of marine debris from floating algae is only possible with a subpixel coverage of >0.3%. These threshold values are based on the sensor SNRs only, and they represent the lower bounds of detection and discrimination, respectively. The real threshold values above which a detection or discrimination is possible also depend on the observing conditions, and therefore could be higher. Third, currently, Sentinel-2 MSI (Multi Spectral Instrument) sensors can provide an optimal trade between resolution and coverage, yet MSI sensors have SNRs<200, and interpretation of the MSI spectra uses extra caution due to variable spatial resolutions in different bands, among other factors. From the perspective of pure spectroscopy, it is possible to discriminate floating algae from non-algae floating matters but difficult to differentiate the type of the latter (either plastic or non-plastic debris, foam, etc.) because different non-algae floating matters all show relatively flat reflectance spectral shapes in the vis-NIR spectral range. Finally, based on these results, recommendations can be made on algorithm designs and sensor designs, for example spectral analysis should be performed over the difference spectra to minimize the impact of variable subpixel coverage, and certain spectral bands are more important than others for the remote detection of marine debris.

The current disclosure discloses whether and under what conditions various forms of marine debris can be detected and discriminated against other floating matters using the vis-NIR wavelengths. The current disclosure can use the endmember spectra, sensor sensitivity, simulation experiments, and spectral analysis of Sentinel-2 data for demonstration purpose. The current disclosure can provide example sensor designs as well as algorithms and approaches toward vis-NIR remote sensing of marine debris. The use of SWIR wavelengths is also discussed.

Field and Satellite Data

Endmember spectra: To date, laboratory or in situ measurements of optical properties of marine debris are scarce, with the exception of some artificial (man-made) garbage patches and field-collected micro plastic particles (FIG. 19A). One common characteristic from these various forms of marine debris is that they are all spectrally flat without narrow-band features in the visible-NIR wavelengths (400-900 nm). Although only one example of microplastics spectra is shown in FIG. 19B to illustrate such spectral characteristic, all their microplastics spectra show the same characteristic. This is because of lack of narrow-band vegetative pigment absorption. Indeed, once normalized to 25% in the NIR (e.g., around 860 nm), all these spectra appear rather similar (FIG. 19B). Therefore, in this disclosure, collectively they may represent one marine debris endmember.

In the ocean, other forms of floating matters also exist. These include *Sargassum fluitans* and *Sargassum natans, Sargassum horneri, Ulva*, cyanobacteria *Trichodesmium*, emulsified oil, green *Noctiluca*, red *Noctiluca*, pumice rafts, foams (whitecaps), etc. Some of these have been measured in the field, with in situ hyperspectral reflectance being available, but others have only been assessed using multi-band satellite data (e.g., pumice rafts). Some of these spectra are compiled in FIGS. 20A and 20B, which show typical spectral shapes of non-debris floating matters. In some examples, except for the spectra in FIG. 20A whose magnitudes in the NIR are >0.2 and therefore may be used as endmember spectra (i.e., 100% coverage within a pixel) for the spectral mixing experiments below, the NIR reflectance in FIG. 20B can be all <0.1, suggesting that these spectra derived from medium-resolution (300-m) image pixels are mixed between floating matters and water (about 16%-40% subpixel floating matter coverage), therefore cannot be used as endmembers. In further examples, except for red *Noctiluca* and pumice rafts, all spectra in FIGS. 20A and 20B have the typical reflectance trough around 670 nm due to chlorophyll a absorption (black arrows 2002), and they also show the typical vegetation red-edge reflectance above 700 nm. These characteristics are different from the marine debris endmember spectra, and such characteristics may form the basis for spectral discrimination between floating algae (pigment rich) and floating debris (no pigment, FIG. 19B) using the vis-NIR bands. Such a concept is demonstrated in the simulations below using "plastic bags" (FIG. 19B) and *Sargassum* (FIG. 20A) to represent marine debris and floating algae, respectively. In some examples, for water endmember spectra, two scenarios were selected to represent clear water and turbid water, respectively (FIG. 20C). These spectra were collected in the Florida Keys (May 12, 2013, 24.5333° N, 81.4016° W, chlorophyll concentration ~0.1 mg $m^{-3}$) and near Tampa Bay (Aug. 24, 2012, 27.9313° N, 82.6512° W. chlorophyll concentration ~12.7 mg $m^{-3}$), respectively, using a hand-held spectrometer following NASA Ocean Optics protocols.

Satellite Data: While there are currently many satellite sensors in orbit, Sentinel-2 MSI can be selected to represent high-resolution optical sensors because it provides a trade between spatial resolution (10-20 m) and revisit frequency (2-3 days). MSI can cover wavelengths of vis-NIR-SWIR, suitable for detecting and differentiating small floating matters. MSI can have the following spectral bands: 443 (60), 492 (10), 560 (10), 665 (10), 704 (20), 741 (20), 783 (20), 841 (10), 865 (20), 1614 (20), and 2202 nm (20), where the numbers in the parentheses represent their ground resolutions in meters.

In the examples, Level-1 MSI data were downloaded from the U.S. Geological Survey, and processed using the Acolite software to generate Rayleigh corrected reflectance ($R_{rc}(1)$, dimensionless), from which Red-Green-Blue and False-color RGB composite imagery were generated. In the FRGB imagery, a NIR band was used to replace the green band in the RGB imagery, making it suitable to detect floating matters with enhanced NIR reflectance.

Example Methods

Regardless of the floating matter type (either marine debris, floating algae, or other types of floating matters), remote detection can use two steps. Step 1 is to detect a spatial anomaly, i.e., some pixels "stand out" from their nearby background waters. Step 2 is to spectrally differentiate the pixel type from the spatial anomaly. Step 2 can be performed after Step 1. In simpler words, the two steps can be shortened as: 1) is there "something"? 2) what is that "something"? If the amount of floating matter is to be quantified, then a third step is to address the question of how much is that "something."

Using image examples and simulations, Step 1 can rely on the sensor's sensitivity (i.e., signal-to-noise ratio or SNR), while Step 2 can use specific spectral bands depending on the targeted floating matter type and on the selected algorithms. These steps can be used for the sensitivity analysis below.

Sensitivity Analysis: To be able to "stand out" in an image, a pixel is significantly different from the surrounding pixels. Mathematically, this can be expressed as:

$$\Delta R > 2\sqrt{2}\sigma \quad \text{(Eq. 20)}$$

where σ is the sensor noise in a pixel that is inherent for a given sensor, $\sqrt{2}$ is to account for noise propagation in pixel differencing between the target pixel and nearby reference pixel (in this case, noise is the square root of sum squares from two pixels, therefore the $\sqrt{2}$ term), 2 is to make the difference statistically significant (i.e., 2 times noise), and ΔR is the difference between target pixel and nearby reference pixel (i.e., water pixel):

$$\Delta R = R_T - R_W = [\chi R_{FM} + (1-\chi) R_W] - R_W = \chi(R_{FM} - R_W) \quad \text{(Eq. 21)}$$

where "T" stands for target, "FM" is for floating matter, "W" is for water, and χ (0.0%-100%) is the subpixel proportion of floating matter. For simplicity, the wavelength dependence of R can be omitted. In some examples, sensor noise could be inherent for a sensor, which can be obtained from either the sensor specification document, or estimated in other ways.

From Eqs. 20 and 21, once σ is known, the subpixel detection limit, $\chi_{det}$, can be estimated as:

$$\chi_{det} \geq 2\sqrt{2}\sigma / (R_{FM} - R_W) \quad \text{(Eq. 22)}$$

From Eq. 21, assuming the endmember spectra of $R_{FM}$ and $R_W$ are relatively stable, the spectral shape of ΔR can be determined between $R_{FM}$ and $R_W$ with equal weights, and the shape does not change with χ. In other words, both $R_{FM}$ and $R_W$ can contribute to ΔR with the same weights regardless of χ. In contrast, their weights to $R_T$ might not be equal but can be determined by χ and (1−χ), respectively. This can make the spectral shape of $R_T$ being dominated by $R_W$ when χ is very small (e.g., <5%) as for the case of marine debris.

In practice, because the spectral contrast between floating matters and water is mostly in the red-NIR-SWIR wavelengths, $\chi_{det}$ can be estimated using a single wavelength in the NIR (Eq. 22), or a combination of these wavelengths (e.g., floating algae index). Because the latter involves more bands and therefore more noise, the lower detection limit can be from a single band in the NIR, where the spatial contrast can be the highest between floating matters and water.

Once a pixel is determined to contain a certain type of floating matter, there are several ways to discriminate the type, including a similarity index between the pixel's ΔR and ($R_{FM}$−$R_W$) where $R_{FM}$ and $R_W$ are from the established spectral library (e.g., FIGS. 19A-20B). Because the spectral shapes of $R_W$ change the most in the blue-green wavelengths in natural waters, the simplest way is to restrict the similarity analysis to the red-NIR-SWIR wavelengths of $R_{FM}$. Comparing FIGS. 19B and 20A, the most prominent difference between marine debris and floating algae occurs between 670 nm and 750 nm: the former is spectrally flat while the latter has a sharp increase in the NIR (i.e., the red-edge reflectance). Therefore, the reflectance difference between NIR and red can be used to discriminate marine debris from floating algae: $NRD = R^{NIR} - R^{red}$.

Here, NRD stands for NIR-red difference. For a pixel containing χ floating matter and (1−χ) water, there is:

$$\Delta NRD_{FM} = \Delta R^{NIR} - \Delta R^{red} = \chi[(R_{FM}^{NIR} - R_{FM}^{red}) + (R_W^{NIR} - R_W^{red})] \quad \text{(Eq. 23)}$$

Then, to be able to separate marine debris (MD) and floating algae (FA), their difference in ΔNRD should be significantly higher than noise, i.e., $$\Delta NRD_{FA} - \Delta NRD_{MD} = \chi[(R_{FA}^{NIR} - R_{FA}^{red}) - (R_{MD}^{NIR} - R_{MD}^{red})] >> \text{noise} = 2\times 2\sigma \quad \text{(Eq. 24)}$$

Here the first 2 in Eq. 24 represents statistical significance, and the second 2 in Eq. 24 represents the cumulative noise using the square-root rule (two bands, two types, therefore $\sqrt{4}$). The discrimination limit is therefore:

$$\chi_{dis} \geq 4\sigma / [(R_{FA}^{NIR} - R_{FA}^{red}) - (R_{MD}^{NIR} - R_{MD}^{red})] \quad \text{(Eq. 25)}$$

Comparing with Eq. 22, Eq. 25 is very similar except for the factor of 4 instead of $2\sqrt{2}$ because of more spectral bands involved.

Simulation-Experiment: In the experiment, reflectance of a pixel covered by both floating matter and water (i.e., mixed pixel) was estimated with their endmember spectra and $\chi$. Then, the pixel's spectra were compared with the endmember spectra to determine their spectral similarity.

The similarity between two spectra was estimated using a spectral angle measure (SAM). The choice of SAM over other similarity measures is because SAM is based on spectral shape only. $\chi$ for marine debris or other floating matters is often very small and also variable, thus the reflectance magnitude of the mixed pixel should be deemphasized.

Mathematically, SAM is the angle between two spectral vectors, defined as:

$$SAM\ (\text{degrees}) = \cos^{-1}\left[\left(\sum x_i y_i\right) / \left(\sqrt{\sum x_i^2}\sqrt{\sum y_i^2}\right)\right], \quad \text{(Eq. 26)}$$

where x and y represent two spectra and the summation is for band number i from 1 to N. SAM=0° means two parallel spectra in log space (i.e., identical spectral shapes), while SAM=90° means perpendicular spectra (i.e., completely different spectral shapes). SAM<5° indicates that the two spectra are very similar.

Four (4) endmember spectra were selected in the experiment: *Sargassum* (FIG. 20A); plastic bags (FIG. 19A); clear water; turbid water (FIG. 20C). While in nature other types of floating matters also exist and water reflectance can also change in both shape and magnitude, for demonstration purpose, the first two are used to represent floating vegetation and floating debris, respectively, and the last two are used to represent typical clear open-ocean waters and turbid coastal waters, respectively.

The hyperspectral data of the 4 endmembers were first resampled to MSI wavelengths using their relative spectral response (RSR) functions, and then mixed using different subpixel coverage ($\chi$ from 1% to 20%). Then, both the mixed spectra, $R_\chi$, and their contrasts from water, $DR_\chi$, were compared with the endmember to determine their similarity using Eq. 26.

In the above simulation experiment, because MSI bands have different spatial resolutions, the same experiment was conducted twice. The first used imaginary MSI bands where their resolutions were all set to 10 m. The second used realistic resolutions for individual bands (either 60, 10, or 20 m). In the latter case, if a 10-m band had $\chi$=20%, the 20-m band had $\chi$=20%/4=5%. Therefore, $\chi$ varied between bands in the same mixed-pixel spectra, causing distorted spectral shapes (see below).

Results

Sensitivity: Table VI shows $\sigma$ from the proposed NASA mission (HyspIRI, currently Surface Biology and Geology or SBG) assuming an SNR of 200, and $\sigma$ estimated from MSI measurements over clear-water scenes. Here, $\sigma$ represents noise estimated from R instead of total at-sensor radiance. Only several MSI bands in the green, red, and NIR wavelengths are listed because these are the most relevant bands to detect floating matters. $R_{t,typical}$ is the typical total reflectance over oceans under cloud-free and glint-free conditions. In some examples, MSI SNRs are lower than the proposed HyspIRI SNRs, and the corresponding $\sigma$ is 2-4 times higher than the proposed HyspIRI $\sigma$. For simplicity, $\sigma^{MSI}$ in the NIR is assumed to be mean+2 standard deviations ($6\times10^{-4}$); Likewise, $\sigma^H$ in the NIR is assumed to be $2\times10^4$.

Table VI. Reflectance noise ($\sigma$) used in the sensitivity analysis. $R_{t,typical}$ is typical top-of-atmosphere reflectance over the ocean. "H" is for HyspIRI specification. $\sigma^{MSI}$ is estimated from clear-water scenes. For simplicity, $\sigma^{MSI}$ in the NIR is assumed to be mean+2 standard deviations, about $6\times10^{-4}$. Likewise, $\sigma^H$ in the NIR is assumed to be $2\times10^{-4}$.

| Band (nm) | $R_{t,\ typical}$ ($\times10^{-2}$) | $SNR^H$ | $\sigma^H$ ($\times10^{-4}$) | $\sigma^{MSI}$ ($\times10^{-4}$) |
|---|---|---|---|---|
| 560 | 6.90 | 200 | 3.45 | 7.14 ± 2.70 |
| 665 | 3.71 | 200 | 1.86 | 6.58 ± 3.92 |
| 741 | 2.73 | 200 | 1.37 | 4.15 ± 1.00 |
| 865 | 1.85 | 200 | 0.93 | 3.70 ± 0.85 |

Then, for a HyspIRI-like sensor, Eq. 20 suggests that in order for a pixel to "stand out" from the nearby background water pixels, $\Delta R$ needs to be $>\sim6\times10^{-4}$. For MSI-like sensors with $\sigma\sim6\times10^{-4}$, $\Delta R$ can be $>\sim2\times10^{-3}$. Assuming $R_{FM}^{NIR}\approx0.25$ (FIGS. 19B & 20A) and $R_W^{NIR}\approx0$ (FIG. from Eq. 22, the following lower detection limits can be derived for a HyspIRI-like sensor and for MSI, respectively:

$$\chi_{det}^{H} \geq 2\sqrt{2}\sigma^H/(R_{FM}-R_W) \approx 0.2\%$$

$$\chi_{det}^{MSI} \geq 2\sqrt{2}\sigma^{MSI}/(R_{FM}-R_W) \approx 0.8\% \quad \text{(Eq. 27)}$$

Similarly, assuming $R_{FA}^{NIR}-R_{FA}^{red}\approx0.25$ (FIG. 20A) and $R_{MD}^{NIR}-R_{MD}^{red}\approx0.0$ (FIG. 19B), from Eq. 25, the following lower discrimination limits can be derived for a HyspIRI-like sensor and for MSI, respectively:

$$\chi_{dis}^{H} \geq 4\sigma^H/0.25 \approx 0.3\%$$

$$\chi_{dis}^{MSI} \geq 4\sigma^{MSI}/0.25 \approx 1.0\% \quad \text{(Eq. 28)}$$

These estimates are based on the assumption that 1) for both floating plastics (or other debris) and floating algae, their NIR reflectance is ~0.25 (FIG. 19B & FIG. 20A), and 2) floating plastics (or other debris) are spectrally flat in the red and NIR wavelengths (FIG. 19B). In further examples, wet microplastics pieces have reflectance ~0.25 in the NIR and <0.1 in the SWIR wavelengths for $\chi$=100%, and all spectra are rather flat between red and NIR wavelengths. Therefore, such assumptions appear realistic. Then, from Eqs. 27 & 28, the detection and discrimination of microplastics and other marine debris are discussed separately below.

Microplastics: From 11,854 surface trawls between 1971 and 2013, microplastics distributions in global oceans (microplastics defined by particle size<5 mm) were compiled and analyzed. The dominant majority showed surface density of <1M pieces $km^{-2}$, and nearly the entire data archive showed <10M pieces $km^{-2}$. So far, the highest reported density is 26M pieces $km^{-2}$. In other examples, a dataset of marine plastic debris measured at 1,571 stations from 680 net tows and 891 visual survey transects was compiled. The dominant majority of all compiled particle density and modeled particle density is <1M pieces $km^{-2}$ for particles<4.75 mm in size. Therefore, the maximum density of microplastics in natural waters is ~10M pieces $km^{-2}$. In another example, the size of plastics from a compiled dataset can show a log-normal distribution with most particles of <5 mm and the histogram mode of ~2 mm.

Assuming a mean size of 2.5 mm per piece, the maximum density of 10M pieces $km^{-2}$ is equivalent to about 50 $m^2$ microplastics $km^{-2}$ (i.e., x=0.005% of a pixel) if all pieces are laid on the very surface without blocking each other. Clearly, $\chi$=0.005% is $\ll\chi_{det}^{H}$ (0.2%) and also $\ll\chi d_{det}^{MSI}$ (0.8%, Eq. 27). Indeed, for $\chi$=0.005%, $\Delta R=0.25\times\chi\approx1\times10^{-5}$. Such a signal, corresponding to the maximum microplastics density reported in the literature, is 60 times lower than $6\times10^{-4}$ and 20 times lower than sensor noise for a sensor with SNRs of 200. In turn, in order for microplastics particles to be detected, their density is desirable to be at least >600M pieces $km^{-2}$ or 600 pieces $m^{-2}$. Even though, all these particles need to be aggregated on the very surface without blocking each other in order to achieve a maximum reflectance signal.

In the marine environment, because microplastics particles may actually be below water surface due to mixing or other processes, their NIR reflectance can be much lower than when they are all aggregated at the ocean surface. Therefore, their density is desirable even higher than shown above, reinforcing the argument that remote detection of microplastics can be approached with a different technique.

In further examples, when the particles are heavily concentrated along narrow ocean fronts, windrows, or in small-scale eddy convergence zones so that particle density is >0.2% (i.e., >600 $m^{-2}$), the reflectance anomalies and therefore presence/absence of microplastics particles can be detected.

The estimates above are based on the assumed SNR of ~200, as proposed for the HyspIRI mission (currently SBG). High spatial-resolution sensors typically have SNRs much lower than 200, resulting in much higher sensor noise (Table VI). In such realistic cases, the detection limit is also higher, for example $\chi_{det}$>0.8% (or particle density>2400 $m^{-2}$) for MSI.

Finally, the above arguments are purely from the perspective of instrument sensitivity. In some special cases, microplastics may aggregate among other larger floating matters, for example *Sargassum*. Because *Sargassum* density and distributions can be estimated using both coarse- and medium-resolution satellite sensors, if a relationship between microplastics and *Sargassum* density can be established from field surveys, the relationship may be applied to the synoptic observations of *Sargassum* in the Atlantic to estimate the total amount of microplastics around these large macroalgae mats.

Microplastics and other debris: Although made of different materials, both macroplastics (>5 mm) and other non-plastic debris have broad-band spectral response (e.g., FIG. 19B) similar to microplastics, and can be treated as the same type, termed as macro debris.

Similar to the detection of microplastics, Step 1 in macro debris detection can be also to detect a spatial anomaly, where the desirable condition on subpixel coverage is the same: $\chi_{det}$>0.2% for a SNR of 200, assuming macro debris is on the very surface as opposed to be submersed in water. For a 10-m pixel, this means that the macro debris patch within the pixel is desirable to be at least >0.2 $m^2$. For MSI, the detection limit can be $\chi_{det}$>0.8% or 0.8 $m^2$. Once a spatial anomaly is detected, spectral analysis can be performed in Step 2 to tell whether the anomaly is due to macro debris or other floating matters (i.e., floating algae). From Eq. 28, $\chi_{dis}$ is desirable to be >0.3% for a HyspIRI-like sensor, and >1% for MSI. For a 10-m pixel, this means 0.3 $m^2$ and 1 $m^2$, respectively.

Although still difficult, these detection and discrimination limits can certainly be met under certain circumstances, for example around river mouths, in frontal convergence zones, or along windrows of the ocean. However, in practice, as shown below, while detection and discrimination of floating algae and non-algae features are possible, discrimination of macro debris is actually more demanding than shown above due to spectral similarity among different types of floating matters.

Figure 21A:
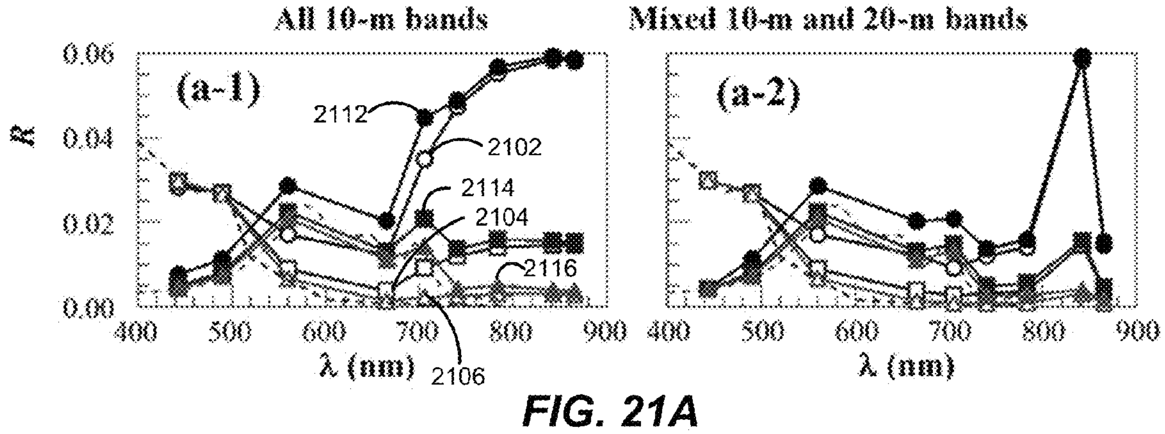
FIGS. 21A-21C show example simulated mixing experiment for *Sargassum* using Sentinel-2 MSI band settings with R for mixed pixels (FIG. 21A), (b) ΔR between mixed pixels and water endmembers (FIG. 21B), and the same as in FIG. 21B but ΔR is plotted in log scale (FIG. 21C).
Figure 21B:
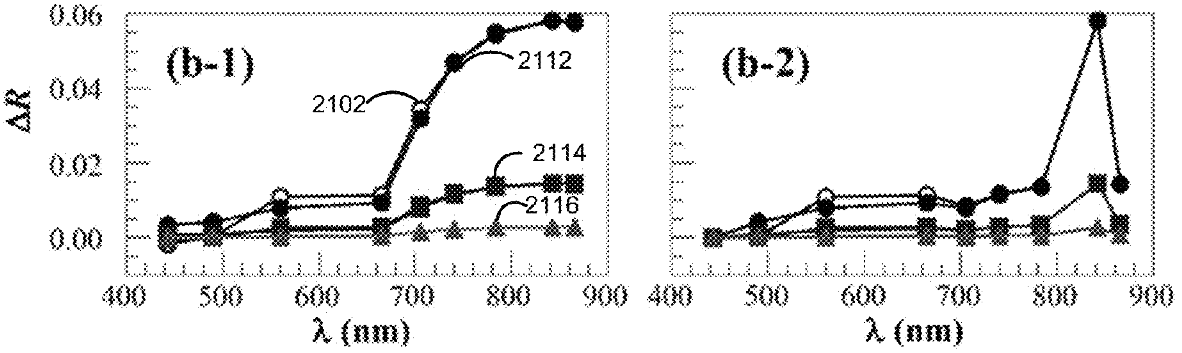
Figure 21C:
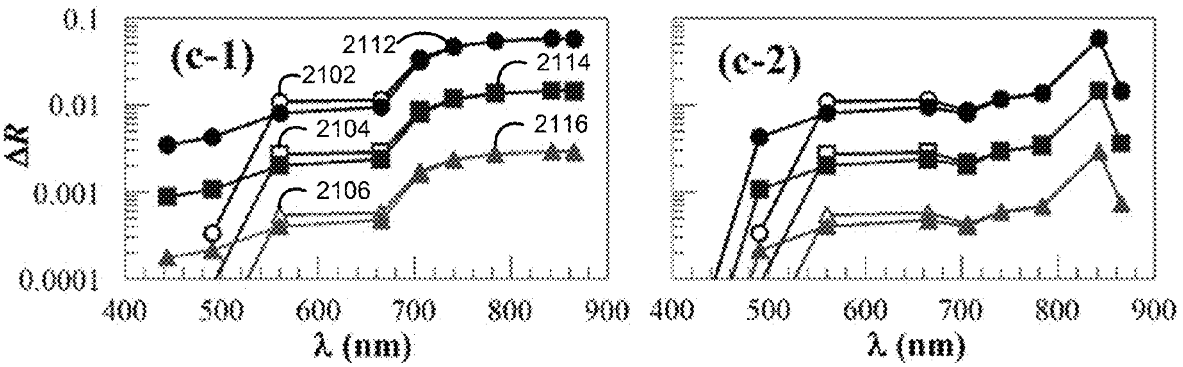
Figure 22A:
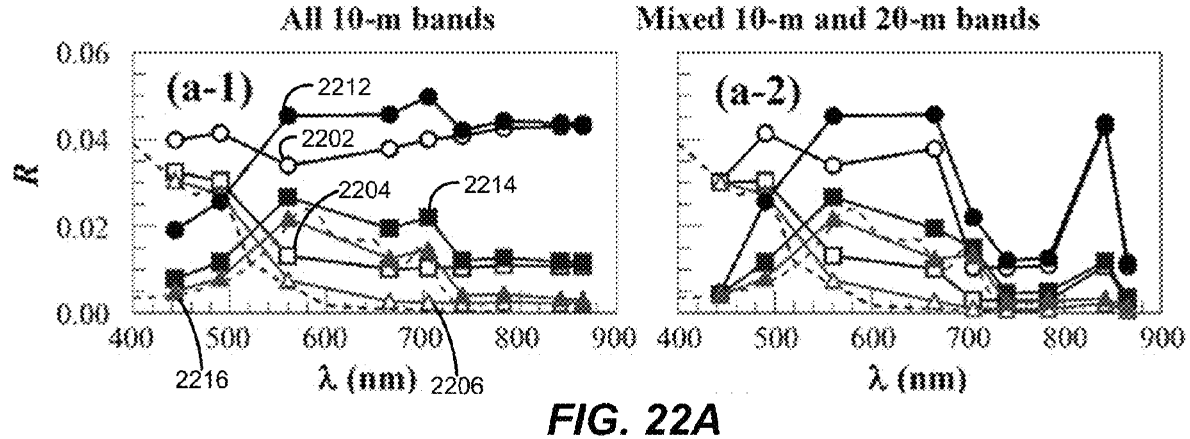
FIGS. 22A-22C show example simulated mixing experiment for plastic bags using Sentinel-2 MSI band settings.
Figure 22B:
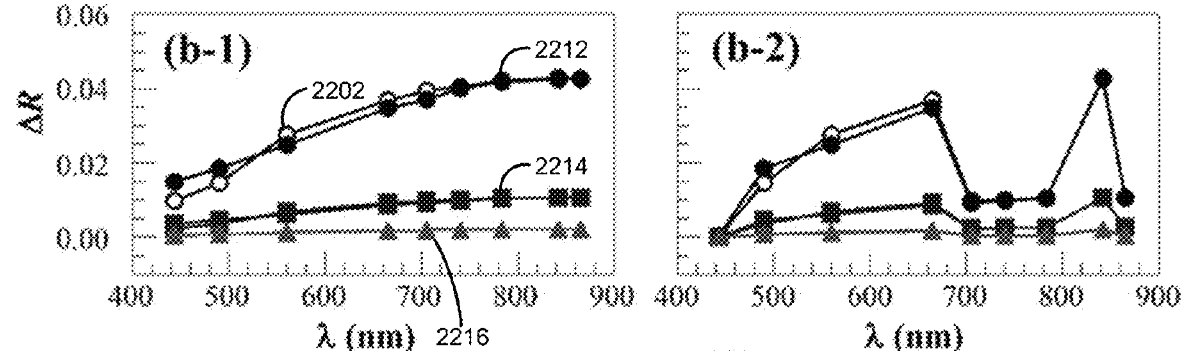

Simulation experiment: Spectral shape variations: While the sensor's sensitivity or SNRs to detect and discriminate marine debris is described above, this section illustrates how spectral shape changes with spectral endmember, water type (clear or turbid), and $\chi$. FIGS. 21A-21C illustrate how R and $\Delta R$ from a mixed *Sargassum*-water pixel change with $\chi$ for both clear and turbid waters. Here, FIGS. 21A-21C shows examples of simulated mixing experiment for *Sargassum* using Sentinel-2 MSI band settings. The blue and green dashed lines represent clear water 2102, 2104, 2106 and turbid water 2112, 2114, 2116, respectively. The legend shows $\chi$ from 1% to 20% for the 10-m bands (i.e., 20% of clear water 2102, 20% of turbid water 2112, 5% of clear water 2104, 5% of turbid water 2114, 1% of clear water 2106, 1% of turbid water 2116). Left column represents results with imaginary MSI bands where all bands have the same 10-m resolution. Right column represents results with realistic MSI bands where the following bands have 20-m resolution: 704, 741, 783, and 865 nm, and the 443-nm band has 60-m resolution; R for mixed pixels (FIG. 21A); $\Delta R$ between mixed pixels and water endmembers (FIG. 21B); same as in FIG. 21B but $\Delta R$ is plotted in log scale (FIG. 21C). In some examples, the artificial peak at 841 nm in the right column due to spectral distortion caused by mixed band resolutions. The same for the "plastic bags" endmember is presented in FIGS. 22A-22C. Here, FIGS. 21A-21C shows examples of simulated mixing experiment for plastic bags shown in FIG. 19B using Sentinel-2 MSI band settings. The blue and green dashed lines represent clear water 2202, 2204, 2206 and turbid water 2212, 2214, 2216, respectively. The legend shows $\chi$ from 1% to 20% for the 10-m bands (i.e., 20% of clear water 2202, 20% of turbid water 2212, 5% of clear water 2204, 5% of turbid water 2214, 1% of clear water 2206, 1% of turbid water 2216). In some examples, the artificial peak at 841 nm in the right column due to spectral distortion caused by the mixed band resolutions. Such a peak does not exist if all bands have the same resolution (left column). In these simulations, *Sargassum* endmember spectrum is from FIG. 20A, plastic endmember spectrum is from FIG. 19B ("plastic bags"), and clear/turbid water endmembers spectra are from FIG. 20C.

In both figures (FIGS. 21A-21C and FIGS. 22A-22C), the left column represents the results with imaginary MSI bands all having 10-m resolution, while the right column is for the results with realistic MSI bands where the 704, 741, 783, and 865-nm bands have 20-m resolution, but other bands (except 443 nm) have 10-m resolution. In the latter case, the subpixel coverage of floating matters in the 20-m bands is only ¼ of the 10-m bands, creating spectral distortion, for example an artificial local maximum at 841 nm and an artificial local minimum at 704 nm. Worse than this, the degree of the spectral "distortion" varies with water type and floating matter type as well as $\chi$. Thus, it would be difficult to use spectra of mixed pixels to represent spectral endmembers, especially when $\chi$ is small (e.g., ~20%). Indeed, it is believed that in nearly all published papers on the use of MSI to detect marine debris, the resolution mismatch among different bands was not considered enough, and the spectral endmembers in the published papers appeared to be distorted in a similar fashion as shown above, thus may result in large uncertainties in their interpretations.

In further examples, FIGS. 21A-21C and FIGS. 22A-22C show that, consistent with the descriptions above, the use of ΔR is superior to R when evaluating spectral shapes of mixed pixels. Indeed, in the log-scale plots, the spectral shape in ΔR does not change with $\chi$ regardless of whether imaginary or realistic MSI bands are used as long as ΔR is positive.

In even further examples, when the blue bands of 443-nm and 492-nm are excluded, the spectral shape in ΔR of mixed pixels is also stable between clear and turbid waters (i.e., the empty and solid symbols almost overlap with each other). This can indicate that in applications of satellite imagery in different water environments, water type (i.e., clear or turbid) may be excluded from consideration when performing spectral analysis.

Figure 22C:
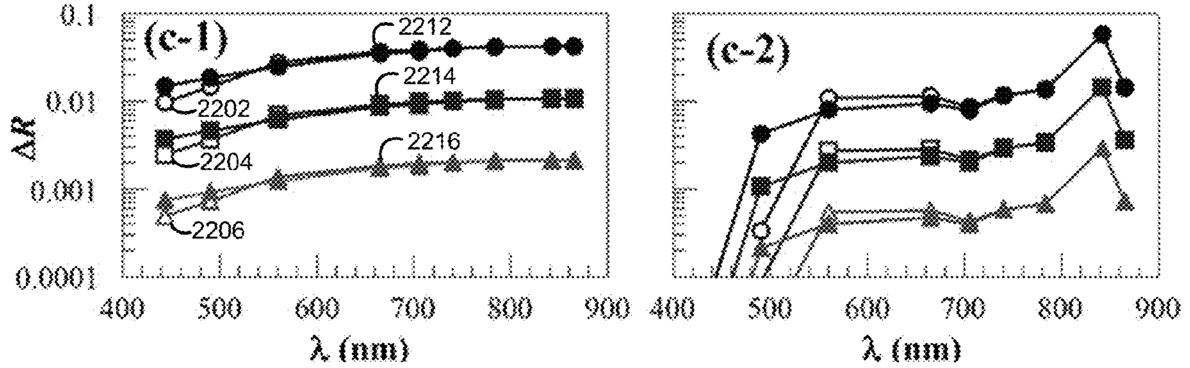
Figure 23A:
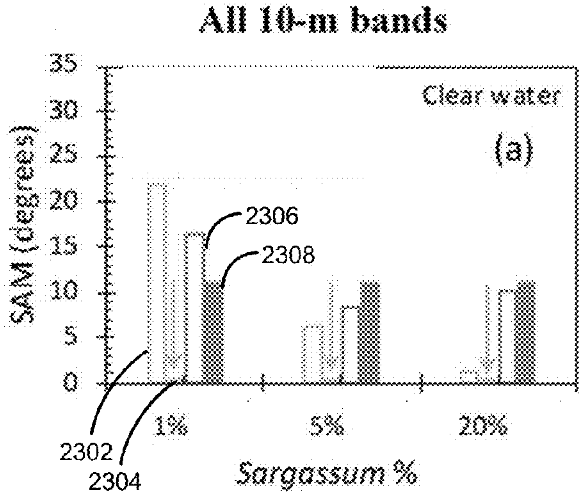
FIGS. 23A-23D show example spectral similarity between a mixed *Sargassum* pixel and *Sargassum* endmember and between a mixed *Sargassum* pixel and plastics endmember using the following MSI bands.
Figure 23C:
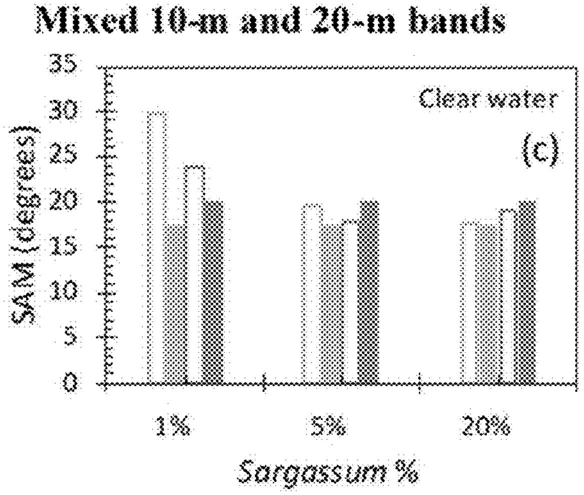
Figure 23B:
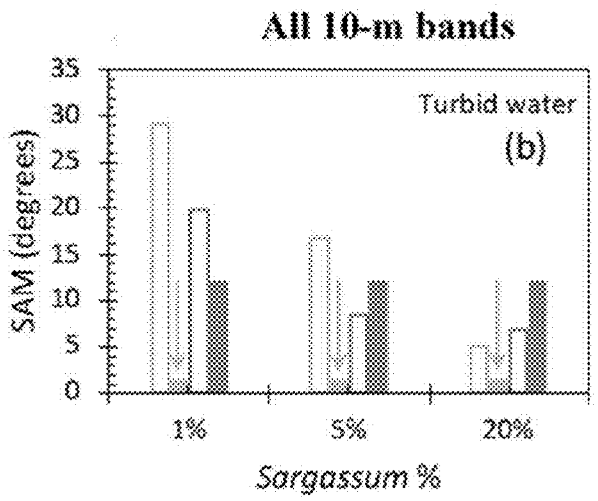
Figure 23D:
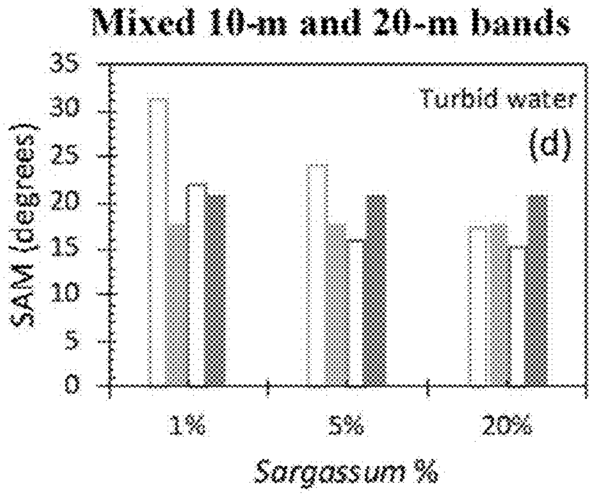

Simulation experiment: Spectral similarity: While FIGS. 21A-21C and FIGS. 22A-22C show the spectral shapes after spectral mixing, FIGS. 23A-23D and 24A-24D show the spectral similarity measures between the mixed pixel and floating matter endmember, expressed in SAM (Eq. 26). FIGS. 23A-23D show example spectral similarity between a mixed *Sargassum* pixel and *Sargassum* endmember and between a mixed *Sargassum* pixel and plastics endmember using the following MSI bands: 560, 665, 704, 741, 841, 865 nm. FIGS. 23A and 23B: all MSI bands are 10 m; FIGS. 23C and 23D: the following bands are 20 m: 705, 741, and 865. In some examples, the solid orange bars 2302, 2304 (annotated with arrows) in FIGS. 23A and 23B are close to 0 degrees, indicating high similarity. These results correspond to the spectra shown in FIGS. 21A-21C. FIGS. 24A-24D show example spectral similarity between a mixed plastic pixel and *Sargassum* endmember and between a mixed plastic pixel and plastics endmember using the following MSI bands. In some examples, the solid blue bars 2406, 2408 in FIGS. 24A and 24B (annotated with arrows) are close to 0 degrees, indicating high similarity. These results correspond to the spectra shown in FIGS. 22A-22C. Lower SAM values indicate higher similarity. To understand whether SAM is different between the two endmembers (*Sargassum* and plastic), each mixed pixel is compared to both endmembers.

From these results, the following can be summarized. One, consistent with the findings from FIGS. 21A-21C and FIGS. 22A-22C, ΔR (solid bars 2304, 2308, 2404, 2408) is way more efficient than R (empty bars 2302, 2306, 2402, 2406) in differentiating floating matters, either *Sargassum* 2306, 2308, 2406, 2408 or plastic 2302, 2304, 2402, 2404 (i.e., compare the empty and solid bars in FIGS. 23A, 23B, 24A, and 24B.

Figure 24A:
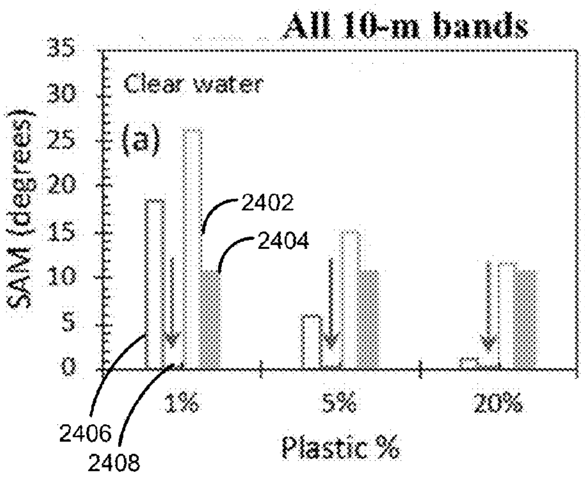
FIGS. 24A-24D show example spectral similarity between a mixed plastic pixel and *Sargassum* endmember and between a mixed plastic pixel and plastics endmember using the following MSI bands.
Figure 24C:
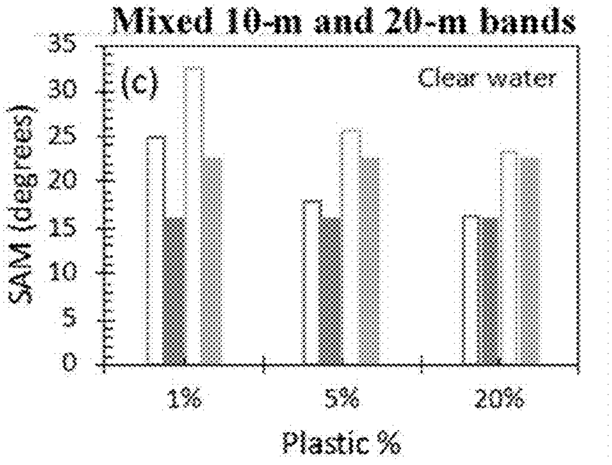
Figure 24B:
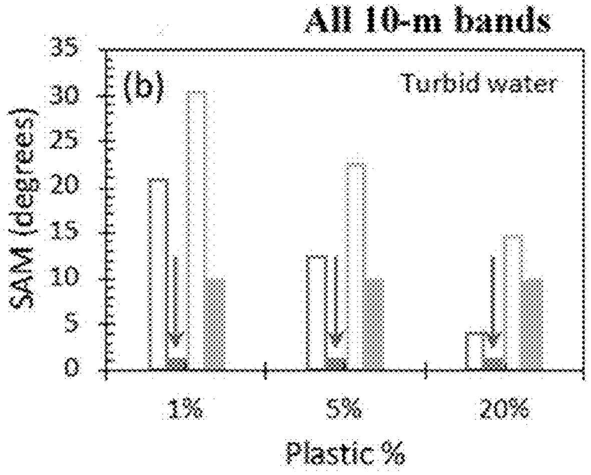
Figure 24D:
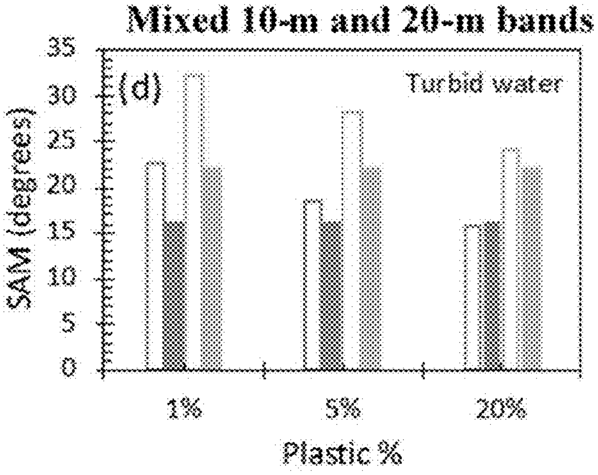

Two, such an ability is compromised for MSI spectra with mixed band resolutions because their spectral shapes are distorted to the variable $\chi$ in different bands (FIGS. 23C, 23D, 24C, and 24D). Indeed, with mixed band resolutions, it is difficult to determine whether the *Sargassum*-containing pixel is spectrally more similar to *Sargassum* endmember or to plastic endmember (FIGS. 23C, and 23D), or whether the plastic-containing pixel is spectrally more similar to plastic endmember or to *Sargassum* endmember (FIGS. 24C and 24D).

Three, in contrast, if all MSI bands are forced to have the same 10-m resolution, *Sargassum*-containing pixels and plastic-containing pixels can be easily separated through comparing their SAM values to both endmembers, and such a separation is possible down to at least 1% subpixel coverage, a result consistent with the sensitivity analysis above. This is shown by the solid bars between the two colors in FIGS. 23A, 23B, 24A, and 24B.

Although the simulation experiment used only two endmembers of *Sargassum* and plastic, because their spectral shapes can represent floating algae and macro debris, respectively, the findings above can help guide spectral analysis and algorithm development when applying MSI imagery to detect marine debris and other floating matters, as shown below. Indeed, most floating algae have similar red-edge reflectance and similar 670-nm reflectance trough as in the *Sargassum* endmember (FIGS. 20A-C), and nearly all macro plastics (except those monotonic green or blue plastic bottles) have similar flat spectral shapes as those shown in FIG. 19B. Considering that hyperspectral and high-resolution sensors are currently unavailable, the most achievable appears to be separating floating algae from non-algae while further differentiating the non-algae type (e.g., plastics or non-plastic debris or other objects) is rather challenging, as shown below.

Practical considerations: The above sensitivity analysis (Eqs. 8 and 9) is based on the ideal situations where image noise is assumed to come from the sensor noise only, and spectral shapes in either the marine debris endmembers or the floating algae endmembers are stable. Therefore, both $\chi_{det}$ and $\chi_{dis}$ represent the lower bounds, i.e., below which detection and discrimination are impossible, but above which whether or not they are possible still depend on other factors.

Figure 25:
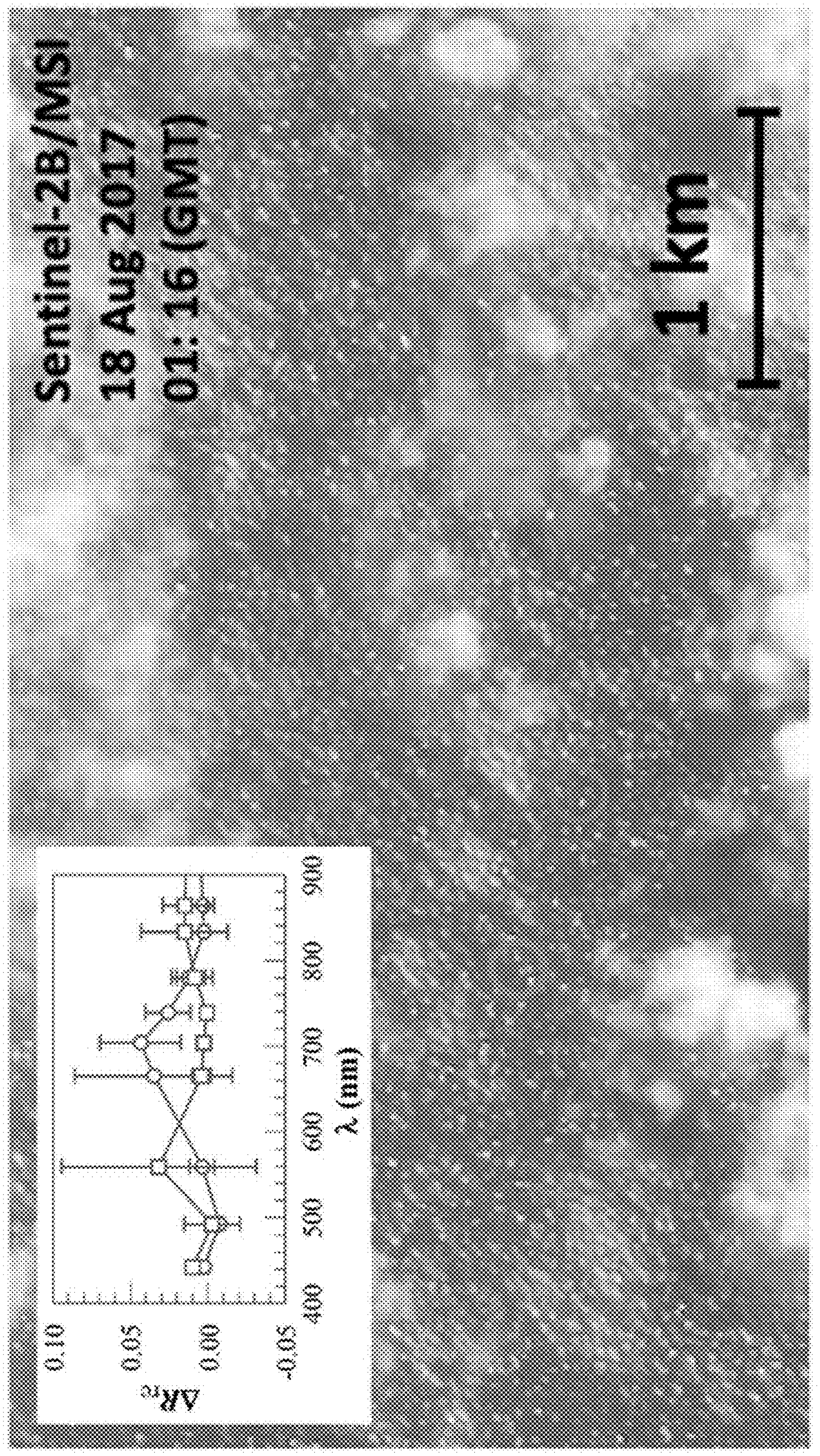
FIG. 25 shows an example MSI FRGB image near Japan (centered around 31.7593oN 142.2510oE) showing colorful pixels due to the sensor parallax effect.

For example, the detection limit can be estimated from a single band in the NIR because this is where the maximum contrast occurs between floating matters and water, but single-band images are difficult to interpret as reflectance of the water background may change substantially across the image. The use of floating algae index (FAI) or other indexes (e.g., FRGB) may facilitate image visualization, but the detection limit may be compromised to a higher value, for example to ~1% for floating algae with a SNR of 200. Likewise, in practice, a single pixel above the detection limit is difficult to interpret (see FIG. 25). Rather, a spatially coherent feature (e.g., an image slick) from at least several pixels is desirable, thus requiring higher $\chi$ than the sensitivity-based estimates of 0.2% and 0.3 (for SNR of 200) and 0.8% and 1% (for MSI). For example, $\chi_{det}$ and $\chi_{dis}$ for MSI may be 2-3 times higher than the sensitivity-based estimates, being 2% and 3%, respectively. FIG. shows an example MSI FRGB image near Japan (centered around 31.7593oN 142.2510oE) showing colorful pixels due to the sensor parallax effect. In FIG. 25, the spectral shapes of these pixels in the inset figure appear abnormal as they do not resemble any known spectral shapes, including those from marine debris.

Furthermore, different sensors have different artifacts, which can be considered carefully when analyzing the spatial and spectral anomalies. One example is the hardware parallax in push-broom sensors such as MSI (ESA) and Landsat-8 OLI, where different bands are not co-registered in time for a given pixel. Such an effect can create colorful pepper noise in RGB composite imagery over moving targets (e.g., waves, FIG. 25) when sun glint or sky glint is apparent. Other disturbing image features include pepper noise due to cosmic rays and waves that can also confuse algorithms to detect small features. Under these circumstances, detecting marine debris becomes more difficult because although a noise removal algorithm may be used to remove these artifacts, the same algorithm may also remove the small features caused by marine debris as they are expected to be at subpixel scales.

Similar to the sensitivity analysis, the simulation results described above are also simplified to demonstrate the concept of 1) why ΔR is preferred over R to differentiate floating matter type and 2) for MSI, why the use of single pixels is not a practical way for spectral discrimination even if ΔR is used. In real applications, other types of floating matters as well as spectral modulations by image noise also need to be considered. However, even such conceptual demonstrations may provide some guidance on how to perform the spectral analysis.

Figure 26A:
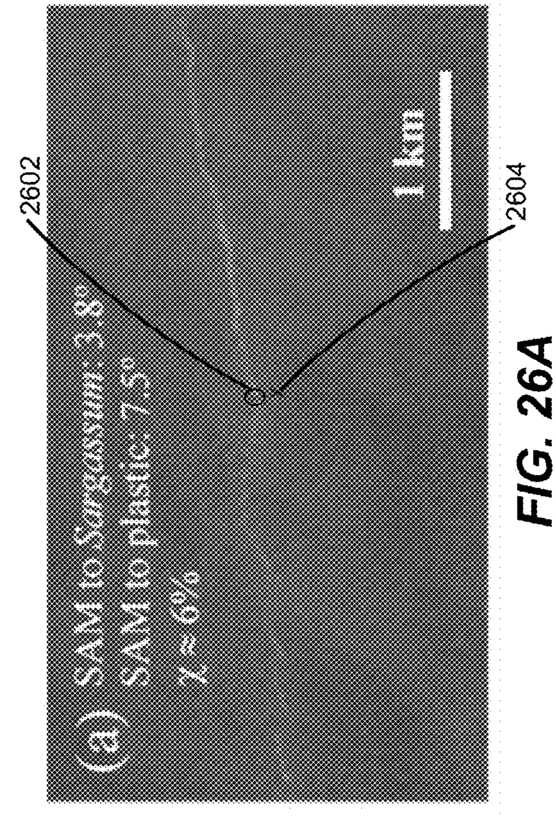
FIGS. 26A and 26B show an example MSI FRGB image on 29 Nov. 2015 in the SW Caribbean Sea and its extracted spectra, respectively.
Figure 26C:
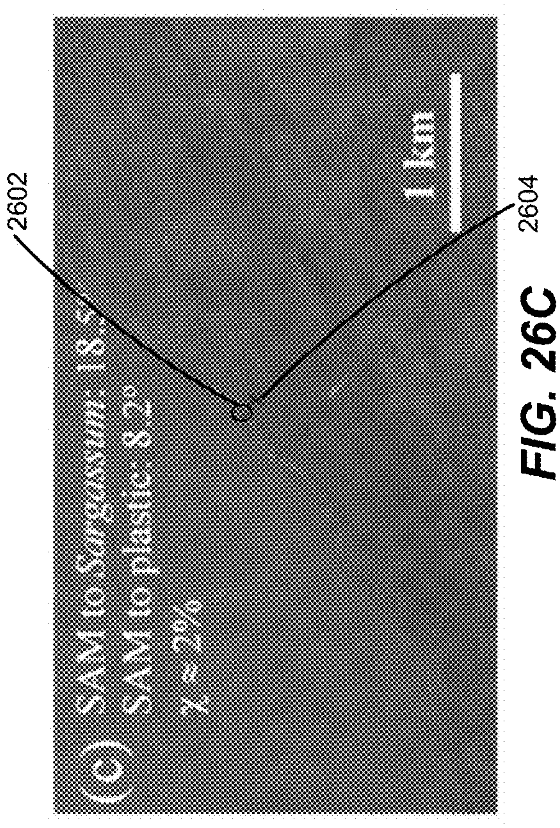
FIGS. 26C and 26D show MSI FRGB image on 30 Aug. 2018 in the SW Caribbean and its extracted spectra, respectively.
Figure 26B:
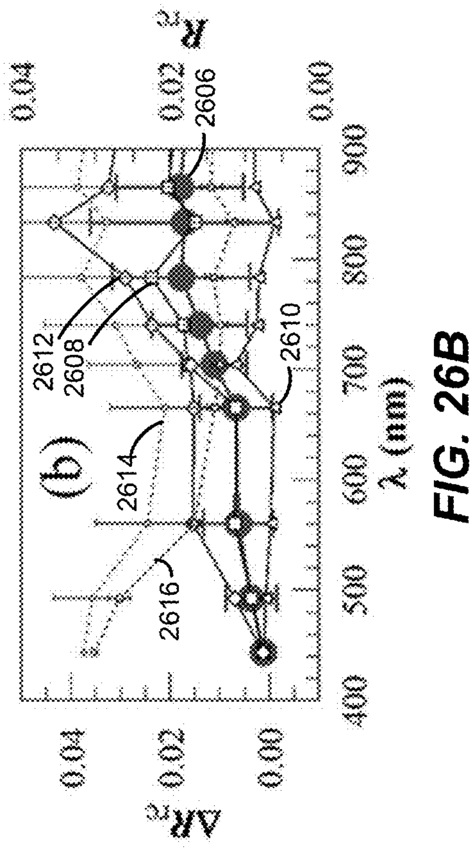
Figure 26D:
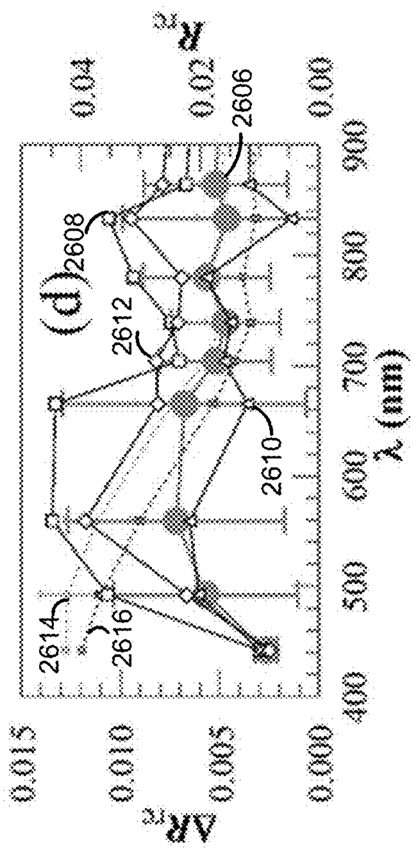

For example, to avoid MSI spectral distortion in single pixels, mean spectra from 5'5 pixels instead of a single pixel may be used to derive the spectral shape in a more reliable way, as shown in FIGS. 26A-26D. Although the magnitude of the mean spectra is lower than from some of the 5'5 pixels, the spectral shape of the floating matter is largely retained, thus facilitating analysis for spectral similarity. The two MSI images in FIGS. 26A and 26C were collected from the southern Caribbean Sea where marine debris has been reported. However, from the spectral shapes alone, it is difficult to conclude whether the pixels contain marine debris, especially for the first case in FIG. 26A. In FIG. 26A, the circle 2602 (16.0649° N, 86.4025° W) and "x" 2604 symbols mark the locations where spectra were extracted for analysis in FIG. 26B. The $R_{rc}$ spectra of 5×5 pixels from the two locations are shown to the right y-axis, while their $\Delta R_{rc}$ spectra are shown to the left y-axis. In addition to the 5×5 mean spectrum ($\Delta R_{rc}$(5×5) 2606), spectra from 3 individual pixels ($\Delta R_{rc}$ (pixel 1) 2608, ($\Delta R_{rc}$ (pixel 2) 2610, ($\Delta R_{rc}$ (pixel 3) 2612) are also shown. Also, the 5×5 ($R_{rc}$ (5×5) 2614) and water ($R_{rc}$ (water) 2616) spectra are shown in FIGS. 26B and 26D. In some examples, the spectral shapes from individual pixels are all "distorted" (compared to the mean spectral shapes) due to mixed band resolutions. Annotated on the images are the SAM values to *Sargassum* and plastic endmembers, respectively, and mean χ of the marked pixels.

In FIG. 26A, the image slick appears greenish, indicating high NIR reflectance because in the FRGB image a NIR band is used to represent the green channel. The mean $\Delta R_{rc}$ spectrum 2606 in FIG. 26B from 5'5 pixels (centered at the circle location 2602) indeed shows red edge reflectance in the NIR, strongly suggesting floating vegetation and very likely *Sargassum*. Its SAM to the known *Sargassum* endmember is 3.8°, but 7.5° to the plastic endmember. In contrast to the mean $\Delta R_{rc}$ spectrum 2606, $\Delta R_{rc}$ from 3 random pixels 2608, 2610, 2612 at the same location (FIG. 26B) show high spectral noise, making them difficult to interpret.

Similar observations are obtained in FIG. 26C, where the image slick appears whitish, indicating lack of red-edge reflectance. The 5'5 mean $\Delta R_{rc}$ spectrum from the feature indicates non-algae materials (FIG. 26D). Its SAM to plastic is half of that to *Sargassum* (8.2° versus 18.5°), but its NIR reflectance is lower than the green-red reflectance. This characteristic actually does not appear to resemble plastic, but more similar to foam (whitecap) spectra, especially when considering that the local minima at 741 nm are near the reported 756-nm minimum in whitecap reflectance. However, it is also possible that the feature is a mixture of marine debris and foam, or marine debris alone, especially if the debris is partially submersed in water to cause a reflectance decrease in the NIR wavelengths.

The results in FIGS. 26A-26D are for demonstration purpose only, as in reality the plastic endmember may have slightly different spectra than used here. If the plastic endmember spectra were replaced by the microplastic spectra (red curve in FIG. 19B), the SAM to plastic would be 9.8° (FIG. 26A) and 5.3° (FIG. 26C), respectively. This new result actually makes it easier to discriminate the two image slicks between *Sargassum*-like and plastic-like, but it does not alter the principles presented above.

In some examples, the reflectance magnitude in both cases can be very small. Assuming a NIR reflectance of 0.25 in both endmembers for χ=100%, FIG. 8*b* suggests mean χ~6% while FIG. 26D can suggest mean χ~2%. Even though, the slick features can be detected and discriminated. From the analysis demonstrated here, once a spatially coherent feature is detected in the MSI imagery, two techniques can be used to avoid the spectral "distortion" in spectral analysis or algorithm development. The first is to use ΔR instead of $R_T$ in Eq. 21. This way, both floating matter and water contribute equal weights to ΔR regardless of χ (FIGS. 21C and 22C). The second is to average several pixels to minimize the impact of resolution mismatch. Indeed, without averaging, the individual pixels in FIGS. 26B and 26D show spectral shapes that are highly noisy, making them impossible to compare with known floating matter endmember spectra.

Example Case Study over West Florida Shelf: With the findings above, an example case study using MSI data is presented here to demonstrate how to detect image features (spatial anomaly) and how to discriminate the feature type.

Figures 27A, 27B, 27C, 27D, 27E, 27F, 27G, 27H, 27I, 27J, 27K:
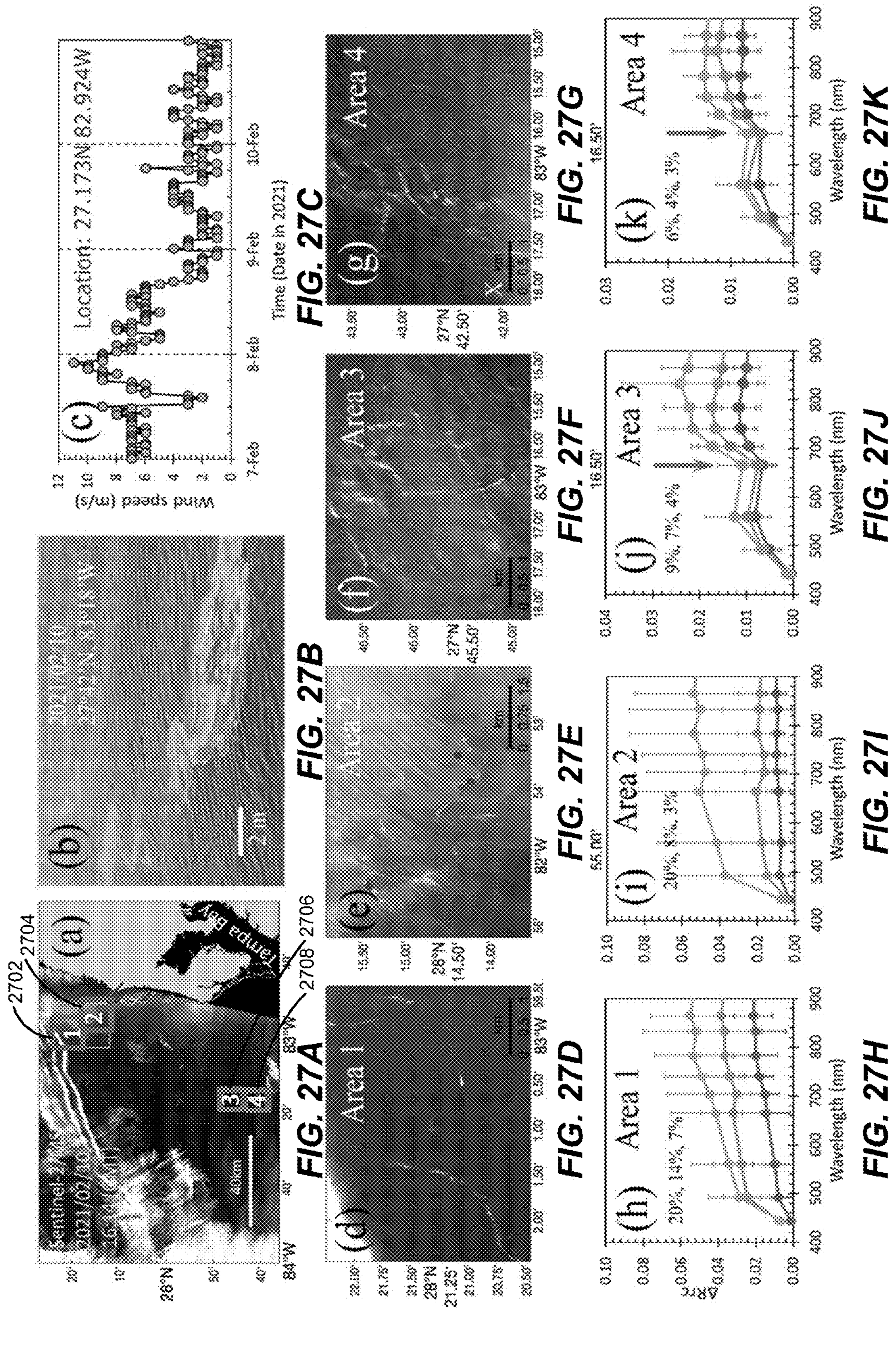
FIGS. 27A-27K shows an example showing the possibility of detecting and discriminating floating vegetation and non-vegetation as well as the challenge in identifying the type of non-vegetation using MSI data.

For simplicity, the first step in remote detection of marine debris, i.e., detecting a spatial anomaly, can be through visual inspection while sophisticated image segmentation may be implemented in the future. FIG. 27A shows an example MSI RGB sub-image west and northwest of Tampa Bay (Florida, USA), where the full-resolution image in several areas (denoted as "1" (2702)—"4" (2708)) reveals image slicks (FIGS. 27D-27G). These slicks indicate the presence of floating matters.

FIGS. 27A-27K shows an example showing the possibility of detecting and discriminating floating vegetation and non-vegetation as well as the challenge in identifying the type of non-vegetation using MSI data. FIG. 27A shows an example MSI RGB image on 10 February 2021 over part of the west Florida shelf (NW off Tampa Bay); FIG. 27B shows an example digital photo taken on the same day in area "4" 2708 of the image showing surface *Trichodesmium* mats (photo location annotated as "X" in FIG. 27G); FIG. 27C shows an example windspeed measured from a nearby marine buoy, where the marked dates represent the beginning of the day (0:00 GMT); FIGS. 27D-27G show example enlarged sub-images corresponding to areas 1-4 (i.e., area 1 (2702), area 2 (2704), area 3 (2706), and area 4 (2708)) in FIG. 27A, where surface slicks are visible; FIGS. 27H-27K shows example $\Delta R_{rc}$ spectra (5×5 pixels, vertical bars indicate standard deviations) extracted from MSI pixels of the image slicks in FIGS. 27D-27G, respectively, where the pixel locations are marked in red. The pigment absorption features in FIGS. 27H and 27K are marked with arrows. In FIG. 27H-27K, mean χ of each 5×5 pixels are annotated.

Spectral analysis of representative pixels from the slicks, through the use of $\Delta R_{rc}$ as in FIGS. 26B and 26D, indicate different spectral shapes from these slicks (FIGS. 27H-27K). While slicks in Areas 1 (2702) & 2 (2704) show flat spectral shapes, those in Areas 3 (2706) and 4 (2708) show typical shapes from floating algae, as indicated by the 665-nm absorption feature (arrows in FIGS. 27J & 27K). Digital photos taken on the same day in Area 4 (2708) confirms that these slicks are floating *Trichodesmium* mats (FIG. 27B).

Indeed, even without such a field validation, from knowledge of regional oceanography and from the spectral shapes in FIGS. 27J & 27K, one can still conclude that these slicks are very likely due to surface aggregation of *Trichodesmium.*

In contrast, although it is clear that the slicks in Areas 1 (2702) & 2 (2704) are not floating algae, it is very difficult to discriminate their type based on the spectral shapes. The 443-band may be excluded because the spectral distortion by this 60-m band cannot be removed even after 5×5 pixel averaging. Then, except for the residual band-resolution effect in several NIR bands (704-nm, 741-nm, 783-nm, 865-nm, all having 20-m resolution), all spectra are featureless (FIGS. 27H & 27I). The question becomes what could cause these image slicks, marine debris, or other floating matters. Unfortunately, there is no easy answer.

First, foams or white caps may be ruled out because these slicks show red-rich spectra (in contrast, whitecaps are blue-rich) and because the ocean was very calm (wind is mostly <3 m $s^{-1}$ for two consecutive days before the imaging time, FIG. 27C). Weather data showed almost no rainfall prior to the imaging time, and there is no major river nearby, suggesting these materials are unlikely to be riverine origin. Furthermore, there was no news report of large debris patches in this region, and routine cruise surveys to this region in the past (almost monthly, as part of the red tide monitoring effort) never encountered large debris patches in this region. Therefore, although from the perspective of image spectroscopy these slicks appear like marine debris, it is difficult to conclude without a direct field validation, let alone further differentiating the debris type (e.g., plastic, or non-plastic). At the present, whether the slicks in Areas 1 (2702) and 2 (2704) are due to marine debris or other type of floating matters remains to be a puzzle. On the other hand, detecting and discriminating floating matters (algae versus non-algae) are shown to be possible for $\chi\geq3\%$ from a group of pixels, a result consistent with the sensitivity analysis and practical considerations above.

EXAMPLES

Which wavelengths (bands) to use: The current disclosure comprises embodiments that exploit the vis-NIR bands rather than the SWIR bands for several reasons. First, the spectral contrast between floating matters and background waters is mostly in the NIR, regardless of the type of floating matters (either *Sargassum, Ulva, Trichodesmium*, or plastics, see references in FIGS. 19 & 20). Reflectance of floating matters in the SWIR bands is several times lower than in the NIR bands, making it more difficult to detect if SWIR bands are to be used. This is different from emulsified oil that may have higher SWIR reflectance than in the NIR. Second, due to mixing and other processes, floating matters may be slightly below surface, making the SWIR reflectance quickly disappear due to strong water absorption. For example, water absorption coefficient is ~130 $m^{-1}$ at 1.2 μm and ~700 $m^{-1}$ at 1.6 μm. If the floating matter is 1 cm below surface, its SWIR reflectance would be reduced by 14 times at 1.2 μm and 1 million times at 1.6 μm. In contrast, the 765-nm reflectance would be reduced by only 6%.

Furthermore, when implementing a detection scheme, although the use of a single NIR may maximum the pixel-to-pixel contrast at local scale, interpreting single-band images is usually difficult because of relatively large gradience (compared to noise) across the image. Therefore, band-combination indexes, such as FAI, may be used to mitigate such effects at the price of reduced sensitivity to detect spatial anomalies. This is a reason why the same 200 SNR led to the ~1% detectability but ~0.2% in this current disclosure. The FAI design can be changed to use different band combinations depending on band availability and application needs, for example through the alternative FAI (AFAI) or the floating debris index (FDI). In the end, a combination of a red band (665 nm), a NIR band (754 nm), and another NIR band (865 nm) or a SWIR band (1.2 μm or 1.6 μm) can be sufficient in detecting the presence of floating matters.

Then, the inclusion of a green band (560 nm) will with the 665-nm band and NIR bands make it easy to calculate SAM in order to discriminate between floating algae and non-algae floating matters (FIGS. 23 & 24). The chlorophyll absorption feature around 665 nm (arrows in FIGS. 20A & 20B, FIGS. 927J & 27K) represents a key difference between most floating algae and non-algae floating matters, therefore can be used in either the SAM or other indexes to differentiate the two types. Once an image feature is being identified as floating algae, spectral shapes in the visible wavelengths can be used to further differentiate whether the floating algae is due to *Sargassum, Ulva, Trichodesmium*, or others as long as $\chi$ is above the discrimination threshold.

Discriminating the type of non-algae floating matters: Once non-algae floating matters are identified using the above SAM-based or other similar approach, further discriminating the type of non-algae floating matters can represent a technical challenge as most non-algae debris appear to be similar in spectral shapes (FIG. 19B, FIGS. 27H & 27I). This is especially true considering the usually small $\chi$ values in the ocean. In some examples, the pixels from the same image slick in FIG. 27H are likely to be of the same type, yet their pixel-to-pixel variations in their spectral shapes appear to encompass those from different plastic and non-plastic materials (FIG. 19B). Such pixel-to-pixel variations also appear to overwhelm the spectral variations in the visible due to changes in the background waters. Therefore, at the present, it appears that discrimination non-algae floating matters from floating algae is doable but further pinpointing the non-algae floating matter type based on spectroscopy alone is not. Adding more spectral bands, for example from hyperspectral measurements, might help, but this is a subject of future research.

One exception might be the separation of plastic versus non-plastic marine debris, as the former shows specific, narrow, hydrocarbon absorption features in the SWIR wavelengths. Once hyperspectral data at those wavelengths are available, it might be possible to fingerprint floating plastics. This is similar to the use of these features in detecting and quantifying emulsified oil on the ocean surface. However, one drawback is the small magnitude of these features from marine debris, which may be extremely difficult to detect for the reasons outlined above.

Despite these difficulties, discriminating marine debris from other non-algae floating matters may still be possible through non-spectroscopy methods. For example, most of the non-algae floating matters are rare in the ocean, with often known locations, thus can be easily ruled out with some a priori knowledge. Inspection of wind data can also help rule out the possibility of whitecaps.

On the other hand, although discrimination between floating algae and floating debris (and further discrimination of the type of floating debris) is desirable, it is not always necessary in an ecological perspective. This is because biofouling of marine debris is common, which has implications on both the ecosystem and the fate of marine debris.

Automation: Based on these observations, it is possible to implement a step-wise approach to automate the detection and quantification of both floating algae and non-algae floating matters (including macro debris), for example:

Step 1—detecting spatial anomaly and delineating image features. This can be based on a single band or a combination of bands using image segmentation techniques.

Step 2—discriminating between floating algae and non-algae floating matters. This can be based on their difference around 665 nm, which can be quantified through the use of SAM or other indexes. In this step, the spectral shape around 665 nm can be derived from reflectance difference ($\Delta R_{rc}$) in order to maximum the spectral contrast, where the background water pixels for the individual slick pixels can be found using a nearest-neighbor approach.

Figure 20A:
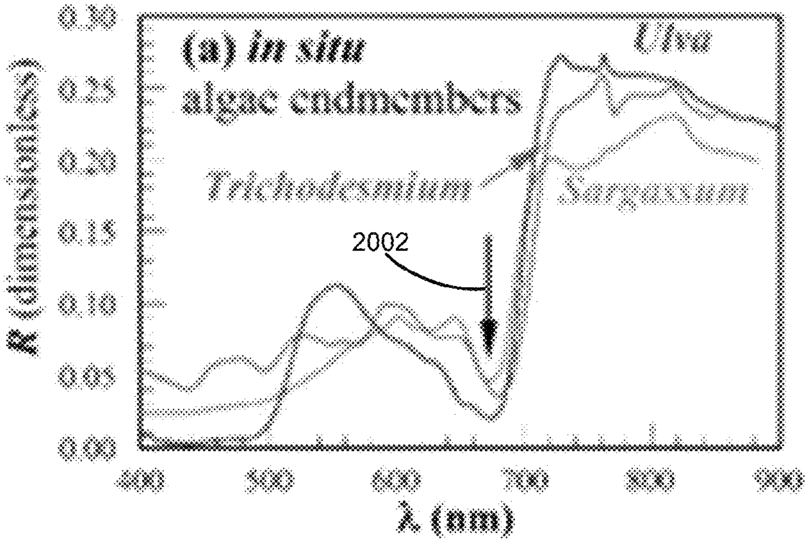
FIGS. 20A and 20B show hyperspectral and multi-spectral reflectance of various floating matters from in situ measurements (FIG. 20A) and OLCI measurements (FIG. 20B), respectively.
Figure 20B:
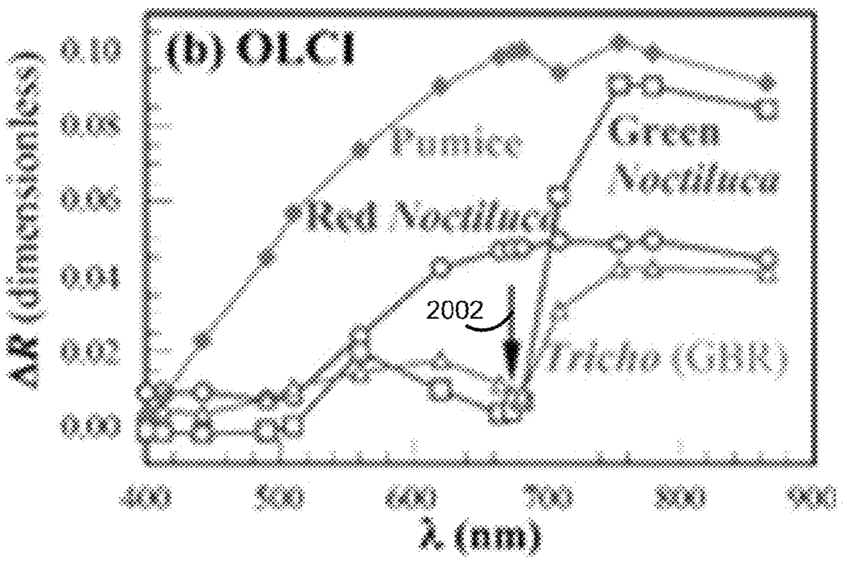
Figure 20C:
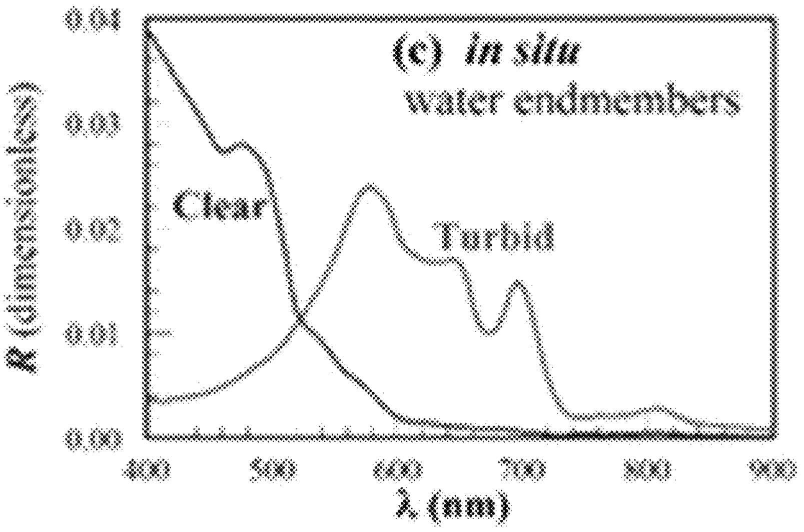
FIG. 20C shows clear-water and turbid-water endmember spectra used in the simulated mixing experiments.

Step 3—quantifying $\chi$ in each pixel, through the use of locally tuned lower-bound threshold to represent $\chi$=0% and pre-defined upper-bound threshold to represent $\chi$=100% (e.g., upper bound for a single NIR band may be 0.25, but for AFAI may be 0.1 according to the endmember spectra presented in FIGS. 19B & 20A).

In all steps above, a fundamental property is the spectral reflectance derived from satellite measurements. Ideally, atmospherically corrected surface reflectance can be used to remove the variable effects due to Rayleigh scattering, gaseous absorption, aerosol scattering, sun glint, and solar/viewing geometry. However, this is not always possible from a pixel-wise atmospheric correction approach (e.g., currently being used in the NASA processing software SeaDAS and ESA processing software SNAP) because the presence of floating matter can violate atmospheric correction assumptions on negligible or predictable (predicted from the red band) NIR-SWIR surface reflectance. Therefore, a nearest-neighbor atmospheric correction or a dark-target based image-wise atmospheric correction approach, such as that implemented in the Acolite software may be used. On the other hand, because $\Delta R$ rather than R is used in Steps 2 and 3, both $R_{rc}$ and $R_t$ can be used. This is because atmospheric over adjacent pixels is assumed to be the same, leading to $\Delta R_{rc}=\Delta R_t=\Delta R$.

Automation also can use cloud masking and other steps to mask pixels that are impossible to determine whether they contain floating matters. These pixels are treated as no-observation pixels to avoid biasing statistics. This is more difficult than implementing the above steps, as there is no universal way to mask these pixels. For example, the standard cloudmasking algorithm in SeaDAS uses a threshold of $R_{rc}$(865 nm)>0.027 to mask clouds, and the modified algorithm uses a threshold of $R_{rc}$(2130 nm)>0.0175 to mask clouds. Because of the enhanced NIR and SWIR reflectance due to floating matters, these cloud masking schemes may falsely mask some floating matter pixels as clouds. To overcome this difficulty, customized cloudmasking algorithms have been used for different sensors, yet their global applicability can be evaluated. Likewise, cloud shadows in high-resolution imagery, among other "artifacts", also can be identified and masked. In some examples, a regional near real-time system can be developed to monitor both floating algae and non-algae floating matters, similar to the *Sargassum* Watch System (SaWS) established for the Atlantic Ocean and Gulf of Mexico.

Optical sensors: In some examples, an initial review of the current satellite sensor capability can be provided, including SAR and LIDAR, with the focus on sensors equipped with NIR and SWIR bands to emphasize the contrast between marine debris and water in these bands. For passive optical sensors, none of the existing satellite sensors was designed to monitor floating matters, especially for the case of marine debris. The observations above may provide some general guide for an "optimal" sensor.

The characteristics of passive optical remote sensing can be generalized in the following 4 resolutions: spatial, spectral, radiometric, and temporal resolutions, with the last two defined by SNRs and site revisit frequency. The first three resolutions are discussed in this disclosure, and the last resolution depends on both sensor and satellite orbital designs. Because there is always a trade-off between all four resolutions, for a coastal region, an optimal sensor can detect and discriminate non-algae floating matter patches of several $m^2$ in size every few days. Such a capacity can enable the sensor to search for missing fishing gears or large solid objects in the ocean due to Tsunami or other disasters. Thus, the following may serve as an optimal trade: 3-4 m spatial resolution, 4-6 spectral bands (443 nm, 560 nm, 620 nm, 665 nm, 754 nm, 865 nm, with 665-nm band having 10-20 nm bandwidth), SNRs of 50-100 at typical ocean radiance inputs, and revisit frequency of 3-4 days. The 865-nm band can be used to form a baseline with the 670-nm band to calculate AFAI. If only 5 bands are allowed, the 865-nm band may be removed because the 754-nm and 670-nm bands can be used to calculate the normalized difference vegetation index (NDVI). The 620-nm band can differentiate floating algae colors (green-rich or orange-rich) but can be sacrificed if only 4 bands are allowed. The other 4 bands (443, 560, 670, and 754 nm) can represent the core conditions for effective detection and discrimination of floating algae and non-algae floating matters.

Currently, the Sentinel-2 MSI sensors almost meet these conditions, yet the mixed band resolutions degrade their capacity in discriminating floating matter types, and its spatial resolution may also be improved. On the other hand, the Planet Scope/DOVE constellation of hundreds of miniature satellite sensors (CubeSats) provides 3-4 m resolution data in 3-4 spectral bands with 2-3-day revisit frequency in many coastal areas, thus almost meeting the conditions above. Unfortunately, DOVE spectral bands are too wide (60-90 nm) to discriminate floating algae against non-algae floating matters. Nevertheless, these existing satellite sensors, combined with other high-resolution sensors, can provide a "practical" solution to meet sensor conditions.

From the above sensitivity analysis, simulation experiments, and case studies using MSI imagery, the following observations and suggestions can be generalized:

Regardless of the floating matter type, either marine debris, oil slicks, or floating vegetation, from the perspective of spectroscopy, remote detection can be done through spatial anomaly analysis and remote discrimination can be done through spectral shape similarity analysis, as opposed to spectral magnitude. Both depend on a sensor's SNRs and band settings.

From a theoretical basis, with only 4 bands around 560 nm, 665 nm, and two NIR wavelengths, both $\chi_{det}$ and $\chi_{dis}$ depend only on sensor sensitivity (SNRs). They are 0.2% and 0.3% for a sensor with SNR of 200, and 0.8% and 1.0% for MSI. Below these limits, floating matter may not be detectable. Considering other practical conditions (e.g., a spatially coherent image feature instead of a single pixel can "stand out" from the background, these limits may be increased by 2-3 times in order to detect and discriminate floating matters. For example, $\chi_{det}$ and $\chi_{dis}$ for MSI may actually be 2% and 3%, respectively (FIGS. 26 and 27).

While the detection of presence/absence of floating matter can be through single-band images or band-combination indexes with each having its own strengths and weaknesses, spectral similarity (or anomaly) needs to be analyzed through the difference spectra (ΔR in Eq. 21) because this is the only way to retain the spectral shape of the floating matter endmember when $\chi$ is typically small (e.g., <10%). Such a practice actually started when differentiating *Sargassum* from *Trichodesmium* in the Gulf of Mexico. For the same reason, using spectral shapes derived from mixed pixels as endmembers can be subject to large uncertainties because these shapes depend not only on the floating matter endmember, but also on the unknown $\chi$ as well as on changes in the water endmember in the real environment.

While detecting macro debris appears possible from MSI, spectral shapes of a mixed pixel can be modulated by the variable $\chi$, variable water reflectance, mismatch in band spatial resolution, and artifacts caused by waves, and sensor artifacts (e.g., parallax effect). This is true even for the same type of floating matter, not to mention the possibility that more than one type of floating matter may exist in the same region. For the reasons mentioned above, in the case of lack of "pure" spectral endmember (i.e., $\chi$=100%), it is better to use ΔR rather than R to represent the endmember.

Because the spectral similarity between macro plastics and non-plastics debris (i.e., relatively flat, wide-band reflectance in the vis-NIR wavelengths), it appears difficult to separate them spectrally. This is also partially due to the lack of a relatively complete spectral library of various marine debris. More measurements are therefore desirable to complement those reported in previous studies focused on plastics. On the other hand, because marine debris may be a mixture of different types of materials, discriminating a specific type may be unnecessary.

The spectral analysis here using *Sargassum* and plastic is for demonstration purpose only. In the marine environment, other known (e.g., FIG. 20) and unknown floating matters may exist, and some of them may have similar spectral shapes as marine debris (e.g., FIGS. 27D & 27E; the thought-to-be sea jelly schools). In the end, to discriminate marine debris from other unknown floating matters, other ancillary information (e.g., knowledge of local oceanography, news reports of pollution events, etc.) may be used to help interpret the detected image features.

Finally, the disclosure uses MSI data to demonstrate the concept in remote sensing of marine debris in the marine environments. The arguments may change substantially for remote sensing of marine debris when they may be heavily concentrated on beaches. In both environments, sensors with finer spatial resolution such as WorldView (2 m) or PlanetScope/Dove (3-4 m) offer a better capacity in detecting smaller debris patches, although detecting such features in marine environments uses more effort because these sensors were not designed for marine applications and therefore subject to higher noise.

In some examples, while the approach can be applied to any multi-band or hyperspectral satellite-borne or airborne sensors, in practice the following steps may be used to implement a system to provide near real-time *Sargassum* maps or other floating matter maps.

First, a best available type of image data for a region is determined, based on image quality, resolution, and acquisition time. In some instances, different image types will be determined for different portions of a larger area. Next, the image analysis methods described above are applied to the best available data to generate the best-quality *Sargassum* maps. If the above is not possible due to lack of satellite data coverage or cloud cover, then other recent data (which may be inferior to images of the preferred type are used.

Next, a narrow time window (e.g., week), from which all available images may be used to fill data gaps due to cloud cover and other artifacts. Finally, based on sequential images in the past week and past month as well as the current time of year, predict future presence and abundance. For example, during spring, if the *Sargassum* amount in a certain region increased in the last month, the amount is likely to increase continuously in the short term.

In an example, systems and methods herein may be used to provide *Sargassum* estimation and forecasting as a service to users, in a cloud computing environment, or in a software package that may be installed on user's local device. Non-limiting examples of services which may be provided include regional guidance for harvesters, fishermen, coastal resource managers. Recursively updated near real-time *Sargassum* maps may be provided as well as historical *Sargassum* for the same region and same season. Realtime (or near realtime) boat positions may be overlaid on *Sargassum* maps. Surface currents and other information may also be overlaid on *Sargassum* maps. Systems and methods herein may also be used to answer questions on-demand for specific patches/locations (e.g., total *Sargassum* quantity at a particular location or within a predefined radius of a specified location) and may also provide predictions of answers to similar questions at future times.

In some embodiments, any suitable computer readable media can be used for storing instructions for performing the functions and/or processes described herein. For example, in some aspects, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

In some scenarios, various companies can utilize the example techniques for remote detection of marine debris and/or macro algae in various locations (e.g., on beaches, in nearshore waters, in offshore waters, etc.) disclosed herein. For example, companies collecting *Sargassum* rather than plastic can exploit the example techniques. In other examples, companies collecting *Sargassum* to make a product based on the *Sargassum* can use the example techniques. In further examples, research institutes or universities researching *Sargassum* on beaches, in nearshore waters, and/or in offshore waters or marine debris in offshore waters can use the example techniques. In even further examples, locations and quantities of *Sargassum* identified by the example techniques can be transmitted to a website, a phone, or any other suitable communication channel. In further examples, the locations and quantities of *Sargassum* can be tracked to find the trajectories of *Sargassum* and be shown along with directions of surface currents. It should be appreciated that the use cases described herein are not limited.

It should be understood that steps of processes described above can be executed or performed in any suitable order or sequence not limited to the order and sequence shown and described in the figures. Also, some of the above process steps can be executed or performed substantially simultaneously where appropriate, or in parallel to reduce latency and processing times.

Although the invention has been described and illustrated in the foregoing illustrative aspects, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for remote object detection, comprising:

obtaining an image, the image comprising a plurality of spectral pixel values for each pixel of the image, the plurality of spectral pixel values corresponding to a plurality of wavelengths;

determining a spectral differencing value for each pixel of the image;

applying the plurality of spectral pixel values of the image and the spectral differencing value for each pixel of the image to a plurality of corresponding input channels of a trained deep learning model to obtain a probability value for each pixel of the image via an output channel of the trained deep learning model; and providing to a user object information of an object in the image based on the probability value for each pixel of the image.

2. The method of claim 1, wherein the image comprises a preprocessed image, and wherein the method further comprises:

receiving an original satellite image collected from a satellite sensor; and preprocessing the original satellite image to generate the preprocessed image.

3. The method of claim 2, wherein the plurality of spectral pixel values of the image comprises a plurality of corrected reflectance values of the preprocessed image corresponding to the plurality of wavelengths, wherein the spectral differencing value comprises a floating algae index value, wherein the determining of the spectral differencing value comprising: determining the floating algae index value for each pixel of the image based on a difference between a first corrected reflectance value of the plurality of corrected reflectance values at a first wavelength of the plurality of wavelengths and a second corrected reflectance value at the first wavelength of the plurality of wavelengths.

4. The method of claim 3, wherein the first wavelength comprises a first near-infrared (NIR) wavelength, wherein the second corrected reflectance value at the first wavelength of the plurality of wavelengths is determined based on a second corrected reflectance value of the plurality of corrected reflectance values at a second NIR wavelength of the plurality of wavelengths, and a third corrected reflectance value of the plurality of corrected reflectance values at a red wavelength of the plurality of wavelengths.

5. The method of claim 2, wherein the spectral differencing value comprises a floating algae index value, and wherein the determining of the spectral differencing value comprising:

generating a top-of-atmosphere (TOA) reflectance value for each pixel of the original image; and determining the floating algae index value based on the TOA reflectance value.

6. The method of claim 1, wherein the plurality of spectral pixel values comprises a plurality of top-of-atmosphere (TOA) radiance values for each pixel of the image.

7. The method of claim 1, further comprising:

masking first pixels in the image, the first pixels corresponding to a cloud area or a land area in the image.

8. The method of claim 7, wherein the masking of the first pixels in the image comprises:

masking a subset pixel of the first pixels in the image based on when a difference between a first corrected reflectance value at a short-wave infrared (SWIR) wavelength of the plurality of wavelengths and a second corrected reflectance value at the SWIR wavelength is higher than a threshold.

9. The method of claim 8, wherein the first corrected reflectance value comprises a denoised reflectance value, and wherein the second corrected reflectance value comprises a background reflectance value, the background reflectance value comprising an average of a subset of the image, the subset comprising the subset pixel.

10. The method of claim 1, wherein the trained deep learning model comprises an encoder associated with a VGG16 model and a decoder associated with a U-Net model.

11. The method of claim 10, wherein a sigmoid activation function is used for a final output layer in the U-Net model to produce the probability value for each pixel of the image.

12. The method of claim 1, further comprising:

dividing the image into a plurality of sub-images, an edge of each sub-image of the plurality of sub-images overlapping an adjacent sub-image of the plurality of sub-images, wherein the applying of the plurality of spectral pixel values of the image and the spectral differencing value for each pixel of the image comprises:

applying the plurality of spectral pixel values for each sub-image of the plurality of sub-images and the spectral differencing value for each sub-image of the plurality of sub-images to obtain the probability value for a subset of each sub-image of the plurality of sub-images, the subset excluding an overlap between the respective sub-image and the adjacent sub-image.

13. The method of claim 1, wherein the providing of the object information comprises: quantifying a biomass density of the object based on the probability value for each pixel of the image.

14. A non-transitory computer-readable medium storing instructions executable by a processor to:

obtain an image, the image comprising a plurality of spectral pixel values for each pixel of the image, the plurality of spectral pixel values corresponding to a plurality of wavelengths;

determine a spectral differencing value for each pixel of the image;

apply the plurality of spectral pixel values of the image and the spectral differencing value for each pixel of the image to a plurality of corresponding input channels of a trained deep learning model to obtain a probability value for each pixel of the image via an output channel of the trained deep learning model; and provide to a user object information of an object in the image based on the probability value for each pixel of the image.

15. The non-transitory computer-readable medium of claim 14, wherein the image comprises a preprocessed image, and wherein the instructions are further executable by the processor to:

receive an original satellite image collected from a satellite sensor; and preprocess the original satellite image to generate the preprocessed image.

16. The non-transitory computer-readable medium of claim 15, wherein the plurality of spectral pixel values of the image comprises a plurality of corrected reflectance values of the preprocessed image corresponding to the plurality of wavelengths, wherein the spectral differencing value comprises a floating algae index value, wherein the determining of the spectral differencing value comprising:

determining the floating algae index value for each pixel of the image based on a difference between a first corrected reflectance value of the plurality of corrected reflectance values at a first wavelength of the plurality of wavelengths and a second corrected reflectance value at the first wavelength of the plurality of wavelengths.

17. The non-transitory computer-readable medium of claim 16, wherein the first wavelength comprises a first near-infrared (NIR) wavelength, wherein the second corrected reflectance value at the first wavelength of the plurality of wavelengths is determined based on a second corrected reflectance value of the plurality of corrected reflectance values at a second NIR wavelength of the plurality of wavelengths, and a third corrected reflectance value of the plurality of corrected reflectance values at a red wavelength of the plurality of wavelengths.

18. The non-transitory computer-readable medium of claim 15, wherein the spectral differencing value comprises a floating algae index value, and wherein the determining of the spectral differencing value comprising:

generating a top-of-atmosphere (TOA) reflectance value for each pixel of the original image; and determining the floating algae index value based on the TOA reflectance value.

19. The non-transitory computer-readable medium of claim 14, wherein the instructions are further executable by the processor to:

mask first pixels in the image, the first pixels corresponding to a cloud area or a land area in the image.

20. The non-transitory computer-readable medium of claim 19, wherein the masking of the first pixels in the image comprises:

masking a subset pixel of the first pixels in the image based on when a difference between a first corrected reflectance value at a short-wave infrared (SWIR) wavelength of the plurality of wavelengths and a second corrected reflectance value at the SWIR wavelength is higher than a threshold.

* * * * *